US012587325B2

(12) United States Patent
Jung et al.

(10) Patent No.: US 12,587,325 B2
(45) Date of Patent: Mar. 24, 2026

(54) METHOD AND DEVICE FOR HARQ-ACK FEEDBACK TRANSMISSION OR RECEPTION FOR NETWORK COOPERATIVE COMMUNICATION

(71) Applicant: Samsung Electronics Co., Ltd., Suwon-si (KR)

(72) Inventors: Euichang Jung, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 18/338,029

(22) Filed: Jun. 20, 2023

(65) Prior Publication Data

US 2023/0344570 A1 Oct. 26, 2023

Related U.S. Application Data

(63) Continuation of application No. PCT/KR2022/000757, filed on Jan. 14, 2022.

(30) Foreign Application Priority Data

Jan. 14, 2021 (KR) ........................ 10-2021-0005411

(51) Int. Cl.
*H04L 5/00* (2006.01)
*H04L 1/1607* (2023.01)
(Continued)

(52) U.S. Cl.
CPC .......... *H04L 5/0035* (2013.01); *H04L 1/1607* (2013.01); *H04W 72/12* (2013.01); *H04W 72/232* (2023.01)

(58) Field of Classification Search
CPC ......... H04B 7/024; H04L 1/08; H04L 1/1607; H04L 1/1671; H04L 1/1812;
(Continued)

(56) References Cited

U.S. PATENT DOCUMENTS 10,034,280 B2 7/2018 Kim et al.
10,959,250 B2 * 3/2021 Yang .................... H04L 5/0053
(Continued)

FOREIGN PATENT DOCUMENTS

CN 111181706 B 12/2021
EP 3 651 396 A1 5/2020
(Continued)

OTHER PUBLICATIONS

VIVO, Further discussion on enhancement of MTRP operation, R1-2007645, 3GPP TSG RAN WG1 #103-e, Oct. 24, 2020, e-Meeting.

(Continued)

*Primary Examiner* — Eric Nowlin
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. The disclosure may be applied to intelligence services (for example, smart homes, smart buildings, smart cities, smart cars or connected cars, health-care, digital education, retail businesses, security and safety related services, etc.) on the basis of a 5G communication technology and an IoT-related technology. A method and a device for transmitting or receiving HARQ-ACK feedback information by a terminal in a wireless communication system are provided. The method and device include transmitting, for network cooperative communication (network coordination), HARQ-ACK feedback information to multiple transmission points, panels, or beams by a terminal.

19 Claims, 27 Drawing Sheets

(51) Int. Cl.
*H04W 72/12* (2023.01)
*H04W 72/232* (2023.01)

(58) Field of Classification Search
CPC ... H04L 1/1858; H04L 1/1861; H04L 1/1864;
H04L 1/189; H04L 1/1896; H04L 5/0032;
H04L 5/0035; H04L 5/0055; H04L 5/06;
H04L 5/22; H04W 72/12; H04W
72/1273; H04W 72/23; H04W 72/232
See application file for complete search history.

(56) References Cited

U.S. PATENT DOCUMENTS

| | | | | |
|---|---|---|---|---|
| 11,206,655 | B2 | 12/2021 | Moon et al. | |
| 11,304,077 | B2 * | 4/2022 | Bagheri | H04W 72/23 |
| 11,368,257 | B2 * | 6/2022 | Kim | H04W 72/0446 |
| 11,445,387 | B2 * | 9/2022 | Bagheri | H04L 5/0035 |
| 11,653,354 | B2 * | 5/2023 | Cirik | H04B 7/06964 |
| | | | | 370/329 |
| 11,831,438 | B2 * | 11/2023 | Noh | H04L 1/1864 |
| 11,895,658 | B2 * | 2/2024 | Lee | H04W 72/23 |
| 12,309,782 | B2 * | 5/2025 | Ling | H04W 72/21 |
| 2019/0020506 | A1 * | 1/2019 | Cheng | H04L 5/0055 |
| 2020/0008235 | A1 | 1/2020 | Sarkis et al. | |
| 2020/0036480 | A1 * | 1/2020 | Yang | H04L 1/0073 |
| 2020/0053580 | A1 * | 2/2020 | Bagheri | H04L 5/006 |
| 2020/0053757 | A1 * | 2/2020 | Bagheri | H04L 5/0007 |
| 2020/0205175 | A1 * | 6/2020 | Yang | H04L 5/0058 |
| 2020/0266937 | A1 * | 8/2020 | Khoshnevisan | H04L 5/0055 |
| 2020/0328849 | A1 * | 10/2020 | Noh | H04L 1/1812 |
| 2021/0051699 | A1 | 2/2021 | Bhamri et al. | |
| 2021/0105750 | A1 * | 4/2021 | Khoshnevisan | H04W 72/23 |
| 2021/0105765 | A1 * | 4/2021 | Cirik | H04B 7/0696 |
| 2021/0195601 | A1 * | 6/2021 | Khoshnevisan | H04W 72/53 |
| 2021/0259006 | A1 | 8/2021 | Yoshioka et al. | |
| 2021/0266893 | A1 * | 8/2021 | Lee | H04L 1/1861 |
| 2021/0336724 | A1 | 10/2021 | Song et al. | |
| 2021/0352629 | A1 * | 11/2021 | Haghighat | H04L 1/1896 |
| 2022/0116183 | A1 * | 4/2022 | Gao | H04L 5/0055 |
| 2022/0190980 | A1 | 6/2022 | Matsumura et al. | |
| 2022/0217754 | A1 * | 7/2022 | Matsumura | H04L 5/0035 |
| 2022/0287030 | A1 * | 9/2022 | Ling | H04L 5/0053 |
| 2023/0155736 | A1 * | 5/2023 | Kim | H04L 1/1864 |
| | | | | 370/329 |
| 2023/0224898 | A1 * | 7/2023 | Ling | H04L 5/0044 |
| | | | | 370/329 |
| 2023/0344570 | A1 * | 10/2023 | Jung | H04L 5/0055 |
| 2024/0040584 | A1 * | 2/2024 | Yuan | H04W 72/232 |

FOREIGN PATENT DOCUMENTS

| | | | | |
|---|---|---|---|---|
| KR | 10-2019-0017675 A | 2/2019 | | |
| WO | 2020/040179 A1 | 2/2020 | | |
| WO | 2020/194611 A1 | 10/2020 | | |
| WO | 2020/198667 A1 | 10/2020 | | |
| WO | WO-2022017260 A1 * | 1/2022 | | H04W 36/0055 |

OTHER PUBLICATIONS

Panasonic, On multi-TRP enhancements for NR MIMO in Rel. 16, R1-1900677, 3GPP TSG RAN WG1 Ad-Hoc Meeting 1901, Jan. 20, 2019, Taipei, Taiwan.
Convida Wireless, Multi-TRP Enhancements for PDCCH, PUCCH and PUSCH, R1-2009159, 3GPP TSG-RAN WG1#103-e, Oct. 24, 2020, e-Meeting.
European Search Report dated Apr. 26, 2024, issued in European Application No. 22739781.7.
QUALCOMM Incorporated, Enhancements on Multi-TRP for PDCCH, PUCCH and PUSCH, R1-2009251, 3GPP TSG-RAN WG1 Meeting #103-e, e-Meeting, Nov. 1, 2020.
International Search Report dated Apr. 25, 2022, issued in International Application No. PCT/KR2022/000757.

* cited by examiner

Option #1: HARQ-ACK for single-PDCCH NC-JT (1400)

Option #2: joint HARQ-ACK (1420)

Option #3: inter-slot TDMed separate HARQ-ACK (1440)

Option #4: intra-slot TDMed separate HARQ-ACK [1460]

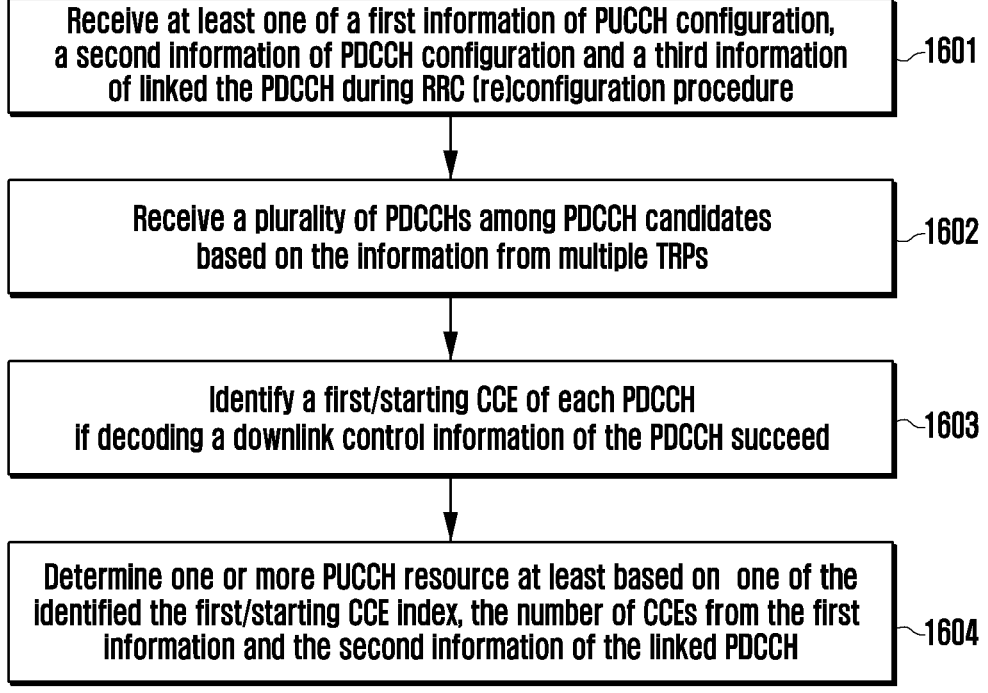

Receive at least one of a first information of PUCCH configuration, a second information of PDCCH configuration and a third information of linked the PDCCH during RRC (re)configuration procedure ⌐1601

Receive a plurality of PDCCHs among PDCCH candidates based on the information from multiple TRPs ⌐1602

Identify a first/starting CCE of each PDCCH if decoding a downlink control information of the PDCCH succeed ⌐1603

Determine one or more PUCCH resource at least based on one of the identified the first/starting CCE index, the number of CCEs from the first information and the second information of the linked PDCCH ⌐1604

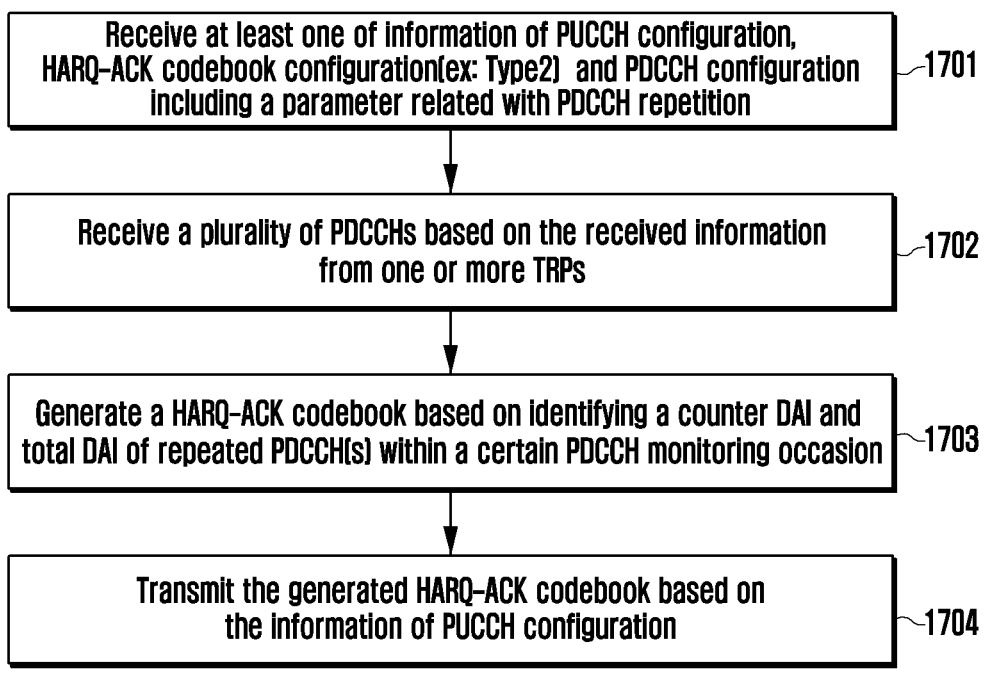

Receive at least one of information of PUCCH configuration, HARQ-ACK codebook configuration(ex: Type2) and PDCCH configuration including a parameter related with PDCCH repetition — 1701

Receive a plurality of PDCCHs based on the received information from one or more TRPs — 1702

Generate a HARQ-ACK codebook based on identifying a counter DAI and total DAI of repeated PDCCH(s) within a certain PDCCH monitoring occasion — 1703

Transmit the generated HARQ-ACK codebook based on the information of PUCCH configuration — 1704

1

METHOD AND DEVICE FOR HARQ-ACK FEEDBACK TRANSMISSION OR RECEPTION FOR NETWORK COOPERATIVE COMMUNICATION

CROSS-REFERENCE TO RELATED APPLICATION(S)

This application is a continuation application, claiming priority under § 365(c), of an International application No. PCT/KR2022/000757, filed on Jan. 14, 2022, which is based on and claims the benefit of a Korean patent application number 10-2021-0005411, filed on Jan. 14, 2021, in the Korean Intellectual Property Office, the disclosure of which is incorporated by reference herein in its entirety.

BACKGROUND

1. Field

The disclosure relates to a wireless communication system. More particularly, the disclosure relates to a method and device in which, for cooperative communication between multiple transmission points, panels, or beams, a terminal transmits hybrid automatic repeat request-acknowledgment (HARQ-ACK) information through uplink to the multiple transmission points, panels, or beams.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality ((XR)=AR+VR+MR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Since various services can be provided in accordance with the described development of the wireless communication system, a method for smoothly supporting a service related to repetitive transmission of uplink data of a terminal is required in particular.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for transmitting or receiving HARQ-ACK feedback information of a terminal in a wireless communication system. More specifically, for network coordination, a method and device for a terminal to transmit HARQ-ACK feedback information to multiple transmission points, panels, or beams may be provided.

Additional aspects will be set forth in part in the description which follows and, in part, will be apparent from the description, or may be learned by practice of the presented embodiments.

In accordance with an aspect of the disclosure, a method performed by a terminal in a wireless communication system supporting multiple transmission reception points (TRPs) is provided. The method includes receiving configuration information related to generation of hybrid automatic repeat request-acknowledgment (HARQ-ACK) feedback information, receiving, from one or more TRPs, multiple physical downlink control channels (PDCCHs) for scheduling of one physical uplink shared channel (PDSCH), receiving the PDSCH, based on the multiple PDCCHs, generating HARQ-ACK feedback information for the PDSCH, based on the configuration information, and transmitting the HARQ-ACK feedback information.

According to another embodiment of the disclosure, each of the multiple PDCCHs includes downlink assignment index (DAI) information for generation of the HARQ-ACK feedback information, wherein the HARQ-ACK feedback information may be generated based on the DAI information.

According to another embodiment of the disclosure, the multiple PDCCHs includes a first PDCCH and a second PDCCH, the first PDCCH may be received from a first TRP and the second PDCCH may be received from a second TRP, or the first PDCCH and the second PDCCH may be received from any one TRP.

In addition, in the method according to an embodiment of the disclosure, first DAI information included in the first PDCCH and second DAI information included in the second PDCCH may be identical to each other.

In addition, the first PDCCH and the second PDCCH may be frequency division multiplexed (FDMed) within one monitoring occasion in a slot, or the first PDCCH and the second PDCCH may be time division multiplexed (TDMed) within two or more monitoring occasions within the slot.

In accordance with another aspect of the disclosure, a terminal in a wireless communication system supporting multiple transmission reception points (TRPs) is provided. The terminal includes a transceiver configured to transmit or receive a signal, and a controller connected to the transceiver, wherein the controller is configured to receive configuration information related to generation of hybrid automatic repeat request-acknowledgment (HARQ-ACK)

feedback information, receive, from one or more TRPs, multiple physical downlink control channels (PDCCHs) for scheduling of one physical uplink shared channel (PDSCH), receive the PDSCH, based on the multiple PDCCHs, generate HARQ-ACK feedback information for the PDSCH, based on the configuration information, and transmit the HARQ-ACK feedback information.

In accordance with another aspect of the disclosure, a method performed by a first TRP in a wireless communication system supporting multiple transmission reception points (TRPs) is provided. The method includes transmitting, to a terminal, configuration information related to generation of hybrid automatic repeat request-acknowledgment (HARQ-ACK) feedback information, transmitting, to the terminal, at least one physical downlink control channel (PDCCH) for scheduling of one physical uplink shared channel (PDSCH), transmitting the PDSCH to the terminal, based on the at least one PDCCH, and receiving, from the terminal, HARQ-ACK feedback information for the PDSCH generated based on the configuration information.

In accordance with another aspect of the disclosure, a first TRP in a wireless communication system supporting multiple transmission reception points (TRPs) is provided. The first TRP includes a transceiver configured to transmit or receive a signal, and a controller connected to the transceiver, wherein the controller is configured to transmit, to a terminal, configuration information related to generation of hybrid automatic repeat request-acknowledgment (HARQ-ACK) feedback information, transmit, to the terminal, at least one physical downlink control channel (PDCCH) for scheduling of one physical uplink shared channel (PDSCH), transmit the PDSCH to the terminal, based on the at least one PDCCH, and receive, from the terminal, HARQ-ACK feedback information for the PDSCH generated based on the configuration information.

According to the disclosure, when network coordination is used in a wireless communication system, a terminal can reduce a network load by efficiently generating and transmitting HARQ-ACK feedback information to each transmission point, panel, or beam, and efficient wireless communication can be performed by reducing the amount of computation of the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B illustrates the case in which the UE may have a plurality of PDCCH monitoring locations within the slot in a wireless communication system according to an embodiment of the disclosure;

FIG. 11 is a diagram illustrating radio protocol structures of a terminal and a base station in single cell, carrier aggregation, and dual connectivity situations according to an embodiment of the disclosure;

FIG. 12 is a diagram illustrating an antenna port configuration and resource allocation for cooperative communication in the wireless communication system according to an embodiment of the disclosure;

FIG. 13 is a diagram illustrating an example of a downlink control information (DCI) configuration for cooperative communication in the wireless communication system according to an embodiment of the disclosure;

FIG. 16B is a diagram illustrating a case of multi-PDCCH-based NC-JT according to repetitively transmitted PDCCH and PUCCH configurations for NC-JT transmission and an operation method of a terminal for performing the same according to an embodiment of the disclosure;

FIG. 16C is a diagram illustrating a case of multi-PDCCH-based NC-JT according to repetitively transmitted PDCCH and PUCCH configurations for NC-JT transmission and an operation method of a terminal for performing the same according to an embodiment of the disclosure;

FIG. 17A is a diagram illustrating a case of generating a Type 2 HARQ-ACK codebook and an operation method of a terminal for performing the same according to an embodiment of the disclosure;

FIG. 17B is a diagram illustrating a case of generating a Type 2 HARQ-ACK codebook and an operation method of a terminal for performing the same according to an embodiment of the disclosure;

FIG. 17C is a diagram illustrating a case of generating a Type 2 HARQ-ACK codebook and an operation method of a terminal for performing the same according to an embodiment of the disclosure;

Throughout the drawings, it should be noted that like reference numbers are used to depict the same or similar elements, features, and structures.

DETAILED DESCRIPTION

Figure 1:
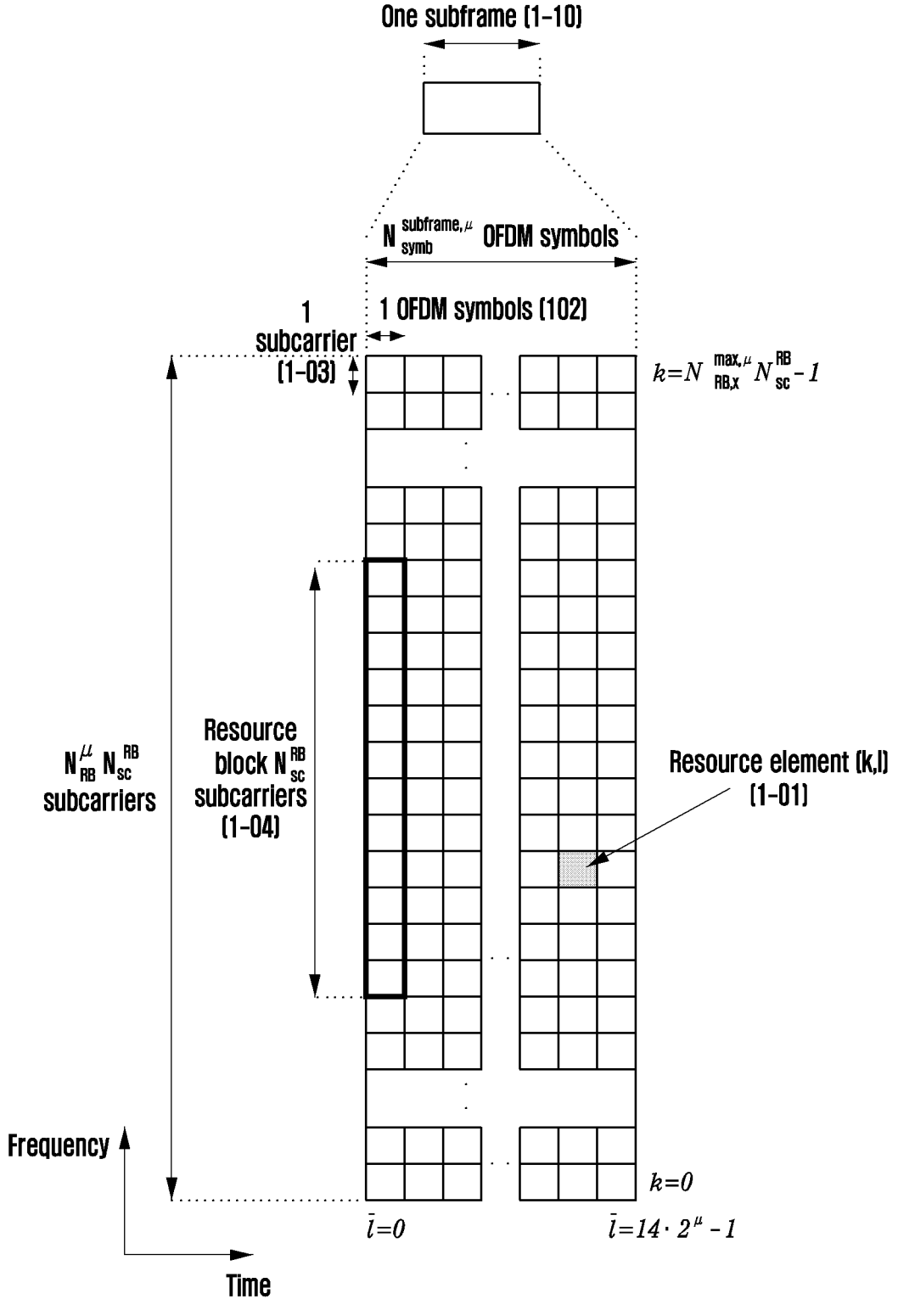
FIG. 1 illustrates a structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit".

Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. Th following description of the disclosure is directed to technology for receiving broadcast information from a base station by a terminal in a wireless communication system. The disclosure relates to a communication technique for converging IoT technology with a 5G (5th generation) communication system designed to support a higher data transfer rate beyond the 4G (4th generation) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards may be used for the convenience of description. However, the disclosure is not limited by these terms and names, and may be applied in the same way to systems that conform other standards.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, 802.16e of IEEE, and the like.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (BS or eNodeB), and the DL refers to a wireless link through which a base station transmits data or a control signal to a terminal. The multiple access scheme normally allocates and operates time-frequency resources for transmission of data or control information according to each user so as to prevent the time-frequency resources from overlapping with each other, that is, to establish orthogonality, thereby distinguishing the data or the control information of each user.

As a future communication system after LTE, that is, a 5G communication system has to be able to freely reflect various requirements of a user and a service provider, and thus services satisfying various requirements need to be supported. The services considered for the 5G communication system include enhanced mobile broadband (eMBB), massive machine-type communication (mMTC), ultra-reliability low latency communication (URLLC), and the like.

According to some embodiments, eMBB aims to provide a higher data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. At the same time, the 5G communication system should provide the increased user perceived data rate of the terminal. In order to satisfy such requirements, improvement of various transmitting/receiving technologies including a further improved multi input multi output (MIMO) transmission technology is needed. In addition, the 5G communication system uses a bandwidth wider than 20 megahertz (MHz) in a frequency band of 3 to 6 GHz or more than 6 GHz, instead of a 2 GHz band used by the current LTE, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km2) in a cell because it is attached to various sensors and devices to provide communication functions. In addition, because the terminals supporting mMTC are more likely to be positioned in shaded areas not covered by a cell, such as a basement of a building due to nature of services, the terminals may require a wider coverage than other services provided by the 5G communication system. The terminals supporting mMTC should be configured as inexpensive terminals and require very long battery life-time because it is difficult to frequently replace batteries of the terminals.

Finally, URLLC is a cellular-based wireless communication service used for mission-critical purposes, and the URLLC may consider a service used in remote control for robots or machinery, industrial automation, unmanned aerial vehicles, remote health care, emergency alerts, and the like. Accordingly, the URLLC should provide very low latency and very high reliability. For example, URLLC-supportive services need to meet an air interface latency of less than 0.5 milliseconds and simultaneously include requirements of a packet error rate of 10-5 or less. Accordingly, for URLLC-supportive services, the 5G system should provide a transmit time interval (TTI) shorter than those for other services while securing design requirements for allocating a broad resource in a frequency band. However, the aforementioned mMTC, URLLC, and eMBB are only examples of different service types, and the service types to which the disclosure is applied are not limited to the above-described examples.

The above-discussed services considered in the 5G communication system should be converged with each other and provided, based on a single framework. That is, for an effective resource management and control, it is desirable that such services are controlled and transmitted by being integrated into one system rather than being operated independently.

In addition, although an embodiment of the disclosure will be described below using an LTE, LTE-A, LTE Pro, or NR system as an example, the embodiment of the disclosure may be applied to other communication systems having similar technical backgrounds or channel types. In addition, an embodiments of the disclosure may be applied to other communication systems through some modifications within a range which does not significantly depart from the scope of the disclosure, as determined by a person having skilled technical knowledge.

Hereinafter, a frame structure of a 5G system is described in more detail with reference to the drawings.

FIG. 1 illustrates a basic structure of a time-frequency domain which is a radio resource domain in which data or a control channel is transmitted in a 5G system according to an embodiment of the disclosure.

Referring to FIG. 1, a horizontal axis indicates a time domain and a vertical axis indicates a frequency domain within one subframe 1-10. The basic unit of resources in the time and frequency domain is a resource element (RE) 1-01 and may be defined as 1 orthogonal frequency division multiplexing (OFDM) symbol 1-02 in the time axis and 1 subcarrier 1-03 in the frequency axis. In the frequency domain, $N_{sc}^{RB}$ (for example, 12) successive REs may correspond to one Resource Block (RB) 104.

Figure 2:
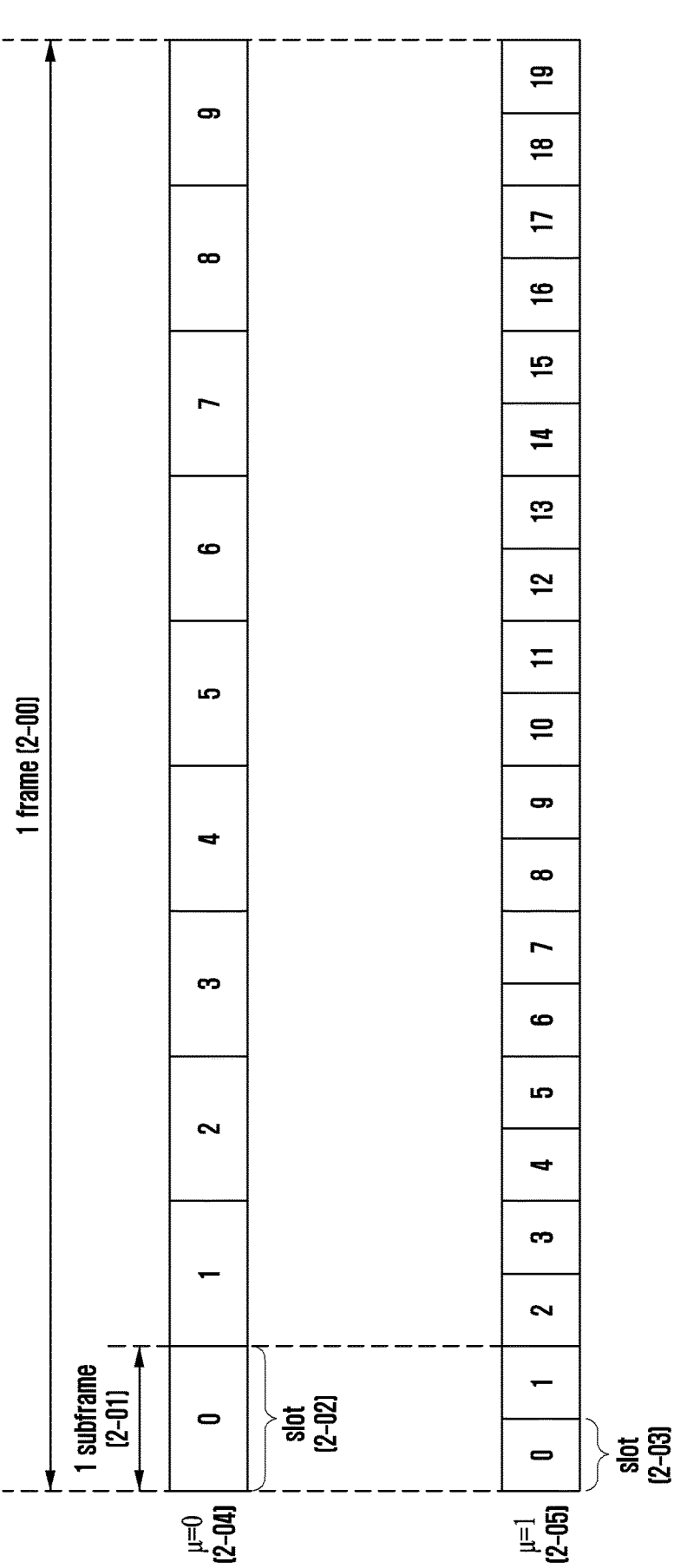
FIG. 2 illustrates frame, subframe, and slot structures in a wireless communication system according to an embodiment of the disclosure.

FIG. 2 illustrates frame, subframe, and slot structures in a next generation wireless communication system according to an embodiment of the disclosure.

Referring to FIG. 2, an example of the structure of a frame 2-00, a subframe 2-01, and a slot 2-02 is illustrated. 1 frame 2-00 may be defined as 10 ms. 1 subframe 2-01 may be defined as 1 ms, and accordingly one frame 2-00 may include a total of 10 subframes 2-01. 1 slot 2-02 or 2-03 may be defined as 14 OFDM symbols (that is, the number symbols $N_{symb}^{slot}$) per slot=14). 1 subframe 2-01 may include one or a plurality of slots 202 and 203, and the number of slots 2-02 or 2-03 per subframe 2-01 may vary depending on a configuration value µ 2-04 or 2-05 for subcarrier spacing. In the example of FIG. 2 illustrates the case in which the subcarrier spacing configuration value µ=0 2-04 and the case in which the subcarrier spacing configuration value µ=1 2-05. 1 subframe 2-01 may include one slot 2-02 in the case of µ=0 2-04, and 1 subframe 2-01 may include 2 slots 2-03 in the case of µ=1 2-05. That is, the number ($N_{slot}^{subframe,\mu}$) of slots per subframe may vary depending on the configuration value (µ) for subcarrier spacing, spacing, and accordingly the number ($N_{slot}^{frame,\mu}$) of slots per frame may vary. The number ($N_{slot}^{subframe,\mu}$) and the number ($N_{slot}^{frame,\mu}$) according to the subcarrier spacing configuration value (µ) may be defined as shown in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when a UE always receives the entire serving cell bandwidth, such as in the LTE system, power consumption of the UE may be extreme, and in order to solve this problem, it is possible for a base station to configure one or more bandwidth parts (BWPs) for the UE so as to support the UE to change a reception area within a cell. In NR, the base station may configure an "initial BWP", which is a bandwidth of CORE-SET #0 (or common search space (CSS)), for the UE via a master information block (MIB). Thereafter, the base station may configure an initial BWP (first BWP) of the UE via RRC signaling, and may notify of at least one BWP configuration information that can be indicated through downlink control information (DCI) in the future. Thereafter, the base station may notify of a BWP ID via DCI so as to indicate which band the UE is to use. If the UE fails to receive DCI in a currently allocated BWP for a specific period of time or more, the UE returns to a "default bandwidth part" and attempts to receive DCI.

Figure 3:
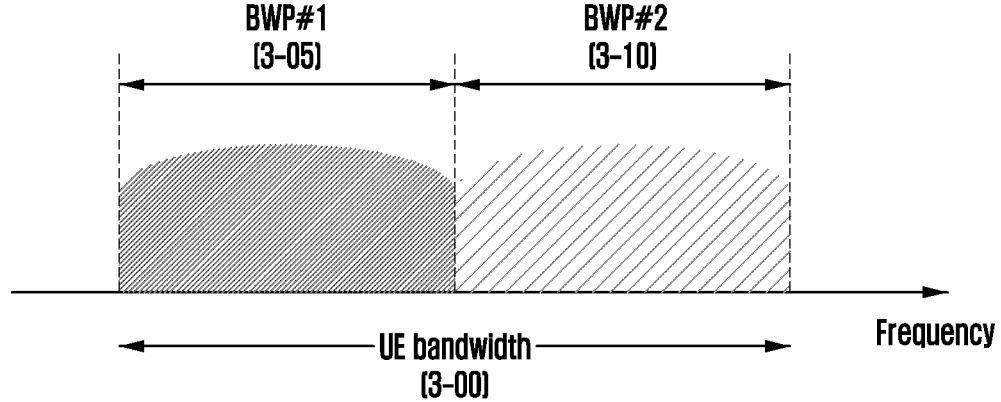
FIG. 3 illustrates an example of a configuration of a bandwidth part (BWP) in a wireless communication system according to an embodiment of the disclosure.

FIG. 3 illustrates an example of a bandwidth part (BWP) configuration in a wireless communication system according to an embodiment of the disclosure.

Referring to FIG. 3, FIG. 3 illustrates an example in which a UE bandwidth 3-00 is configured by two BWPs, that is, BWP #1 3-05 and BWP #2 3-10. The base station may configure one or multiple BWPs for the UE, and may configure pieces of information as shown in Table 2 below for each bandwidth part.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

An embodiment of the disclosure is not limited to the above example, and in addition to the configuration information, various parameters related to a BWP may be configured in the UE. The above-described pieces of information may be transmitted by the base station to the UE via higher layer signaling, for example, RRC signaling. At least one BWP among the configured one or multiple BWPs may be activated. Whether to activate the configured BWP may be semi-statically transmitted from the base station to the UE via RRC signaling or may be dynamically transmitted through an MAC control element (CE) or DCI.

According to another embodiment, a UE before radio resource control (RRC) connection may be configured with an initial BWP for initial access from a base station through a master information block (MIB). More specifically, the UE may receive configuration information about a search apace and a control resource set (CORESET) through which the PDCCH can be transmitted, in order to receive system information required for initial access (which may correspond to remaining system information (RMSI) or system information block 1 (SIB 1)) through the MIB in an initial access operation. Each of the control resource set (CORESET) and search space configured through the MIB may be regarded as identity (ID) 0.

The base station may notify the UE of configuration information, such as frequency allocation information, time allocation information, and numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identity (ID) of the initial BWP may be regarded as zero.

The configuration of the BWP supported by the above-described next-generation mobile communication system (5G or NR system) may be used for various purposes.

As an example, in case that a bandwidth supported by the UE is smaller than a system bandwidth, the bandwidth supported by the UE may be supported through the BWP configuration. For example, in Table 2, a frequency location (configuration information 2) of the BWP is configured for the UE and thus the UE may transmit or receive data at a specific frequency location within the system bandwidth.

According to another example, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed (FDMed), and when desiring to transmit or receive data at a specific subcarrier spacing, the BWP configured with the corresponding subcarrier spacing may be activated.

According to still another example, the base station may configure, in the UE, BWPs having bandwidths of different sizes for the purpose of reducing power consumption of the UE. For example, when the UE supports a very large bandwidth, for example, a bandwidth of 100 MHz, and always transmits or receives data through the corresponding bandwidth, very large power consumption may occur. In particular, in a situation in which there is no traffic, it is very inefficient, in terms of power consumption, for the UE to monitor an unnecessary downlink control channel for a large bandwidth of 100 MHz. Therefore, for the purpose of reducing power consumption of the UE, the base station may configure, for the UE, a bandwidth part of a relatively small bandwidth, for example, the bandwidth part of 20 MHz. In a situation in which there is no traffic, the UE may perform a monitoring operation in the bandwidth part of 20 MHz. When data has been generated, the UE may transmit or receive the data by using the bandwidth part of 100 MHz according to an indication of the base station.

In a method of configuring the bandwidth part, the UEs before the RRC connection may receive configuration information about the initial bandwidth part through the MIB in the initial access operation. More specifically, the UE may be configured with a control region (or control resource set (CORESET)) for a downlink control channel, through which downlink control information (DCI) for scheduling a system information block (SIB) may be transmitted, from a MIB of a physical broadcast channel (PBCH). The bandwidth of the control resource set configured through the MIB may be regarded as the initial BWP. The UE may receive a PDSCH, through which the SIB is transmitted, through the configured initial BWP. The initial BWP may be used for other system information (OSI), paging, and random access in addition to the reception of the SIB.

Hereinafter, a synchronization signal (SS)/PBCH block (SSB) of a next generation mobile communication system (5G or NR system) will be described.

The SS/PBCH block may refer to a physical layer channel block including a primary SS (PSS), a secondary SS (SSS), and a PBCH. More specifically, the SS/PBCH block may be defined as follows:

PSS: which is a signal that serves as a reference for downlink time/frequency synchronization, and may provide some information of a cell ID.

SSS: which serves as a reference for downlink time/ frequency synchronization, and may provide the remaining cell ID information that is not provided by the PSS. In addition, the SSS may serve as a reference signal for demodulation of the PBCH.

PBCH: which may provide essential system information required for transmission or reception of a data channel and a control channel of a UE. The essential system information may include search space-related control information indicating radio resource mapping information of a control channel, scheduling control information for a separate data channel for transmission of system information, and the like.

SS/PBCH block: the SS/PBCH block may include a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may acquire the MIB from the PBCH, and may be configured with the control resource set #0 through the MIB. The UE may monitor the control resource set #0 under the assumption that the selected SS/PBCH block and a demodulation reference signal (DMRS) transmitted in the control resource set #0 are quasi-co-located (QCLed). The UE may receive system information through downlink control information transmitted from the control resource set #0. The UE may acquire, from the received system information, random access channel (RACH)-related configuration information required for initial access. The UE may transmit a physical RACH (PRACH) to the base station by considering the selected SS/PBCH index, and the base station having received the PRACH may acquire information about an SS/PBCH block index selected by the UE. The base station may know which block is selected, by the UE, among the SS/PBCH blocks, and may know that the UE has monitored the control resource set #0 corresponding to (or associated with) the selected SS/PBCH block.

Subsequently, DCI in a next generation mobile communication system (5G or NR system) is described in detail.

In the next generation mobile communication system (5G or NR system), scheduling information for uplink data (or a physical uplink data channel (a PUSCH)) or downlink data (or a physical downlink data channel (a PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field The DCI may be transmitted through a PDCCH via a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, or a random access response, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information shown below in Table 3.

TABLE 3

| |
|---|
| - Identifier for DCI formats - [1] bit |
| - Frequency domain resource assignment -[ $\lceil \log_2(N_{RB}^{UL,BWP}(N_{RB}^{UL,BWP} +1)/2) \rceil$ ] bits |
| - Time domain resource assignment - X bits |
| - Frequency hopping flag - 1 bit. |
| - Modulation and coding scheme - 5 bits |
| - New data indicator - 1 bit |
| - Redundancy version - 2 bits |
| - HARQ process number - 4 bits |
| - Transmit power control (TPC) command for scheduled PUSCH - [2] bits |
| - UL / supplementary UL (SUL) indicator - 0 or 1 bit |

DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information shown below in Table 4.

TABLE 4

| |
|---|
| - - Carrier indicator – 0 or 3 bits |
| - UL/SUL indicator – 0 or 1 bit |
| - Identifier for DCI formats – [1] bits |
| - Bandwidth part indicator – 0, 1 or 2 bits |
| - Frequency domain resource assignment |
| For resource allocation type 0, $\lceil N_{RB}^{UL,BWP} / P \rceil$ bits |
| For resource allocation type 1, $\lceil \log_2(N_{RB}^{UL,BWP}(N_{RB}^{UL,BWP} + 1)/2) \rceil$ bits |
| - Time domain resource assignment -1, 2, 3, or 4 bits |
| - Virtual resource block (VRB)-to-physical resource block (PRB) mapping – 0 or 1 bit, only for resource allocation type 1. |
| 0 bit if only resource allocation type 0 is configured; |

TABLE 4-continued 1 bit otherwise.
- Frequency hopping flag – 0 or 1 bit, only for resource allocation
type 1.
0 bit if only resource allocation type 0 is configured;
1 bit otherwise.
- Modulation and coding scheme – 5 bits
- New data indicator – 1 bit
- Redundancy version – 2 bits
- HARQ process number – 4 bits
- 1$^{st}$ downlink assignment index – 1 or 2 bits
1 bit for semi-static HARQ-ACK codebook;
2 bits for dynamic HARQ-ACK codebook with single HARQ-ACK
codebook.
- 2$^{nd}$ downlink assignment index – 0 or 2 bits
2 bits for dynamic HARQ-ACK codebook with two HARQ-ACK sub-
codebooks;
0 bit otherwise.
- TPC command for scheduled PUSCH – 2 bits

- SRS resource indicator $\left\lceil \log_2\left(\sum_{k=1}^{L_{max}} \binom{N_{SRS}}{k}\right)\right\rceil$ or $\lceil \log_2(N_{SRS})\rceil$ bits

• $\left\lceil \log_2\left(\sum_{k=1}^{L_{max}} \binom{N_{SRS}}{k}\right)\right\rceil$ bits for non-codebook based PUSCH
transmission;

• $\lceil \log_2(N_{SRS})\rceil$ bits for codebook based PUSCH transmission.
- Precoding information and number of layers -up to 6 bits
- Antenna ports – up to 5 bits
- SRS request – 2 bits
- Channel state information (CSI) request – 0, 1, 2, 3, 4, 5, or 6 bits
- Code block group (CBG) transmission information – 0, 2, 4, 6, or 8
bits
- Phase tracking reference signal (PTRS)-DMRS association – 0 or 2
bits.
- beta_offset indicator – 0 or 2 bits
- DMRS sequence initialization – 0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the following information shown below in Table 5.

TABLE 5

-    Identifier for DCI formats - [1] bit
-    Frequency domain resource assignment -[
$\lceil \log_2(N_{RB}^{DL,BWP}(N_{RB}^{DL,BWP} + 1)/2)\rceil$ ] bits
-    Time domain resource assignment - X bits
-    VRB-to-PRB mapping - 1 bit.
-    Modulation and coding scheme - 5 bits
-    New data indicator - 1 bit
-    Redundancy version - 2 bits
-    HARQ process number - 4 bits
-    Downlink assignment index - 2 bits
-    TPC command for scheduled PUCCH - [2] bits
-    Physical uplink control channel (PUCCH) resource indicator -
3 bits
-    PDSCH-to-HARQ feedback timing indicator - [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information shown below in Table 6.

TABLE 6

- Carrier indicator - 0 or 3 bits
- Identifier for DCI formats - [1] bits
- Bandwidth part indicator - 0, 1 or 2 bits TABLE 6-continued

Figure 4:
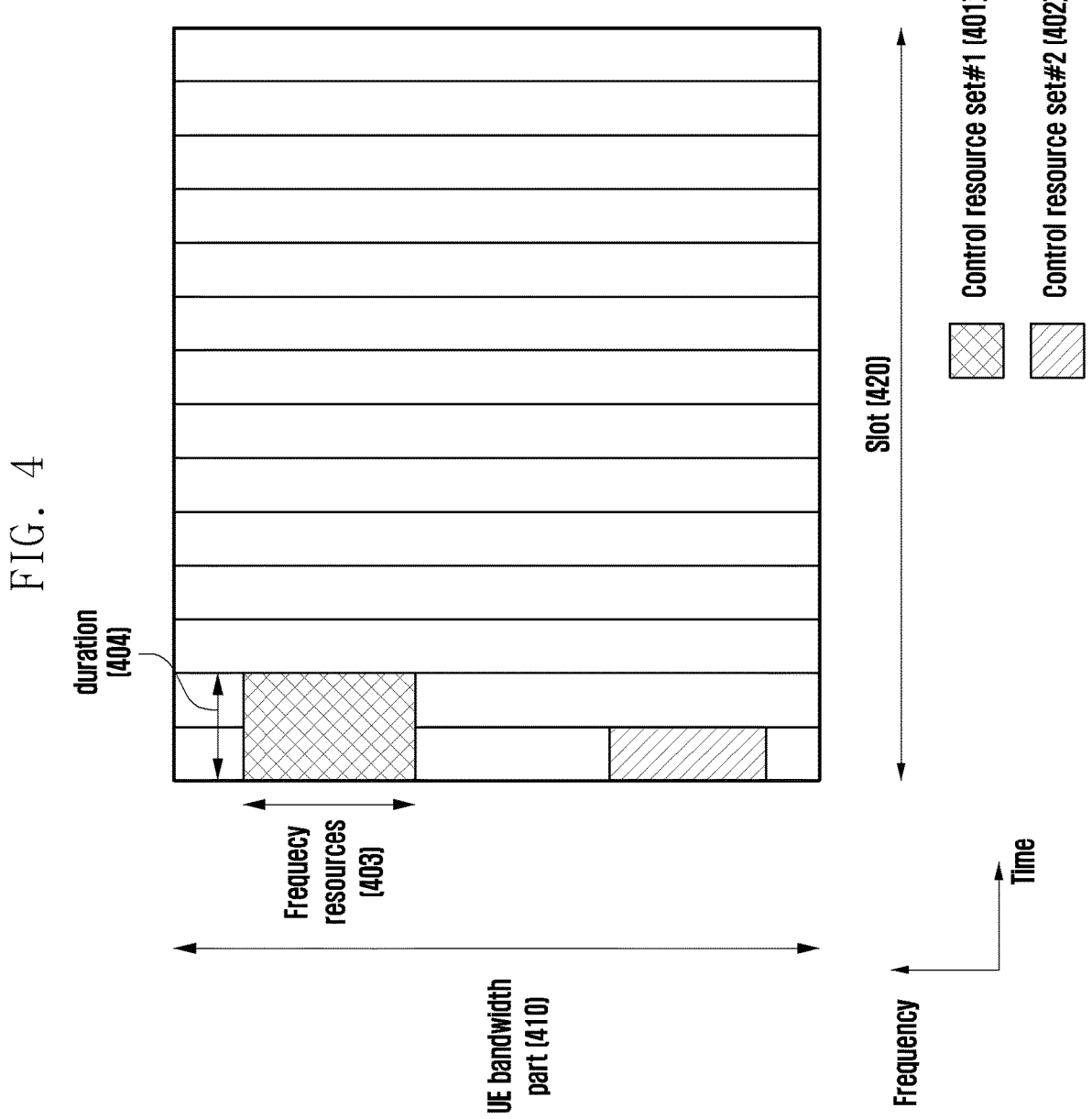
FIG. 4 illustrates an example of a configuration of a control region of a downlink control channel in a wireless communication system according to an embodiment of the disclosure.

- Frequency domain resource assignment
For resource allocation type 0, $\lceil N_{RB}^{DL,BWP} / P\rceil$ bits
For resource allocation type 1, $\lceil \log_2(N_{RB}^{DL,BWP}(N_{RB}^{DL,BWP} +1)/2)\rceil$ bits
- Time domain resource assignment -1, 2, 3, or 4 bits
- VRB-to-PRB mapping - 0 or 1 bit, only for resource allocation type 1.
0 bit if only resource allocation type 0 is configured;
1 bit otherwise.
- PRB bundling size indicator - 0 or 1 bit
- Rate matching indicator - 0, 1, or 2 bits
- Zero power (ZP) CSI-reference signal (RS) trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- Code block group (CBG) transmission information - 0, 2, 4, 6, or 8 bits
- CBG flushing out information - 0 or 1 bit
- DMRS sequence initialization - 1 bit FIG. 4 is a diagram for describing a control region configuration of a downlink control channel in a next generation wireless communication system according to an embodiment of the disclosure. Specifically, FIG. 4 illustrates an example of a control resource set (CORESET) in which a downlink control channel is transmitted in 5G wireless communication systems according to an embodiment of the disclosure.

Referring to FIG. 4, a UE bandwidth part 410 is configured in the frequency axis and two control resource sets (control resource set #1 401 and control resource set #2 402) are configured within 1 slot 420 in the time axis. The control resource sets 401 and 402 may be configured in specific frequency resources 403 within a total UE BWP 410 in the frequency axis. The control resource set may be configured as one or a plurality of OFDM symbols in the time axis, which may be defined as a control resource set duration 404. Referring to FIG. 4, control resource set #1 401 may be configured as a control resource set duration of 2 symbols, and control resource set #2 402 may be configured as a control resource set duration of 1 symbol.

The control resource sets in the next generation wireless communication system (5G or NR system) may be configured through higher-layer signaling (for example, system information, a master information block (MIB), or radio resource control (RRC) signaling) in the UE by the BS. Configuring the control resource set in the UE may mean providing information such as a control resource set identity, a frequency location of the control resource set, and a symbol length of the control resource set. For example, the following information as in Table 7 may be included.

TABLE 7

ControlResourceSet ::=                 SEQUENCE {
    -- Corresponds to L1 parameter 'CORESET-ID'
    controlResourceSetId
    ControlResourceSetId,
    (control resource set identity)
    frequencyDomainResources           BIT STRING (SIZE
(45)), TABLE 7-continued

```
(frequency axis resource allocation information)
    duration                                INTEGER
(1..maxCoReSetDuration),
    (time axis resource allocation information)
    cce-REG-Mapping Type
    CHOICE {
(CCE-to-REG mapping scheme)
        interleaved
    SEQUENCE {
        reg-BundleSize
    ENUMERATED {n2, n3, n6},
    (REG bundle size)
        precoderGranularity
    ENUMERATED {sameAsREG-bundle, allContiguousRBs},
        interleaverSize
    ENUMERATED {n2, n3, n6}
        (interleaver size)
        shiftIndex
    INTEGER(0..maxNrofPhysicalResourceBlocks-1)
            OPTIONAL
        (interleaver shift)
    },
    nonInterleaved                            NULL
    },
    tci-StatesPDCCH
    SEQUENCE(SIZE (1..maxNrofTCI-StatesPDCCH)) OF TCI-StateId
        OPTIONAL,
    (QCL configuration information)
        tci-PresentInDCI                      ENUMERATED
{enabled}
        OPTIONAL, -- Need S
}
```

In Table 7, tci-StatesPDCCH (referred to as a transmission configuration indication (TCI) state) configuration information may include information on one or a plurality of synchronization signal (SS)/physical broadcast channel (PBCH) block indexes or channel state information reference signal (CSI-RS) indexes having the Quasi Co-Located (QCL) relationship with a DMRS transmitted in the corresponding CORESET. Further, TCI state setting information may include information on what kind of QCL relationship is. For example, the setting of the TCI state may include information as Table 8 below.

TABLE 8

```
TCI-State ::=                            SEQUENCE {
    tci-StateId                            TCI-StateId,
    (ID of corresponding TCI state)
    qcl-Type1                              QCL-Info,
    (QCL information of first reference RS of RS (target RS) referring to
corresponding TCI state ID)
    qcl-Type2                              QCL-Info
        OPTIONAL, -- Need R
    (QCL information of second reference RS of RS (target RS) referring to
corresponding TCI state ID)
    ...
}
QCL-Info ::=                             SEQUENCE {
    cell                                   ServCellIndex
        OPTIONAL, -- Need R
    (serving cell index of reference RS indicated by corresponding QCL
information)
    bwp-Id                                 BWP-Id
        OPTIONAL, -- Cond CSI-RS-Indicated
    (BWP index of reference RS indicated by corresponding QCL
information)
    referenceSignal                        CHOICE {
        csi-rs                             NZP-CSI-RS-
ResourceId,
        ssb                                SSB-
Index
    (one of CSI-RSI ID or SSB ID indicated by corresponding QCL
information)
    },
```

TABLE 8-continued

```
    qcl-Type                             ENUMERATED
{typeA, typeB, typeC, typeD},
    ...
}
```

Referring to TCI state setting, the cell index and/or BWP index of the reference RS and the QCL type may be configured with the index of the reference RS in the QCL relationship, that is, the SS/PBCH block index or the CSI-RS index. QCL type refers to channel characteristics that are assumed to be shared between the reference RS and the control region DMRS. Examples of possible QCL types are as follows.

QCL typeA: Doppler shift, Doppler spread, average delay, delay spread.

QCL typeB: Doppler shift, Doppler spread.

QCL typeC: Doppler shift, average delay.

QCL typeD: Spatial Rx parameter.

The TCI state may be similarly set for not only the control region DMRS but also other target RSs, such as PDSCH DMRS and CSI-RS, but detailed descriptions are omitted in order not to obscure the point of explanation.

Figure 5A:
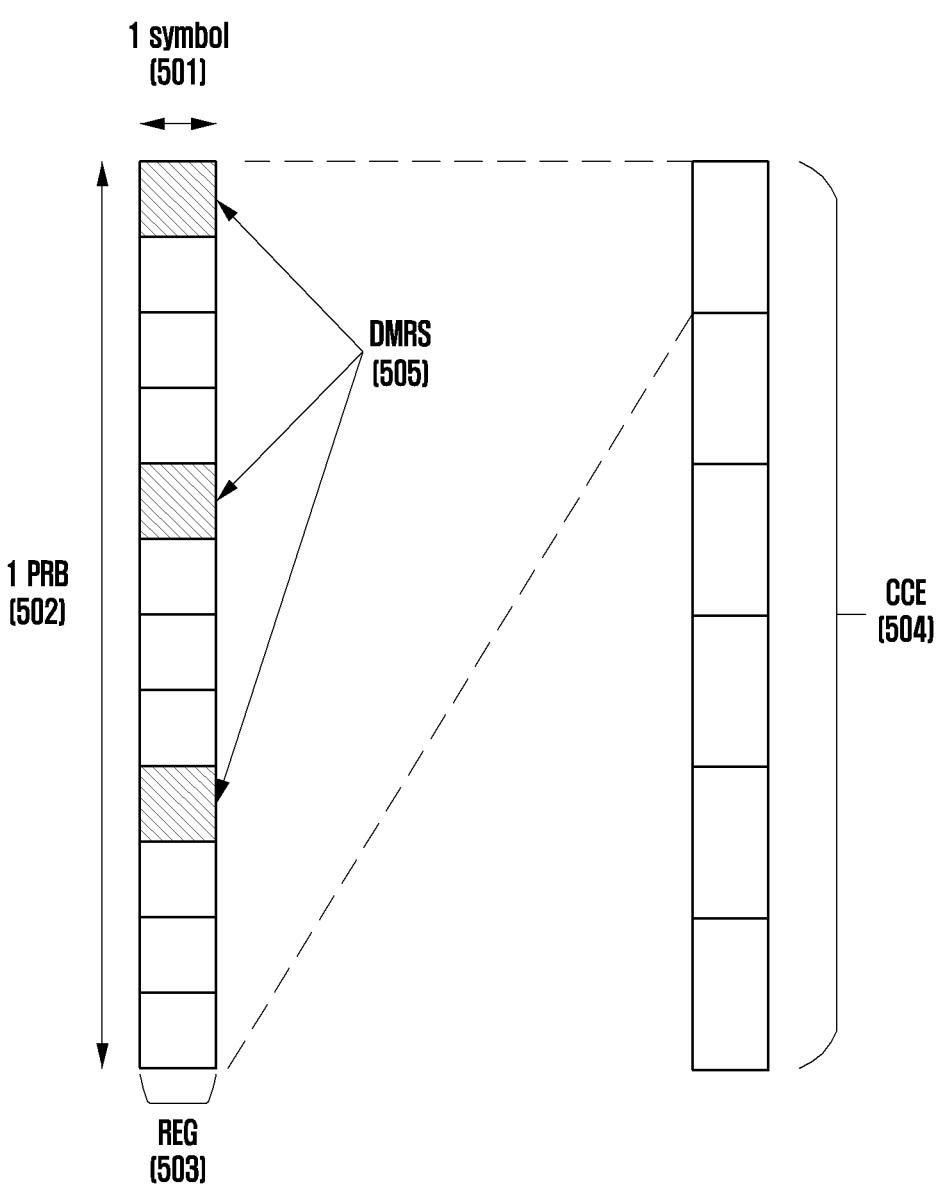
FIG. 5A illustrates a structure of a downlink control channel in a wireless communication system according to an embodiment of the disclosure.

FIG. 5A illustrates a structure of a downlink control channel in a wireless communication system according to an embodiment of the disclosure. That is, FIG. 5A illustrates an example of a basic unit of time and frequency resources configuring a downlink control channel that can be used in 5G according to an embodiment of the disclosure.

Referring to FIG. 5A, the basic unit of time and frequency resources configuring a control channel may be defined as a resource element group (REG) 503. The REG 503 may be defined by 1 OFDM symbol 501 in time axis and one physical resource block (PRB) 502, that is, 12 subcarriers, in frequency axis. The base station may concatenate the REG 503 to configure a downlink control channel allocation unit.

Referring to FIG. 5A, when a basic unit to which a downlink control channel is allocated in 5G is referred to as a control channel element (CCE) 504, 1 CCE 504 may include multiple REGs 503. For example, when the REG 503 may include 12 Res and 1 CCE 504 includes 6 REGs 503, shown in FIG. 5A, 1 CCE 504 may include 72 Res. When the downlink control resource set is configured, the corresponding region may include multiple CCEs 504. A specific downlink control channel may be transmitted after being mapped to one or more CCEs 504 according to an aggregation level (AL) in the control resource set. The CCEs 504 in the control resource set are distinguished by numbers. Here, the numbers of the CCEs 504 may be assigned according to a logical mapping scheme.

The basic unit of the downlink control channel shown in FIG. 5A, that is, the REG 503 may include both Res to which DCI is mapped and a region to which a DMRS 505 which is a reference signal for decoding the DCI is mapped. Referring to FIG. 4, three DMRSs 505 may be transmitted in 1 REG 503. The number of CCEs 504 required for transmission of the PDCCH may be 1, 2, 4, 8, or 16 according to the aggregation level (AL). A different number of CCEs 504 may be used to implement link adaptation of the downlink control channel. For example, in case that AL=L, one downlink control channel may be transmitted through L CCEs 504.

The UE needs to detect a signal in a state in which the UE does not know information about the downlink control channel, and a search space indicating a set of CCEs 504 may be defined for blind decoding. The search space is a set of downlink control channel candidates including CCEs that the UE has to attempt to decode at a given AL. Since there are various Als that make one bundle of 1, 2, 4, 8, or 16 CCEs, the UE may have multiple search spaces. A search space set may be defined as a set of search spaces at all configured Als.

The search space may be classified into a common search space and a UE-specific search space. According to another embodiment of the disclosure, a predetermined group of UEs or all the UEs may examine the common search space of the PDCCH in order to receive cell common control information, such as dynamic scheduling of system information or a paging message.

For example, the UE may receive PDSCH scheduling allocation information for transmission of the SIB including cell operator information and the like by examining the common search space of the PDCCH. In a case of the common search space, since a predetermined group of UEs or all the UEs need to receive the PDCCH, the common search space may be defined as a set of previously promised CCEs. On the other hand, the UE may receive scheduling allocation information about the UE-specific PDSCH or PUSCH by examining the UE-specific search space of the PDCCH. The UE-specific search space may be UE-specifically defined as a function of the UE identity and various system parameters.

In 5G, the parameter for the search space of the PDCCH may be configured for the UE by from base station via higher layer signaling (e.g., SIB, MIB, and RRC signaling). For example, the base station may configure, in the UE, the number of PDCCH candidates at each aggregation level L, the monitoring periodicity for the search space, monitoring occasion of symbol units in the slots for the search space, the search space type (common search space or UE-specific search space), a combination of RNTI and DCI format to be monitored in the search space, a control resource set index to monitor the search space, and the like. For example, the configuration information described above may include the following pieces of information of Table 9 below.

TABLE 9

```
SearchSpace ::=                              SEQUENCE {
    -- Identity of the search space. SearchSpaceId = 0 identifies the
SearchSpace configured via PBCH (MIB) or
ServingCellConfigCommon.
    searchSpaceId
    SearchSpaceId,
    (search space identifier)
    controlResourceSetId
    ControlResourceSetId,
    (control resource set identifier)
    monitoringSlotPeriodicityAndOffset       CHOICE {
    (monitoring slot level period)
        sl1
    NULL,
        sl2
    INTEGER (0..1),
        sl4
    INTEGER (0..3),
        sl5
    INTEGER (0..4),
        sl8
    INTEGER (0..7),
        sl10
    INTEGER (0..9),
        sl16
    INTEGER (0..15),
        sl20
    INTEGER (0..19)
    }
                                             OPTIONAL,
```

TABLE 9-continued

```
duration (monitoring length)                INTEGER (2..2559)
monitoringSymbolsWithinSlot                 BIT
STRING (SIZE (14))
        OPTIONAL,
(monitoring symbol within slot)
nrofCandidates
SEQUENCE {
(number of PDCCH candidates at each aggregation level)
    aggregationLevel1
ENUMERATED {n0, n1, n2, n3, n4, n5, n6, n8},
    aggregationLevel2
ENUMERATED {n0, n1, n2, n3, n4, n5, n6, n8},
    aggregationLevel4
ENUMERATED {n0, n1, n2, n3, n4, n5, n6, n8},
    aggregationLevel8
ENUMERATED {n0, n1, n2, n3, n4, n5, n6, n8},
    aggregationLevel16
ENUMERATED {n0, n1, n2, n3, n4, n5, n6, n8}
},
searchSpaceType
CHOICE {
(search space type)
    -- Configures this search space as common search space (CSS)
and DCI formats to monitor.
    Common
SEQUENCE {
(common search space)
    }
        ue-Specific
SEQUENCE {
(UE-specific search space)
        -- Indicates whether the UE monitors in this USS for DCI
formats 0-0 and 1-0 or for formats 0-1 and 1-1.
        Formats
        ENUMERATED {formats0-0-And-1-0, formats0-1-And-1-1},
        ...
    }
```

The base station may configure one or more search space sets for the UE based on configuration information. According to yet another embodiment of the disclosure, the base station may configure search space set 1 and search space set 2 in the UE. The base station may configure search space set 1 and search space set 2 in the UE, DCI format A scrambled by X-RNTI in the search space set 1 may be configured to be monitored in the common search space, DCI format B scrambled by Y-RNTI in the search space set 2 may be configured to be monitored in a UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

In the common search space, the following combinations of the DCI format and the RNTI may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages described below.

Cell RNTI (C-RNTI): For UE-specific PDSCH scheduling

Temporary Cell RNTI (TC-RNTI): For UE-specific PDSCH scheduling

Configured Scheduling RNTI (CS-RNTI): For semi-statically configured UE-specific PDSCH scheduling Random access RNTI (RA-RNTI): For PDSCH scheduling in random access operation Paging RNTI (P-RNTI): For scheduling of PDSCH through which paging is transmitted System information RNTI (SI-RNTI): For PDSCH scheduling in which system information is transmitted Interruption RNTI (INT-RNTI): For notifying of whether to puncture PDSCH Transmit power control for PUSCH RNTI (TPC-PUSCH-RNTI): For indication of power control command for PUSCH Transmit power control for PUCCH RNTI (TPC-PUCCH-RNTI): For indication of power control command for PUCCH Transmit power control for SRS RNTI (TPC-SRS-RNTI): For indication of power control command for SRS In a further embodiment, the above-described DCI formats may be defined as shown in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to still another embodiment of the disclosure, in 5G, multiple search space sets may be configured with different parameters (e.g., parameters in Table 8). Accordingly, the set of search space sets monitored by the UE may differ at each time point. For example, in case that search space set #1 is configured with a X-slot period, search space set #2 is configured with a Y-slot period, and X and Y are different, the UE may monitor both search space set #1 and space set #2 in a specific slot, and may monitor one of search space set #1 and search space set #2 in a specific slot.

When a plurality of search space sets are configured for the UE, the following conditions may be considered in order to determine a search space set to be monitored by the UE.

Condition 1: Limit the maximum number of PDCCH candidates

The number of PDCCH candidates that can be monitored per slot may not exceed $M^\mu$. The $M^\mu$ may be defined as the maximum number of PDCCH candidates per slot in a cell configured to a subcarrier spacing of $15 \cdot 2^\mu$ kHz, and may be defined as shown in Table 11 below.

TABLE 11

| μ | Maximum number of PDCCH candidates per slot and per serving cell ($M^\mu$) |
|---|---|
| 0 | 44 |
| 1 | 36 |
| 2 | 22 |
| 3 | 20 |

Condition 2: Limit the maximum number of CCEs

The number of CCEs configuring the entire search space per slot (here, the entire search space may denote the entire set of CCEs corresponding to a union region of multiple search space sets) may not exceed $C^\mu$. The $C^\mu$ may be defined as the maximum number of CCEs per slot in a cell configured to a subcarrier spacing of $15 \cdot 2^\mu$ kHz, and may be defined as shown in Table 12 below.

TABLE 12

| μ | Maximum number of non-overlapped CCEs per slot and per serving cell ($C^\mu$) |
|---|---|
| 0 | 56 |
| 1 | 56 |
| 2 | 48 |
| 3 | 32 |

For the convenience of description, a situation in which both conditions 1 and 2 are satisfied at a specific time point is defined as "condition A". Therefore, not satisfying condition A may refer to not satisfying at least one of the above conditions 1 and 2.

According to the configuration of the search space sets of the base station, a case in which condition A is not satisfied at a specific time point may occur. If condition A is not satisfied at a specific time point, the UE may select and monitor only some of the search space sets configured to satisfy condition A at a corresponding time point, and the base station may transmit PDCCH to the selected search space sets.

According to an embodiment of the disclosure, a method of selecting some search spaces from the entire configured search space set may conform to the following method.

Method 1

If condition A for PDCCH is not satisfied at a specific time point (slot), the UE (or base station) may prioritize the selection of a search space set, in which a search space type is configured as a common search space, from among search space sets existing at a corresponding time point, than a search space set in which a search space type is configured as a UE-specific search space.

If all search space sets configured as common search spaces are selected (i.e., if condition A is satisfied even after all search spaces configured as common search spaces are selected), the UE (or base station) may select the search space sets configured as UE-specific search spaces. Here, if there are multiple search space sets configured as the UE-specific search spaces, a search space set having a low search space set index may have a higher priority. In consideration of the priority, the UE or base station may select the UE-specific search space sets within a range in which condition A is satisfied.

A control resource set p and a search space of an aggregation level L in a search space set s in a 5G may be expressed as Equation 1 below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p} / L \rfloor \right\} + i \qquad \text{Equation 1}$$

L: aggregation level $n_{CI}$: carrier index $N_{CCE,p}$: total number of CCEs existing within control resource set p $n_{s,f}^{\mu}$: slot index $M_{p,s,max}^{(L)}$: a number of PDCCH candidates for aggregation level L $m_{s,n_{CI}} = 0, \ldots, m_{s,n_{CI}}^{(L)} - 1$, index of PDCCH candidates for aggregation level L $i = 0, \ldots, L-1$ $Y_{p,n_{s,f}^{\mu}} = (A_p \cdot Y_{p,n_{s,f}^{\mu}+1}) \bmod D$, $Y_{p-1} = n_{RNTI} \neq 0$, $A_0 = 39827$ $A_1 = 39829$, $A_2 = 39839$, $D = 65537$.

$n_{RNTI}$: terminal identity

For a common search space, $Y_{p,n_{s,f}^{\mu}}$ may correspond to 0.

For a UE-specific search space, the value of $Y_{p,n_{s,f}^{\mu}}$ may correspond to a value varying depending on the terminal's identity (C-RNTI or ID configured for the terminal by the base station) and the time index.

In the 5G, a set of search space sets monitored by the UE at every time point may vary as a plurality of search space sets can be configured as different parameters (for example, the parameters in Table 9). For example, when search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

The UE may report a UE capability in the case in which a plurality of PDCCH monitoring locations exist within the slot and, at this time, the concept "span" may be used. The span is consecutive symbols in which the UE can monitor a PDCCH within the slot, and each PDCCH monitoring location may be within 1 span. The span may be expressed by (X,Y), in which X refers to the minimum number of symbols which should be spaced apart between first symbols of two consecutive spans and Y refers to the number of consecutive symbols for monitoring a PDCCH within 1 span. At this time, the UE may monitor the PDCCH in a section within Y symbols from the first symbol of the span within the span.

Figure 5B:
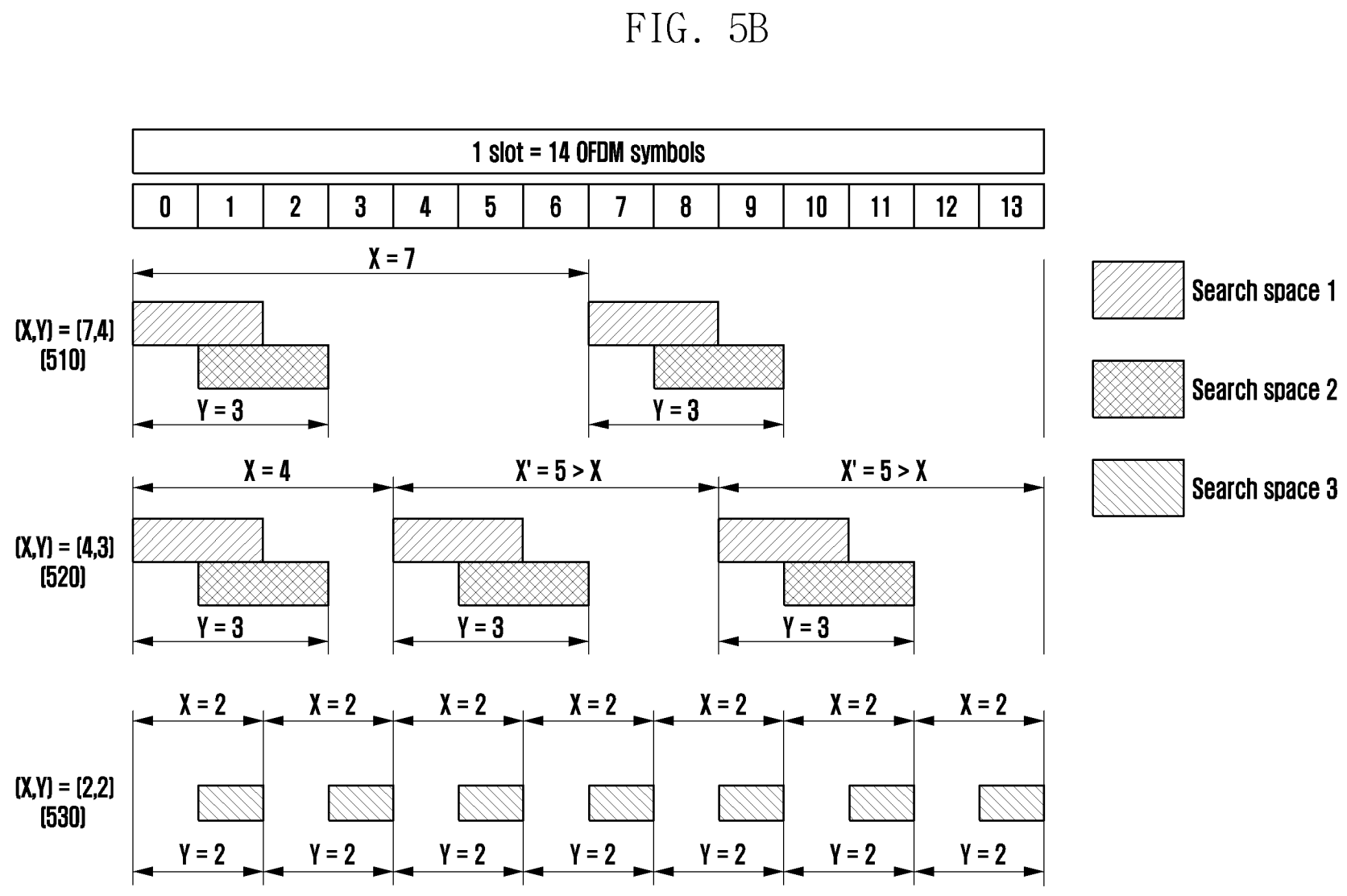

FIG. 5B illustrates the case in which the UE may have a plurality of PDCCH monitoring locations within the slot through the span in a wireless communication system according to an embodiment of the disclosure.

Referring to FIG. 5B, the span can be expressed by (X,Y)=(7,4), (4,3), and (2,2), and the three cases are expressed as (510), (520), and (530) in FIG. 5B. For example, (510) indicates the case in which the number of spans which can be expressed by (7,4) is 2 in the slot. An interval between first symbols of the 2 spans is expressed as X=7, a PDCCH monitoring location may exist within a total of Y=3 symbols from the first symbol of each span, and search spaces 1 and 2 exist within Y=3 symbols. In another example, (520) indicates the case in which a total number of spans which can be expressed by (4,3) is 3 in the slot, and an interval between a second span and a third span is X'=5 symbols larger than X=4. (530) indicates the case in which a total number of spans which can be expressed by (2,2) is 7 in the slot, PDCCH monitoring occasion may be located within total Y=2 symbols from the first symbol of each span, and search space 3 is located within Y=2 symbols.

Subsequently, time and frequency resource allocation methods for data transmission in the NR system are described.

In the NR system, in addition to frequency domain resource candidate allocation through BWP indication, the following detailed frequency domain resource allocation methods (FD-RA) may be provided.

Figure 6:
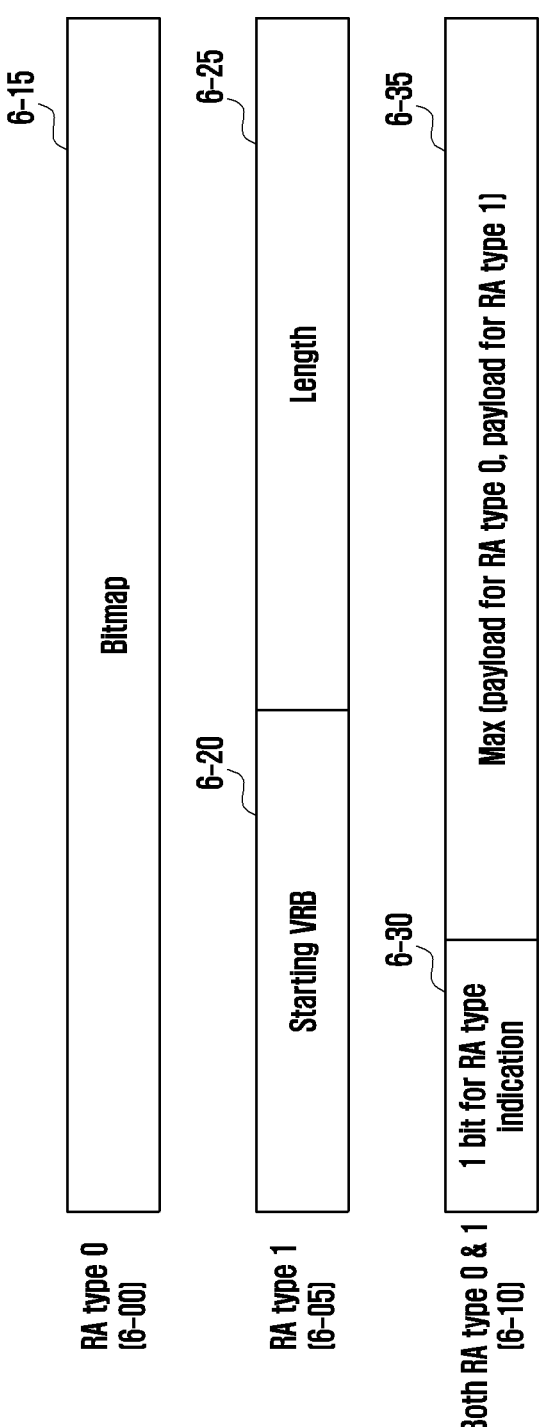
FIG. 6 illustrates an example of frequency axis resource allocation of a physical downlink shared channel (PDSCH) according to an embodiment of the disclosure.

FIG. 6 illustrates an example of frequency-domain resource allocation of a physical downlink shared channel (PDSCH) in a wireless communication system according to an embodiment of the disclosure.

FIG. 6 shows three frequency-domain resource allocation methods of type 0 (6-00), type 1 (6-05), and dynamic switch (6-10) configurable through a higher layer in NR.

Referring to FIG. 6, in case that a UE is configured to use only resource type 0 via higher layer signaling (indicated by reference numeral 6-00), some downlink control information (DCI) for allocation of PDSCH to the corresponding UE includes a bitmap configured by NRBG bits. Conditions for this will be described again later. Here, NRBG denotes the number of resource block groups (RBGs) determined as shown in Table 13 below according to a BWP size allocated by a BWP indicator and a higher layer parameter rbg-Size, and data is transmitted to RBG indicated as "1" by the bitmap.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 via higher layer signaling (indicated by reference numeral 6-05), some DCI for allocation of the PDSCH to the UE includes frequency-domain resource allocation information configured by $\lceil \log_2(N_{RB}^{DL,BWP}(N_{RB}^{DL,BWP}+1)/2 \rceil$ bits. Conditions for this will be described again later. Through this information, the base station may configure a starting VRB 6-20 and the length of frequency-domain resources 6-25 continuously allocated therefrom.

In case that the UE is configured to use both resource type 0 and resource type 1 via higher layer signaling (indicated by reference numeral 6-10), some DCI for allocation of PDSCH to the UE includes frequency-domain resource allocation information configured by bits of a greater value 6-35 among a payload 6-15 for configuration of resource type 0 and payloads 6-20 and 6-25 for configuration of resource type 1, and a condition for the above configuration will be described later. Here, one bit 6-30 may be added to the most significant bit (MSB) of the frequency-domain resource allocation information in the DCI, when the corresponding bit has a value of 0, it may indicate that resource type 0 is used, and when the corresponding bit has a value of 1, it may indicate that resource type 1 is used.

Hereinafter, a method of allocating time domain resources for a data channel in a next-generation mobile communication system (5G or NR system) will be described.

A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling). With regard to PDSCH, a table including maxNrofDL-Allocations=16 entries may be configured, and with regard to PUSCH, a table including maxNrofUL-Allocations=16 entries may be configured. In another embodiment, the time-domain resource allocation information may include PDCCH-to-PDSCH slot timing (corresponding to a time gap in slot units between a time point of receiving a PDCCH and a time point of transmitting a PDSCH scheduled by the received PDCCH, and denoted as K0), PDCCH-to-PUSCH slot timing (corresponding to a time gap in slot units between a time point of receiving a PDCCH and a time point of transmitting a PUSCH scheduled by the received PDCCH, and denoted as K2), information on the position and length of a start symbol for which the PDSCH or PUSCH is scheduled within a slot, a mapping type of PDSCH or PUSCH, and the like. For example, the base station may notify the UE of information such as Table 14 or Table 15 below.

TABLE 14

PDSCH-TimeDomainResourceAllocationList information element
PDSCH-TimeDomainResourceAllocationList ::= SEQUENCE (SIZE(1..
maxNrofDL-Allocations)) OF PDSCH-TimeDomainResourceAllocation
PDSCH-TimeDomainResourceAllocation ::= SEQUENCE {
  k0 INTEGER (0..32)
  OPTIONAL, --Need S
  (PDCCH-to-PDSCH timing, slot units)
  mapping type ENUMERATED {typeA, typeB},
  (PDSCH mapping type)
  startSymbolAndLength INTEGER (0..127)
  (Start symbol and length of PDSCH)
}

TABLE 15

PUSCH-TimeDomainResourceAllocation information element
    PUSCH-TimeDomainResourceAllocationList ::= SEQUENCE
(SIZE(1..maxNrofUL-Allocations)) OF
PUSCH-TimeDomainResourceAllocation
PUSCH-TimeDomainResourceAllocation ::= SEQUENCE {
    k2 INTEGER (0..32)
    OPTIONAL, --Need S
  (PDCCH-to-PUSCH timing, slot units)
    mapping type ENUMERATED {typeA, typeB},
    (PUSCH mapping type)
    startSymbolAndLength INTEGER (0..127)
    (Start symbol and length of PUSCH)
    }

The base station may notify the UE of one of the entries in the above-described table regarding the time-domain resource allocation information to via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 7:
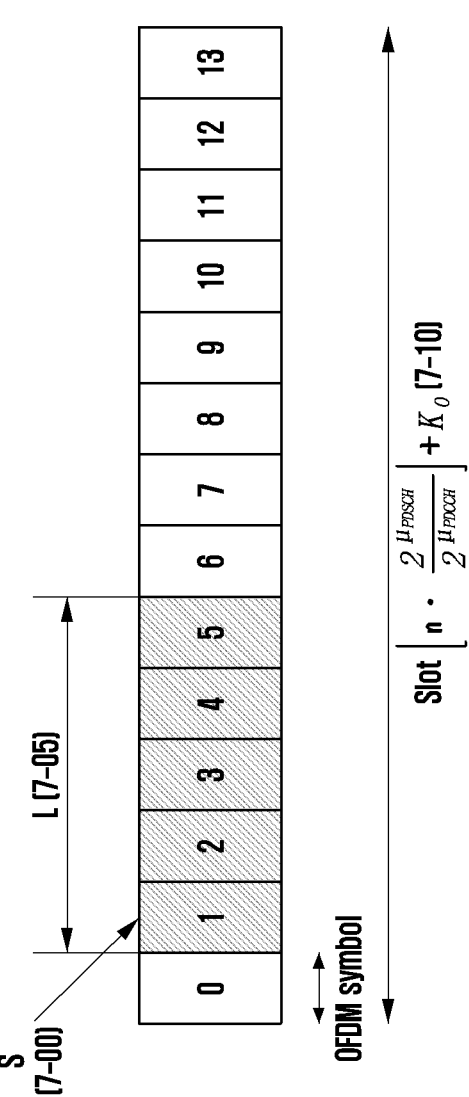
FIG. 7 illustrates an example of allocation of time axis resources of a PDSCH in a wireless communication system according to an embodiment of the disclosure.

FIG. 7 illustrates an example of time-domain resource allocation of a PDSCH in a wireless communication system according to an embodiment of the disclosure.

Referring to FIG. 7, a base station may indicate a time-domain position of a PDSCH resource according to a start position 7-00 and a length 7-05 of an OFDM symbol in one slot 7-10, dynamically indicated based on the subcarrier spacing (SCS) ($\mu_{PDSCH}$, $\mu_{PDCCH}$) of a data channel and a control channel configured using a higher layer, the value of a scheduling offset ($K_0$), and DCI.

Figure 8:
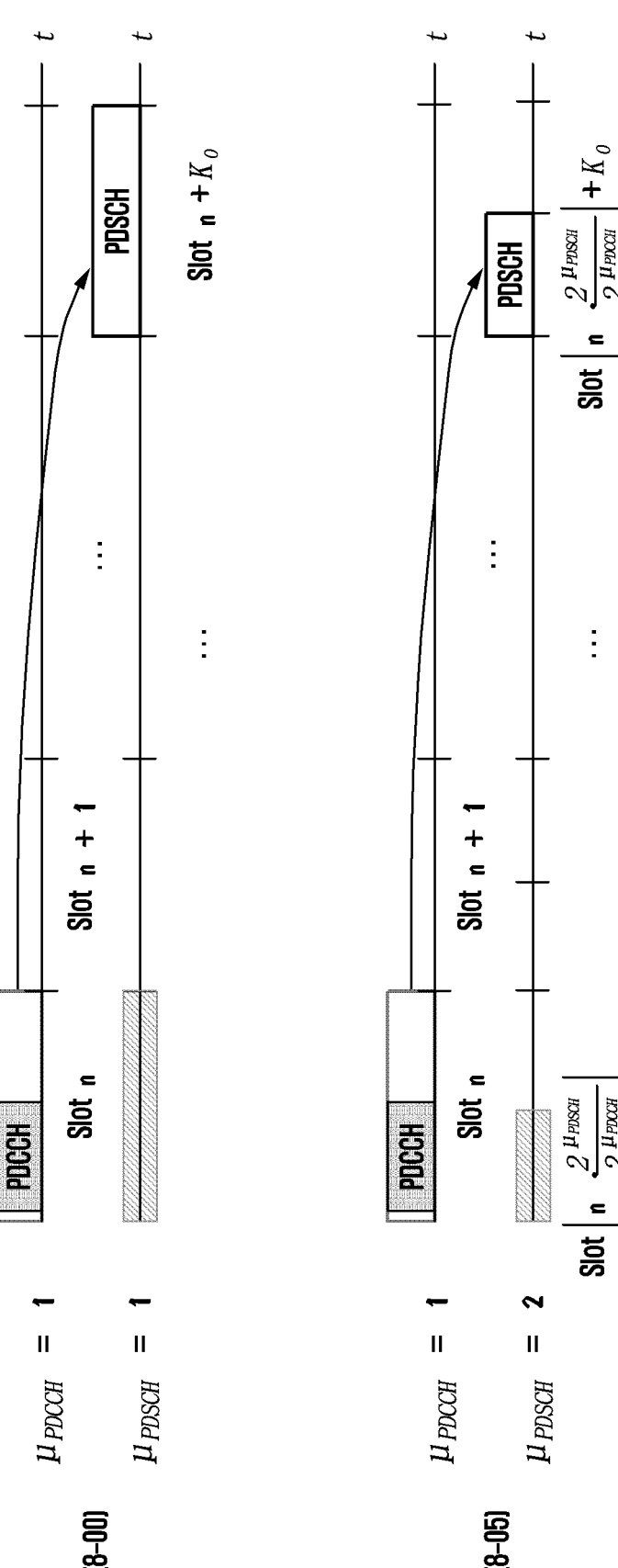
FIG. 8 illustrates an example of allocation of time-axis resources according to subcarrier spacing of a data channel and a control channel in a wireless communication system according to an embodiment of the disclosure.

FIG. 8 illustrates an example of time-domain resource allocation according to a subcarrier spacing of a data channel and a control channel in a wireless communication system according to an embodiment of the disclosure.

Referring to FIG. 8, if a data channel and a control channel have the same subcarrier spacing (8-00, $\mu_{PDSCH}=\mu_{PDCCH}$) since a data slot number and a control slot number are the same, a base station and a UE may recognize that a scheduling offset occurs in accordance with predetermined slot offset $K_0$. On the other hand, when the subcarrier spacing of the data channel and the subcarrier spacing of the control channel are different (8-05, $\mu_{PDSCH}\neq\mu_{PDCCH}$), a data slot number and a control slot number are different, and thus the base station and the UE may recognize that a scheduling offset occurs in accordance with predetermined slot offset $K_0$ based on the subcarrier spacing of the PDCCH.

In a LTE system or NR system, the UE may perform a procedure for reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The message may include a UE capability request for each radio access technology (RAT) type of the BS. The request for each RAT type may include supported frequency band combination information. In the case of UE capability enquiry message, a plurality of UE capabilities for respective RAT types may be requested through one RRC message container transmitted by the BS or the BS may insert the UE capability enquiry message including the UE capability request for each RAT type multiple times and transmit the same to the UE. That is, the UE capability enquiry is repeated multiple times within one message and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. The UE capability enquiry message is generally transmitted initially after the UE is connected to the BS, but may be requested at any time when the BS needs the same.

The UE receiving the request for the UE capability report from the BS may configure a UE capability according to RAT type and band information requested by the BS. A method by which the UE configures the UE capability in a NR system is described below.

1. When the UE receives a list of LTE and/or NR bands from the BS through a UE capability request, the UE configures a band combination (BC) for EN-DC and NR stand alone (SA). That is, the UE configures a candidate list of BCs for EN-DC and NR SA on the basis of requested bands in FreqBandList. The bands sequentially have priorities as stated in FreqBandList.

2. When the BS sets a "eutra-nr-only" flag or an "eutra" flag and makes a request for the UE capability report, the UE completely removes NR SA BCs from the configured candidate list of BCs. Such an operation may occur only when the LTE BS (eNB) makes a request for an "eutra" capability.

3. Thereafter, the UE removes fallback BCs from the candidate list of BCs configured in the above stage. The fallback BC is a BC which can be obtained by removing a band corresponding to at least one SCell from a predetermined BC, and a BC before the removal of the band corresponding at least one SCell can cover the fallback BC and thus the fallback BC can be omitted. This stage is applied to MR-DC, that is, LTE bands. BCs left after the stage are a final "candidate BC list".

4. The UE selects BCs suitable for a requested RAT type in the final "candidate BC list" and selects BCs to be reported. In this stage, the UE configures supported-BandCombinationList according to a determined order. That is, the UE configures BCs and UE capability to be reported according to an order of a preset rat-Type (nr→eutra-nr→eutra). Further, the UE configures featureSetCombination for the configured supportedBand-CombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

5. When the requested rat Type is eutra-nr and influences, featureSetCombinations are included in all of the two containers of UE-MRDC-Capabilities and UE-NR-Capabilities. However, the NR feature set includes only UE-NR-Capabilities.

After configuring the UE capability, the UE may transfer a UE capability information message including the UE capability to the BS. The BS may perform scheduling for the corresponding UE and transmission/reception management on the basis of the UE capability received from the UE.

In the NR system, the terminal transmits uplink control information (UCI) to the base station through physical uplink control channel (PUCCH). The control information may include at least one of HARQ-ACK indicating success or failure of demodulation/decoding for a transport block (TB) received by the UE through the PDSCH, scheduling request (SR) for requesting resource allocation from the UE to the PUSCH base station for uplink data transmission, and channel state information (CSI), which is information for reporting the channel state of the terminal.

The PUCCH resource may be largely divided into a long PUCCH and a short PUCCH according to the length of the allocated symbol. In the NR, the long PUCCH has a length of 4 symbols or more in a slot, and the short PUCCH has a length of 2 symbols or less in a slot.

In more detail about the long PUCCH, the long PUCCH may be used for the purpose of improving uplink cell coverage, and thus may be transmitted in a DFT-S-OFDM scheme, which is a single carrier transmission rather than an OFDM transmission. The long PUCCH supports transmission formats such as PUCCH format 1, PUCCH format 3, and PUCCH format 4 depending on the number of support-able control information bits and whether terminal multiplexing through Pre-DFT OCC support at the front end of the IFFT is supported.

First, the PUCCH format 1 is a DFT-S-OFDM-based long PUCCH format capable of supporting up to 2 bits of control information, and uses as much frequency resources as 1RB. The control information may be constituted with each of or a combination of HARQ-ACK and SR. In PUCCH format 1, an OFDM symbol including a demodulation reference signal (DMRS) that is a demodulation reference signal (or a reference signal) and an OFDM symbol including UCI are repeatedly constituted.

For example, in the case that the number of transmission symbols of PUCCH format 1 is 8 symbols, the first start symbol of 8 symbols is sequentially constituted with DMRS symbol, UCI symbol, DMRS symbol, UCI symbol, DMRS symbol, UCI symbol, DMRS symbol, UCI symbol. The DMRS symbol is spread using an orthogonal code (or orthogonal sequence or spreading code, $w_i(m)$ on the time axis to a sequence corresponding to the length of 1RB on the frequency axis within one OFDM symbol, and is transmitted after performing IFFT.

The UCI symbol is generated as follows. The UE has a structure to generate d(0) by BPSK modulating 1-bit control information and QPSK modulating 2-bit control information, multiply the generated d(0) by a sequence corresponding to the length of 1 RB on the frequency axis to scramble, spread the scrambled sequence using an orthogonal code (or an orthogonal sequence or spreading code, $w_i(m)$) on the time axis, and transmit the same after performing the IFFT.

The UE generates the sequence, based on the group hopping or sequence hopping configuration and the configured ID configured as a higher signal from the base station, and generates a sequence corresponding to a length of 1 RB by cyclic shifting the generated sequence with an initial cyclic shift (CS) value configured as a higher signal.

The $w_i(m)$ is determined as $$w_i(m) = e^{\frac{j2\pi\phi(m)}{N_{SF}}}$$

when the length of the spreading code ($N_{SF}$) is given, and specifically illustrated in Table 16 below. In the above, i means the index of the spreading code itself, and m means the index of the elements of the spreading code. Here, the numbers in [ ] in Table 16 mean, for example, $\phi(m)$. If the length of the spreading code is 2, and in the case that the index of the configured spreading code is i=0, the spreading code $w_i(m)$ becomes $w_i(0)=e^{j2\pi \cdot 0/N_{SF}}=1$, $w_i(1)=e^{j2\pi \cdot 0/N_{SF}}=1$, and $w_i(m)=[11]$.

TABLE 16

Spreading code for *PUCCH* format 1 $w_i(m) = e^{\frac{j2\pi\phi(m)}{N_{SF}}}$

| | $\phi$ (m) | | | | | | |
| $N_{SF}$ | i = 0 | i = 1 | i = 2 | i = 3 | i = 4 | i = 5 | i = 6 |
|---|---|---|---|---|---|---|---|
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, the PUCCH format 3 is a DFT-S-OFDM-based long PUCCH format capable of supporting more than 2 bits of control information, and the number of RB s used can be configured through an higher layer. The control information may be constituted with each of or a combination of HARQ-ACK, SR, and CSI. In the PUCCH format 3, the location of the DMRS symbol is presented according to whether frequency hopping in the slot and whether additional DMRS symbols are configured as illustrated in Table 17 below.

TABLE 17

| PUCCH | DRMS location in PUCCH format 3/4 transmission | | | |
| | Additional DRMS is not configured | | Additional DRMS is configured | |
| format 3/4 transmission length | Frequency hopping is not configured | Frequency hopping is configured | Frequency hopping is not configured | Frequency hopping is configured |
|---|---|---|---|---|
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, in the case that the number of transmission symbols of the PUCCH format 3 is 8 symbols, the first start symbol of the 8 symbols starts with 0, and the DMRS is transmitted in the first symbol and the fifth symbol. The above table is applied in the same way to the DMRS symbol location of the PUCCH format 4.

Next, the PUCCH format 4 is a DFT-S-OFDM-based long PUCCH format capable of supporting more than 2 bits of control information, and uses as much frequency resources as 1RB. The control information may be constituted with each of or a combination of HARQ-ACK, SR, and CSI. The difference between the PUCCH format 4 and the PUCCH format 3 is that in the case of the PUCCH format 4, the PUCCH format 4 of a plurality of terminals can be multiplexed within one RB. It is possible to multiplex PUCCH format 4 of a plurality of terminals through application of Pre-DFT OCC to control information in the front of the IFFT. However, the number of transmittable control information symbols of one terminal decreases according to the number of multiplexed terminals. The number of multiplexable terminals, that is, the number of different OCCs that can be used, may be 2 or 4, and the number of OCCs and the OCC index to be applied may be configured through a higher layer.

Next, the short PUCCH will be described. The short PUCCH may be transmitted in both a downlink centric slot and an uplink centric slot. In general, the short PUCCH may be transmitted at the last symbol of the slot or an OFDM symbol at the end (e.g., the last OFDM symbol, the second OFDM symbol from the end, or the last 2 OFDM symbols). Of course, it is also possible to transmit the short PUCCH at any location in the slot. In addition, the short PUCCH may be transmitted using one OFDM symbol or two OFDM symbols. The short PUCCH may be used to shorten a delay time compared to the long PUCCH in a situation where uplink cell coverage is good, and is transmitted in a CP-OFDM scheme.

The short PUCCH supports transmission formats such as PUCCH format 0 and PUCCH format 2 according to the number of supportable control information bits. First, the PUCCH format 0 is a short PUCCH format capable of supporting up to 2 bits of control information, and uses frequency resources of 1 RB. The control information may be constituted with each of or a combination of HARQ-ACK and SR. The PUCCH format 0 does not transmit DMRS, but has a structure of transmitting only sequences mapped to 12 subcarriers in the frequency axis within one OFDM symbol. The terminal generates a sequence, based on the group hopping or sequence hopping configuration and configured ID configured as a higher signal from the base station, cyclic shifts the generated sequence to the final cyclic shift (CS) value obtained by adding another CS value according to whether it is ACK or NACK to the indicated initial CS value, maps it to 12 subcarriers, and transmits the same.

For example, in the case that HARQ-ACK is 1 bit, as in the following Table 18, if it is ACK, 6 is added to the initial CS value to generate the final CS, and if it is NACK, 0 is added to the initial CS to generate the final CS. The CS value 0 for NACK and 6 for ACK are defined in the standard, and the terminal always generates PUCCH format 0 according to the value to transmit 1-bit HARQ-ACK.

TABLE 18

| 1 Bit HARQ-ACK | NACK | ACK |
|---|---|---|
| Final CS | (Initial CS + O) mod 12 = initial CS | (Initial CS + 6) mod 12 |

For example, in the case that HARQ-ACK is 2 bits, 0 is added to the initial CS value if (NACK, NACK) as in the following Table 19, and 3 is added to the initial CS value if (NACK, ACK), and if (ACK, ACK)), 6 is added to the initial CS value, and 9 is added to the initial CS value if (ACK, NACK). The CS value 0 for (NACK, NACK), the CS value 3 for (NACK, ACK), the CS value 6 for (ACK, ACK), and the CS value 9 for (ACK, NACK) are defined in the standard. The terminal always transmits a 2-bit HARQ-ACK by generating PUCCH format 0 according to the above values.

In the case that the final CS value exceeds 12 by the CS value added according to ACK or NACK to the initial CS value, since the sequence length is 12, modulo 12 is applied to the final CS value.

TABLE 19

| 2 Bit HARQ-ACK | NACK, NACK | NACK, ACK | ACK, ACK | ACK, NACK |
|---|---|---|---|---|
| Final CS | (Initial CS + O) mod 12 = initial CS | (Initial CS + 3) mod 12 | (Initial CS + 6) mod 12 | (Initial CS + 9) mod 12 |

Next, the PUCCH format 2 is a short PUCCH format that supports more than 2 bits of control information, and the number of RBs used can be configured through a higher layer. The control information may be constituted with each of or a combination of HARQ-ACK, SR, and CSI. In the PUCCH format 2, the location of the subcarrier through which the DMRS is transmitted within one OFDM symbol is fixed to the subcarrier having indexes of #1, #4, #7, and #10, when the index of the first subcarrier is #0, as shown in FIGS. 14A to 14D. The control information is mapped to the remaining subcarriers through a modulation process after channel coding except for the subcarrier where the DMRS is located.

In summary, values that may be configured for each of the above-described PUCCH formats and their ranges may be arranged as illustrated in Table 20 below. In the case that the value does not need to be configured in the Table 20, it is indicated as N.A.

slots, the terminal starts the PUCCH transmission from the first PRB index configured through startingPRB, which is higher layer signaling, in the even-numbered slot, and in the odd-numbered slot, the terminal starts the PUCCH transmission from the second PRB index configured through secondHopPRB, which is higher layer signaling. Additionally, if the terminal is configured to perform frequency hopping in PUCCH transmission in different slots, the index

TABLE 20

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A.(Default is 1) | N.A.(Default is 1) | 1-16 | 1-6, 8-10, 12, 15, 16 | N.A. (Default is 1) |
| Enabling a FH | Configurability | √ | √ | √ | √ | √ |
| | Value range | On/Off (only for 2 symbol) | On/Off | On/Off (only for 2 symbol) | On/Off | On/Off |
| Freq.cy resource of $2^{nd}$ hop if FH is enabled | Configurability | √ | √ | √ | √ | √ |
| | Value range | 0-274 | 0-274 | 0-274 | 0-274 | 0-274 |
| Index of initial cyclic shift | Configurability | √ | √ | N.A. | N.A. | N.A. |
| | Value range | 0-11 | 0-11 | N.A. | 0-11 | 0-11 |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

Meanwhile, in order to improve uplink coverage, multi-slot repetition may be supported for PUCCH formats 1, 3, and 4, PUCCH repetition can be configured for each PUCCH format. The terminal repeatedly transmits the PUCCH including UCI as many as the number of slots configured through nrofSlots, which is higher layer signaling. For the repetitive PUCCH transmission, the PUCCH transmission in each slot may be performed using the same number of consecutive symbols, and the corresponding consecutive symbols may be configured through a nrofSymbols in the PUCCH-format 1, the PUCCH-format 3, or the PUCCH-format 4, which is higher layer signaling. For the repetitive PUCCH transmission, the PUCCH transmission in each slot may be performed using the same start symbol, and the corresponding start symbol may be configured through a startingSymbolIndex in the PUCCH-format 1, the PUCCH-format 3, or the PUCCH-format 4, which is higher layer signaling. For the repetitive PUCCH transmission, if the terminal has been configured to perform frequency hopping in PUCCH transmission in different slots, the terminal performs frequency hopping in units of slots. In addition, if the terminal has been configured to perform frequency hopping in the PUCCH transmission in different of the slot in which the terminal is instructed to transmit the first PUCCH is 0, and during the configured total number of repetitive PUCCH transmissions, the value of the number of repetitive PUCCH transmissions is increased in each slot regardless of the PUCCH transmission performed. If the terminal is configured to perform frequency hopping in PUCCH transmission in different slots, the terminal does not expect that frequency hopping in the slot is configured when transmitting PUCCH. If the terminal is not configured to perform frequency hopping in PUCCH transmission in different slots but is configured for frequency hopping in a slot, the first and second PRB indexes are applied equally in the slot. If the number of uplink symbols available for PUCCH transmission is less than nrofSymbols configured via higher layer signaling, a terminal may not perform PUCCH transmission. Even if the terminal fails to transmit a PUCCH for some reason in a certain slot during repetitive PUCCH transmission, the terminal may increase the number of repetitive PUCCH transmissions.

Next, the PUCCH resource configuration of the base station or terminal is described. The base station may configure PUCCH resources for each BWP through a higher layer for a specific terminal. The configuration may be as in Table 21.

TABLE 21

```
PUCCH-Config ::=        SEQUENCE {
    resourceSetToAddModList       SEQUENCE (SIZE
(1..maxNrofPUCCH-ResourceSets))    OF    PUCCH-ResourceSet
OPTIONAL, -- Need N
    resourceSetToReleaseList         SEQUENCE (SIZE
(1..maxNrofPUCCH-ResourceSets))    OF    PUCCH-ResourceSetId
OPTIONAL, -- Need N
    resourceToAddModList         SEQUENCE (SIZE
(1..maxNrofPUCCH-Resources)) OF PUCCH-Resource    OPTIONAL, -
- Need N
    resourceToReleaseList   SEQUENCE (SIZE (1..maxNrofPUCCH-
Resources)) OF PUCCH-ResourceId   OPTIONAL, -- Need N
    format1       SetupRelease { PUCCH-FormatConfig }
OPTIONAL, -- Need M
    format2       SetupRelease { PUCCH-FormatConfig }
OPTIONAL, -- Need M
    format3       SetupRelease { PUCCH-FormatConfig }
OPTIONAL, -- Need M
    format4       SetupRelease { PUCCH-FormatConfig }
OPTIONAL, -- Need M
    schedulingRequestResourceToAddModList   SEQUENCE (SIZE
(1..maxNrofSR-Resources)) OF SchedulingRequestResourceConfig
OPTIONAL, -- Need N
    schedulingRequestResourceToReleaseList   SEQUENCE (SIZE
(1..maxNrofSR-Resources)) OF SchedulingRequestResourceId
OPTIONAL, -- Need N
    multi-CSI-PUCCH-ResourceList   SEQUENCE (SIZE (1..2)) OF
PUCCH-ResourceId           OPTIONAL, -- Need M
    dl-DataToUL-ACK       SEQUENCE (SIZE (1..8)) OF INTEGER
(0..15)       OPTIONAL, -- Need M
    spatialRelationInfoToAddModList       SEQUENCE (SIZE
(1..maxNrofSpatialRelationInfos)) OF PUCCH-SpatialRelationInfo
OPTIONAL, -- Need N
    spatialRelationInfoToReleaseList       SEQUENCE (SIZE
(1..maxNrofSpatialRelationInfos)) OF PUCCH-SpatialRelationInfoId
OPTIONAL, -- Need N
    pucch-PowerControl         PUCCH-PowerControl
OPTIONAL, -- Need M
    ...,
}
```

According to the Table 21, one or a plurality of PUCCH resource sets in the PUCCH resource setting for a specific BWP may be configured, and a maximum payload value for UCI transmission may be configured in some of the PUCCH resource sets. Each PUCCH resource set may belong to one or more PUCCH resources, and each of the PUCCH resources may belong to one of the above-described PUCCH formats. For the PUCCH resource set, the maximum payload value of the first PUCCH resource set may be fixed to 2 bits, and thus the corresponding value may not be separately configured through a higher layer. In the case that the remaining PUCCH resource sets are configured, the index of the corresponding PUCCH resource set may be configured in ascending order according to the maximum payload value, and the maximum payload value may not be configured in the last PUCCH resource set. The higher layer configuration for the PUCCH resource set may be as illustrated in Table 22 below.

TABLE 22

```
-- A set with one or more PUCCH resources
PUCCH-ResourceSet ::=              SEQUENCE {
    pucch-ResourceSetId           PUCCH-ResourceSetId,
    resourceList              SEQUENCE (SIZE (1..maxNrofPUCCH-
ResourcesPerSet)) OF PUCCH-ResourceId,
    maxPayloadSize             INTEGER (4..256)
OPTIONAL -- Need R
}
```

The resourceList parameter of the Table 22 may include IDs of PUCCH resources belonging to the PUCCH resource set. If at the time of initial access or in the case that the PUCCH resource set is not configured, a PUCCH resource set as illustrated in Table 23, which is constituted with a plurality of cell-specific PUCCH resources in the initial BWP, may be used. The PUCCH resource to be used for initial access in this PUCCH resource set may be indicated through SIB 1.

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits in case of PUCCH format 0 or 1, and may be determined by symbol length, number of PRBs, and maximum code rate in case of the remaining formats. The symbol length and number of PRBs may be configured for each PUCCH resource, and the maximum code rate may be configured for each PUCCH format.

Next, PUCCH resource selection for UCI transmission is described. In the case of SR transmission, a PUCCH resource for an SR corresponding to schedulingRequestID may be configured through a higher layer as shown in Table 24. The PUCCH resource may be a resource belonging to PUCCH format 0 or PUCCH format 1.

TABLE 24

```
SchedulingRequestResourceConfig ::=           SEQUENCE {
    schedulingRequestResourceId                SchedulingRequestResourceId,
    schedulingRequestID                SchedulingRequestId,
    periodicityAndOffset                CHOICE {
        sym2                    NULL,
        sym6or7                    NULL,
        sl1                    NULL, -- Recurs in every slot
        sl2                    INTEGER (0..1),
        sl4                    INTEGER (0..3),
        sl5                    INTEGER (0..4),
        sl8                    INTEGER (0..7),
        sl10                    INTEGER (0..9),
        sl16                    INTEGER (0..15),
```

TABLE 24-continued

| | |
|---|---|
| sl20 | INTEGER (0..19), |
| sl40 | INTEGER (0..39), |
| sl80 | INTEGER (0..79), |
| sl160 | INTEGER (0..159), |
| sl320 | INTEGER (0..319), |
| sl640 | INTEGER (0..639) |
| } | OPTIONAL, |
| -- Need M | |
| resource | PUCCH-ResourceId |
| OPTIONAL -- Need M | |
| } | |

For the configured PUCCH resource, a transmission period and an offset are configured through the periodicity-AndOffset parameter of Table 24. In the case that there is uplink data to be transmitted by the terminal at a time corresponding to the configured period and offset, the corresponding PUCCH resource is transmitted, otherwise the corresponding PUCCH resource may not be transmitted. In the case of CSI transmission, a PUCCH resource for transmitting a periodic or semi-persistent CSI report through PUCCH may be configured in the pucch-CSI-ResourceList parameter as shown in Table 25 as higher signaling. The parameter includes a list of PUCCH resources for each BWP for the cell or CC to which the corresponding CSI report is to be transmitted. The PUCCH resource may be a resource belonging to PUCCH format 2 or PUCCH format 3 or PUCCH format 4

TABLE 25

| | |
|---|---|
| CSI-ReportConfig ::= | SEQUENCE { |
| reportConfigId | CSI-ReportConfigId, |
| carrier | ServCellIndex   OPTIONAL, -- Need S |
| ... | |
| reportConfigType | CHOICE { |
| periodic | SEQUENCE { |
| reportSlotConfig | CSI-ReportPeriodicityAndOffset, |
| pucch-CSI-ResourceList | SEQUENCE (SIZE |
| (1..maxNrofBWPs)) OF PUCCH-CSI-Resource | |
| }, | |
| ... | |
| } | |

For the PUCCH resource, a transmission period and an offset are configured through reportSlotConfig of Table 25. In the case of HARQ-ACK transmission, a resource set of PUCCH resources to be transmitted is first selected according to the payload of the UCI including the corresponding HARQ-ACK. That is, a PUCCH resource set having a minimum payload not smaller than the UCI payload is selected. Next, the PUCCH resource in the PUCCH resource set can be selected through the PUCCH resource indicator (PRI) in the DCI scheduling the TB corresponding to the corresponding HARQ-ACK, and the PRI may be the PUCCH resource indicator specified in Table 5 or Table 6. The relationship between the PRI configured as higher signaling and the PUCCH resource selected from the PUCCH resource set may be as shown in Table 26.

TABLE 26

| PUCCH resource indicator | PUCCH resource |
|---|---|
| '000' | $1^{st}$ PUCCH resource provided by pucch-ResourceId obtained from the $1^{st}$ value of resourceList |

TABLE 26-continued

| PUCCH resource indicator | PUCCH resource |
|---|---|
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

If the number of PUCCH resources in the selected PUCCH resource set is greater than 8, the PUCCH resource may be selected by the following Equation 2.

Equation 2

$$r_{PUCCH} =$$

$$\begin{cases} \left\lfloor \dfrac{n_{CCE,p} \cdot \lceil R_{PUCCH}/8 \rceil}{N_{CCE,p}} \right\rfloor + \\ \qquad \Delta_{PRI} \cdot \left\lceil \dfrac{R_{PUCCH}}{8} \right\rceil & \text{if } \Delta_{PRI} < R_{PUCCH} \bmod 8 \\[2em] \left\lfloor \dfrac{n_{CCE,p} \cdot \lfloor R_{PUCCH}/8 \rfloor}{N_{CCE,p}} \right\rfloor + \Delta_{PRS} \cdot \\ \qquad \left\lceil \dfrac{R_{PUCCH}}{8} \right\rceil + R_{PUCCH} \bmod 8 & \text{if } \Delta_{PRI} \geq R_{PUCCH} \bmod 8 \end{cases}$$

In the above Equation 2, $r_{PUCCH}$ is the index of the selected PUCCH resource in the PUCCH resource set, $R_{PUCCH}$ is the number of PUCCH resources belonging to the PUCCH resource set, $\Delta_{PRI}$ is the PRI value, $N_{CCE,p}$ is the total number of CCEs of the CORESET p to which the receiving DCI belongs, and $n_{CCE,p}$ is the first CCE index for the receiving DCI.

The time point at which the corresponding PUCCH resource is transmitted is after the $K_1$ slot from the TB transmission corresponding to the corresponding HARQ-ACK. The $K_1$ value candidate is configured as a higher layer, and more specifically, is configured in the dl-DataToUL-ACK parameter in the PUCCH-Config specified in Table 21. The $K_1$ value of one of these candidates may be selected by the PDSCH-to-HARQ feedback timing indicator in the DCI scheduling the TB, and this value may be a value specified in Table 5 or Table 6. Meanwhile, the unit of the $K_1$ value may be a slot unit or a sub slot unit. Here, a sub slot is a unit of a length smaller than that of a slot, and one or a plurality of symbols may constitute one sub slot.

Next, a case where two or more PUCCH resources are located in one slot is described. The terminal can transmit UCI through one or two PUCCH resources in one slot or sub slot, and when UCI is transmitted through two PUCCH resources in one slot/sub slot, i) each PUCCH resource does not overlap in units of symbols, and ii) at least one PUCCH resource may be a short PUCCH. Meanwhile, the terminal may not expect to transmit a plurality of PUCCH resources for HARQ-ACK transmission within one slot.

Next, it is described for the PUCCH transmission procedure in the case that two or more PUCCH resources overlap. In the case that two or more PUCCH resources are overlapped, one of the overlapping PUCCH resources may selected or a new PUCCH resource may be selected according to the condition that the transmitted PUCCH resource should not overlap in symbol units. In addition, the UCI payload transmitted through the overlapping PUCCH resource may be multiplexed and transmitted or some may be dropped. First, the case where multi-slot repetition is not configured in PUCCH resource (case 1) and multi-slot repetition (case 2) is configured are described.

In the case that the PUCCH resource is overlapped for Case 1, Case 1 is divided into Case 1-1) a case where two or more PUCCH resources for HARQ-ACK transmission are overlapped, and Case 1-2) the remaining cases.

Figure 9:
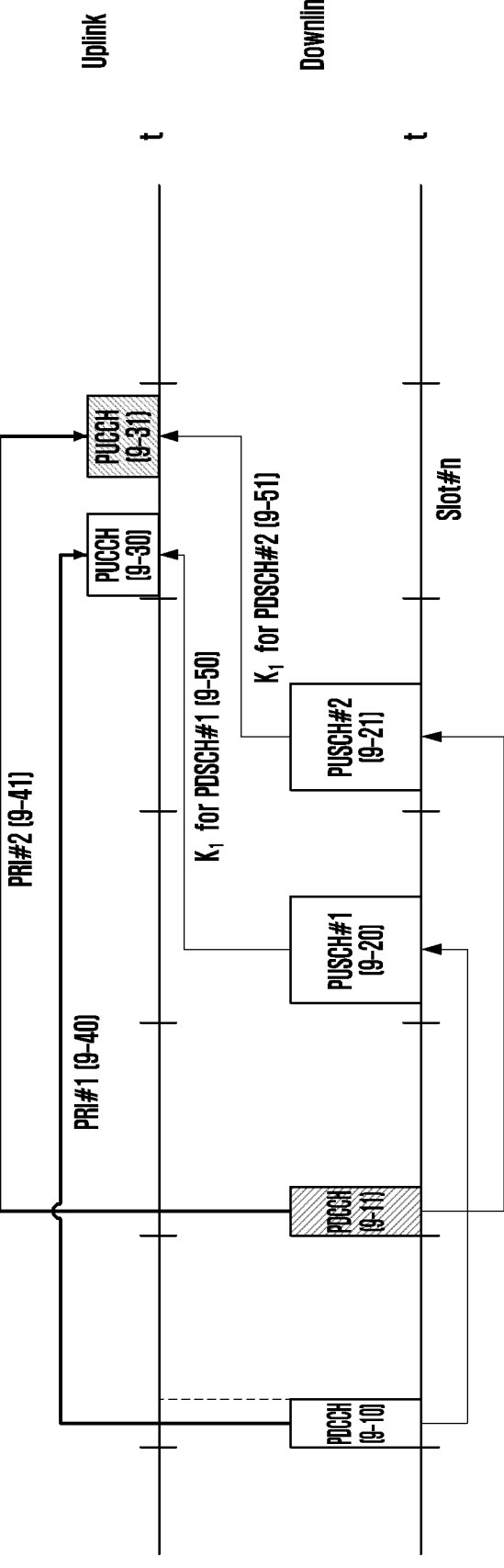
FIG. 9 is a diagram illustrating a case in which multiple physical uplink control channel (PUCCH) resources for HARQ-ACK transmission for a PDSCH overlap if multi-slot repetition is not configured according to an embodiment of the disclosure.

The case corresponding to Case 1-1) is illustrated in FIG. 9.

FIG. 9 is a view illustrating a case of overlapping a plurality of PUCCH resources for HARQ-ACK transmission for PDSCH in the case that multi-slot repetition is not configured according to an embodiment of the disclosure.

Referring to FIG. 9, for two or more different PDCCHs 9-10 and 9-11 scheduling the PDSCH, in the case that the transmission slots of the PUCCH resources corresponding to each PDCCH are the same, the corresponding PUCCH resources may be considered to be overlapped with each other. That is, in the case that the uplink slots corresponding to the $K_1$ values 9-50 and 9-51 indicated by a plurality of PDCCHs are the same, the PUCCH resources corresponding to the corresponding PDCCHs may be considered as overlapping each other.

In this case, between the PUCCH resources indicated by the PRIs 9-40 and 9-41 in the PDCCH, only the PUCCH resource 9-31 selected based on the PRI 9-41 corresponding to the PDCCH 9-11 transmitted at the last point is selected, and HARQ-ACK information is transmitted on the PUCCH resource. Therefore, HARQ-ACK information for PDSCH 9-21, and HARQ-ACK information for other PUCCH 9-30 overlapping with the PUCCH resource 9-31 are all transmitted after being encoded by the predefined HARQ-ACK codebook through the selected PUCCH resource 9-31.

Next, for the Case 1-2, a case in which the PUCCH resource for HARQ-ACK transmission and the PUCCH resource for SR and/or CSI transmission overlap, or a case where a plurality of PUCCH resources for SR and/or CSI transmission overlap is described. In the above case, when a plurality of PUCCH resources transmitted in the same slot overlap more than one symbol in the time axis, it is defined that the corresponding PUCCH resource overlaps, and whether or not multiplexing UCIs within these resources can be summarized as shown in Table 27 below.

TABLE 27

| PUCCH 2 | PUCCH 1 | | |
| | SR | HARQ-ACK | CSI |
|---|---|---|---|
| SR | — | Case 1-2-1 (Multiplex or not depending on PUCCH format) | Always multiplex |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to the Table 27, in the case that the PUCCH resources to which the HARQ-ACK transmitted overlap, or in the case that the PUCCHs through which SR and CSI are transmitted overlap, these UCIs are always multiplexed.

Meanwhile, in the case that each PUCCH resource to which SR and HARQ-ACK are transmitted overlap, that is, in the case of Case 1-2-1, whether or not UCI multiplexing is performed according to the format of the PUCCH resource is divided as follows.

SR on PUCCH format 0+HARQ-ACK on PUCCH format 1: SR is dropped and only HARQ-ACK is transmitted The remaining cases: SR and HARQ-ACK are both multiplexed In addition, the remaining cases corresponding to Case 1-2-2, that is, in the case that the HARQ-ACK and the CSI overlap between the PUCCH resource to be transmitted, or in the case of the overlap between a plurality of PUCCH resources in which CSI is transmitted, the multiplexing of these UCIs may follow the higher layer configuration. In addition, whether to multiplex between HARQ-ACK and CSI and whether to multiplex between multiple CSIs may be independently performed.

For example, whether HARQ-ACK and CSI are multiplexed may be configured through simultaneous HARQ-ACK-CSI parameters for each PUCCH format 2, 3, or 4, and the corresponding parameters may all be configured to the same value for the PUCCH format. In the case that it is configured not to perform multiplexing through the above parameter, only HARQ-ACK is transmitted and the overlapping CSI may be dropped. In addition, whether to multiplex a plurality of CSIs may be configured through a multi-CSI-PUCCH-ResourceList parameter in PUCCH-Config. That is, in the case that the multi-CSI-PUCCH-ResourceList parameter is configured, inter-CSI multiplexing may be performed. Otherwise, only a PUCCH corresponding to a CSI having a higher priority may be transmitted according to the inter-CSI priority.

In the case that the UCI multiplexing is performed as described above, the selection method of the PUCCH resource to transmit the corresponding UCI resource and the multiplexing method may differ according to the information of the overlapped UCI and the format of the PUCCH resource, which can be summarized as shown in Table 28 below.

Option 6: In the case that the PUCCH resource for HARQ-ACK corresponding to the semi-persistent scheduling (SPS) PDSCH and the PUCCH resource for CSI transmission are overlapped and the multiplexing between HARQ-ACK and CSI is configured as the higher layer, the terminal multiplexes and transmits HARQ-ACK information and CSI information to a PUCCH resource for CSI transmission.

In the case that the PUCCH resource list for multiplexing to the higher layer, that is, multi-CSI-PUCCH-ResourceList is configured, the terminal selects one of the resources in the list with the lowest index capable of transmitting all the multiplexed UCI payloads, and then transmits UCI payload. In the case that there is no resource capable of transmitting all of the multiplexed UCI payloads in the list, the terminal selects the resource with the largest index and then transmits HARQ-ACK and CSI reports as many as the number of transmittable to the resource.

Option 7: In the case that a plurality of CSI transmission PUCCH resources is overlapped and multiplexing between multiple CSIs is configured as a higher layer, the terminal selects one resource having the lowest

TABLE 28

| PUCCH 2 | PUCCH 1 | | | |
| | HARQ-ACK | | | |
| | SR (format 0/1) | Format 1 | Format 0/2/3/4 | CSI (format 2/3/4) |
|---|---|---|---|---|
| SR (format 0/1) | — | Option 1 | Option 2 | Option 3 |
| HARQ-ACK Format 1 | Option 1 | Option 4 | Option 4 | Option 5 (grant-based) Option 6 (SPS) |
| Format 0/2/3/4 | Option 2 | Option 4 | Option 4 | Option 5 (grant-based) Option 6 (SPS) |
| CSI (format 2/3/4) | Option 3 | Option 5 (grant-based) Option 6 (SPS) | Option 5 (grant-based) Option 6 (SPS) | Option 7 |

Each option in the Table 28 is as follows.

Option 1: The terminal makes different PUCCH resource selection according to the SR value of the HARQ-ACK PUCCH resource and the overlapped SR PUCCH resource. That is, if the SR value is positive, PUCCH resource for SR is selected, and if the SR value is negative, PUCCH resource for HARQ-ACK is selected. HARQ-ACK information is transmitted to the selected PUCCH resource.

Option 2: The terminal transmits by multiplexing HARQ-ACK information and SR information to PUCCH resource for HARQ-ACK transmission.

Option 3: The terminal transmits by multiplexing SR information and CSI to PUCCH resource for CSI transmission.

Option 4: PUCCH resource transmission for overlapping between HARQ-ACK. Detailed operation has been described in case 1-1).

Option 5: In the case that the PUCCH resource for HARQ-ACK corresponding to the PDSCH scheduled as PDCCH and the PUCCH resource for CSI transmission are overlapped and the multiplexing between HARQ-ACK and CSI is configured as the higher layer, the terminal multiplexes and transmits HARQ-ACK information and CSI information to a PUCCH resource for HARQ-ACK.

index capable of transmitting all of the multiplexed UCI payloads in the PUCCH resource list for CSI multiplexing configured as a higher layer, that is, multi-CSI-PUCCH-ResourceList, and then transmits the UCI payload. In the case that there is no resource capable of transmitting all of the multiplexed UCI payloads in the list, the terminal selects the resource with the largest index and then transmits as many CSI reports as possible to the corresponding resource.

In the above, for the convenience of description, the focus has dealt with the case where two PUCCH resources are overlapped, but the method may be similarly applied even the case where three or more PUCCH resources overlap. For example, in the case that SR+HARQ-ACK multiplexed PUCCH resource and CSI PUCCH resource overlap, the multiplexing method between HARQ-ACK and CSI can be followed.

In the case that it is configured not to perform multiplexing between specific UCIs, UCI with a higher priority is transmitted according to the priority in the order of HARQ-ACK>SR>CSI, and UCI with a lower priority may be dropped. In the case that a plurality of CSI PUCCH resources is configured not to perform multiplexing when overlapping, PUCCH corresponding to the high priority CSI is transmitted, and PUCCH corresponding to other CSI may be dropped.

Next, Case 2, which is the case where multi-slot repetition is configured, is divided into cases where two or more PUCCH resources for HARQ-ACK transmission are located in the same start slot Case 2-1) and the other cases Case 2-2). Each case is illustrated in FIG. 10.

Figure 10:
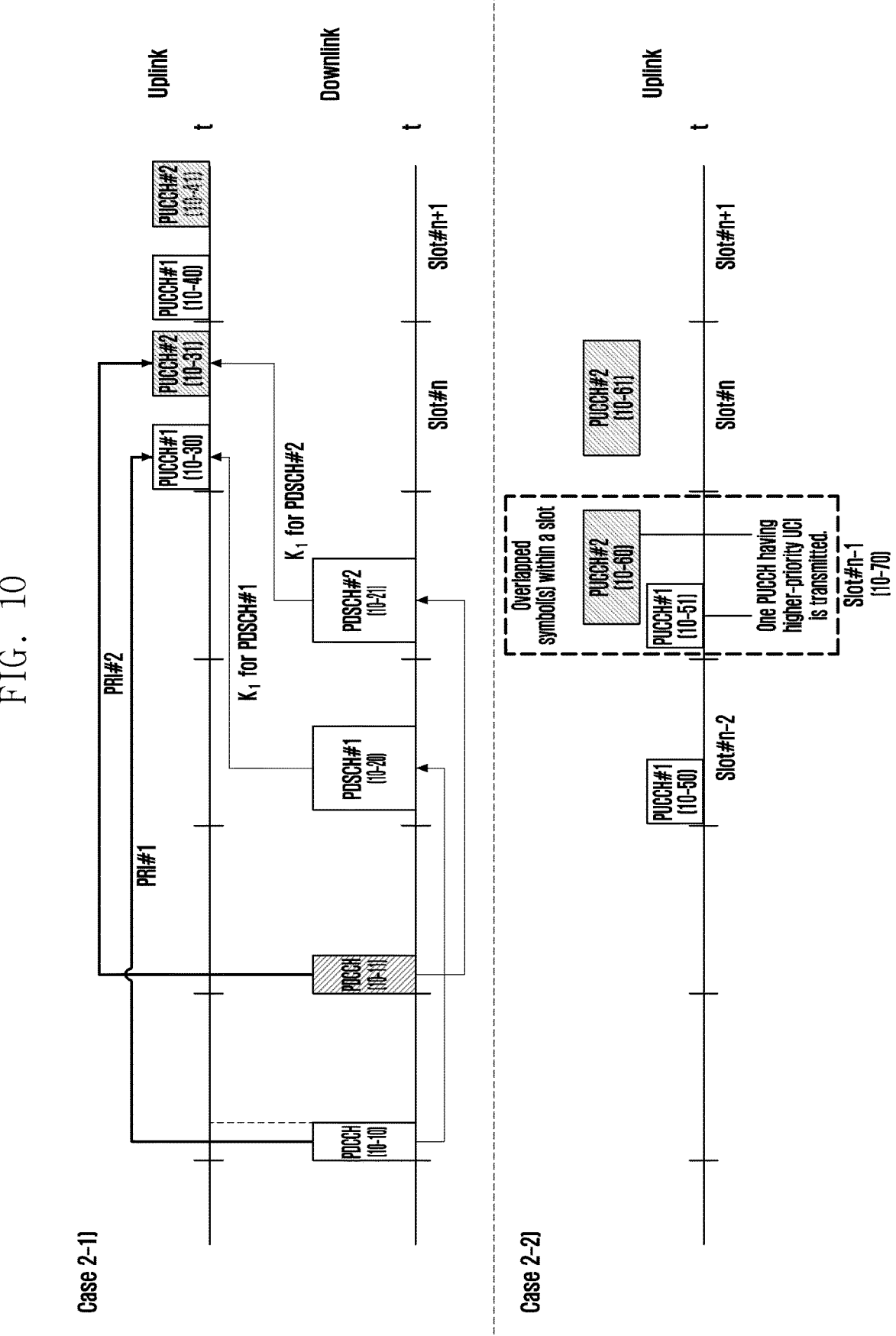
FIG. 10 is a diagram illustrating a case in which PUCCH resources overlap if multi-slot repetition is configured according to an embodiment of the disclosure.

FIG. 10 is a view illustrating a case in which a PUCCH resource overlaps in the case of the configuration of multi-slot repetition according to an embodiment of the disclosure.

Referring to Case 2-1), in the case that multi-slot repetition is configured in the PUCCH resource for HARQ-ACK, that is, in the case that PUCCH #1 indicated by the PRI #1 in the PDCCH 10-10 is repeatedly transmitted over a plurality of slots 10-30 and 10-40 and PUCCH #2 indicated by the PRI #2 in the PDCCH 10-11 is also repeatedly transmitted over the plurality of slots 10-31 and 10-41, if the start slots of the two PUCCHs indicated by $K_1$ are the same, a single PUCCH resource (PUCCH transmitted at the latest time in one slot), that is, PUCCH #2, may be selected in the same manner as in Case 1-1). Accordingly, HARQ-ACK information corresponding to PDSCH #1 10-20 and PDSCH #2 10-21 is all multiplexed and transmitted to the PUCCH through the HARQ-ACK codebook.

For the convenience of description, a case in which a plurality of PUCCHs subjected to multi-slot repetition is overlapped is exemplified, but the same method may be applied in the case of overlapping between the multi-slot repetition PUCCH and the PUCCH transmitted in a single slot.

Case 2-2) corresponds to a case in which a symbol unit overlap occurs between PUCCH for HARQ-ACK transmission and PUCCH for SR or CSI transmission, or between PUCCHs for multiple SR or CSI transmission. That is, in the case that PUCCH #1 is repeatedly transmitted over a plurality of slots 10-50 and 10-51 and PUCCH #2 is also repeatedly transmitted over a plurality of slots 10-60 and 10-61, it corresponds to the case where more than one symbol overlap in one slot 10-70 occurs between PUCCH #1 and PUCCH #2.

Between PUCCHs in which more than one symbol overlap occurs in the corresponding slot 10-70, by comparing the priority between UCIs in the PUCCH, UCI with higher priority is transmitted, and other UCIs are dropped in the corresponding slot. In this case, the priority between the UCI follows HARQ-ACK>SR>CSI in the highest order.

In addition, in the case that a plurality of CSI PUCCH resources overlaps, the PUCCH corresponding to the high priority CSI may be transmitted, and the PUCCH corresponding to another CSI may be dropped in the corresponding slot. PUCCH transmission or drop according to the above-described priority is performed only in the slot where the overlap per symbol has occurred, and is not performed in other slots. That is, the PUCCH in which multi-slot repetition is configured may be dropped in the slot where the symbol unit overlap occurs, but may be transmitted as configured in the remaining slots.

If two multi-slot repetitive PUCCHs overlap, the terminal does not expect that the repetitive transmission of two PUCCHs have the same priority and the same start slot. If the repetitive transmission of two PUCCHs have the same priority, the terminal may transmit a PUCCH which first started the repetitive transmission and may drop the remaining PUCCH. If the repetitive transmission of two PUCCHs have different priorities, the terminal may perform repetitive transmission of a PUCCH having a high priority.

For the convenience of description, a case in which a plurality of PUCCHs subjected to multi-slot repetition are overlapped is exemplified, but the same method may also be applied to the case where overlap occurs between the multi-slot repetition PUCCH and the PUCCH transmitted in a single slot.

In addition, the overlap between the PUCCH and PUSCH transmission is described. If the terminal transmits PUCCH in the first slot of the repeated transmission of $N_{PUCCH}^{repeat}>1$, transmits the PUSCH in the second slot. In the case that PUCCH transmission is overlapped with PUSCH transmission in one or a plurality of slots, or that UCIs are multiplexed in PUSCH in overlapped slots, the terminal transmits PUCCH and does not transmit PUSCH in slots in which PUCCH and PUSCH overlap. Next, uplink transmission beam configuration to be applied to PUCCH transmission will be described. If the terminal does not have a terminal-specific configuration for PUCCH resource configuration (dedicated PUCCH resource configuration), the PUCCH resource set is provided through the higher signaling, pucch-ResourceCommon, in this time, the beam configuration for PUCCH transmission follows the beam configuration used in PUSCH transmission scheduled through the random access response (RAR) UL grant. If the terminal has a terminal-specific configuration for PUCCH resource configuration (dedicated PUCCH resource configuration), the beam configuration for PUCCH transmission is provided through pucch-spatialRelationInfoId, which is the higher signaling illustrated in Table 21. If the terminal has been configured with one pucch-spatialRelationInfoId, beam configuration for PUCCH transmission of the terminal is provided through one pucch-spatialRelationInfoId. If the terminal is configured with a plurality of pucch-spatialRelationInfoIDs, the terminal is instructed to activate one of the plurality of pucch-spatialRelationInfoIDs through a MAC control element (CE). The terminal may receive up to eight pucch-spatialRelationInfoIDs through higher signaling, and may receive an indication that only one pucch-spatialRelationInfoID is activated among them. In the case that the terminal is instructed to activate any pucch-spatialRelationInfoID through the MAC CE, the terminal applies pucch-spatialRelationInfoID activation through MAC CE from a slot that first appears after $3N_{slot}^{subframe,\mu}$ slot from a slot in which HARQ-ACK transmission for a PDSCH that transmits MAC CE including activation information for pucch-spatialRelationInfoID. In the above, $\mu$ is a neurology applied to PUCCH transmission, and $N_{slot}^{subframe,\mu}$ is the number of slots per subframe in a given neurology. The higher layer configuration for pucch-spatialRelationInfo may be as shown in Table 29 below.

TABLE 29

| PUCCH-SpatialRelationInfo ::= | SEQUENCE { |
| --- | --- |
| pucch-SpatialRelationInfoId | PUCCH-SpatialRelationInfoId, |
| servingCellId | ServCellIndex |
| OPTIONAL, -- Need S | |
| referenceSignal | CHOICE { |
| ssb-Index | SSB-Index, |
| csi-RS-Index | NZP-CSI-RS-ResourceId, |
| srs | SEQUENCE { |

TABLE 29-continued

```
        resource                        SRS-ResourceID
        uplink                          BWP-Id
        }
    },
    pucch-PathlossReferenceRS-Id        PUCCH-PathlossReferenceRS-Id,
    p0-PUCCH-Id                         P0-PUCCH-Id,
    closedLoopIndex                     ENUMERATED { i0, i1 }
}
PUCCH-SpatialRelationInfoId ::=         INTEGER
(1..maxNrofSpatialRelationInfos)
```

According to Table 29, one referenceSignal configuration may exist in a specific pucch-spatialRelationInfo configuration, and the referenceSignal is ssb-Index indicating a specific SS/PBCH, csi-RS-Index indicating a specific CSI-RS, or srs indicating a specific SRS. If the referenceSignal is configured as ssb-Index, the terminal may configure the beam used when receiving the SS/PBCH corresponding to the ssb-Index among SS/PBCHs in the same serving cell as a beam for PUCCH transmission, or if servingCellId is provided, the terminal may configure the beam used when receiving an SS/PBCH corresponding to an ssb-Index among SS/PBCHs in a cell indicated by servingCellId as a beam for pucch transmission. If the referenceSignal is configured as csi-RS-Index, the terminal may configure the beam used when receiving a CSI-RS corresponding to csi-RS-Index among CSI-RSs in the same serving cell as a beam for PUCCH transmission, or if servingCellId is provided, the terminal may configure the beam used when receiving a CSI-RS corresponding to csi-RS-Index among CSI-RSs in a cell indicated by servingCellId as a beam for pucch transmission. If the referenceSignal is configured to srs, the terminal may configure the transmission beam used when transmitting the SRS corresponding to the resource index provided as an higher signaling resource in the same serving cell and/or in the activated uplink BWP as a beam for PUCCH transmission, or if the servingCellID and/or uplinkBWP are/is provided, the terminal may configure the transmission beam used when transmitting the SRS corresponding to the resource index provided through the higher signaling resource in the cell indicated by the servingCellID and/or uplinkBWP and/or in the uplink BWP as a beam for PUCCH transmission. One pucch-PathlossReferenceRS-Id configuration may exist in a specific pucch-spatialRelationInfo configuration. PUCCH-PathlossReferenceRS of Table 30 may be mapped with pucch-PathlossReferenceRS-Id of Table 29, and up to 4 may be configured through pathlossReferenceRSs in the higher signaling PUCCH-PowerControl of Table 30. If the PUCCH-PathlossReferenceRS is connected to the SS/PBCH through the referenceSignal of Table 30, ssb-Index is configured, and if PUCCH-PathlossReferenceRS is connected to CSI-RS, csi-RS-Index is configured.

TABLE 30

```
PUCCH-PowerControl ::=                    SEQUENCE {
    deltaF-PUCCH-f0                           INTEGER (-16..15)
OPTIONAL, -- Need R
    deltaF-PUCCH-f1                           INTEGER (-16..15)
OPTIONAL, -- Need R
    deltaF-PUCCH-f2                           INTEGER (-16..15)
OPTIONAL, -- Need R
    deltaF-PUCCH-f3                           INTEGER (-16..15)
OPTIONAL, -- Need R
    deltaF-PUCCH-f4                           INTEGER (-16..15)
OPTIONAL, -- Need R
      p0-Set                          SEQUENCE (SIZE (1..maxNrofPUCCH-P0-
PerSet)) OF P0-PUCCH                         OPTIONAL, -- Need M
      pathlossReferenceRSs                    SEQUENCE (SIZE (1..maxNrofPUCCH-
PathlossReferenceRSs)) OF PUCCH-PathlossReferenceRS
OPTIONAL, -- Need M
      twoPUCCH-PC-AdjustmentStates                   ENUMERATED {twoStates}
OPTIONAL, -- Need S ...,
}
P0-PUCCH ::=                           SEQUENCE {
    p0-PUCCH-Id                          P0-PUCCH-Id,
    p0-PUCCH-Value                         INTEGER (-16..15)
}
P0-PUCCH-Id ::=                         INTEGER (1..8)
PUCCH-PathlossReferenceRS ::=                    SEQUENCE
    pucch-PathlossReferenceRS-Id                   PUCCH-PathlossReferenceRS-
Id,
    referenceSignal                        CHOICE {
        ssb-Index                           SSB-Index,
        csi-RS-Index                        NZP-CSI-RS-ResourceId
    }
}
```

Figure 11:
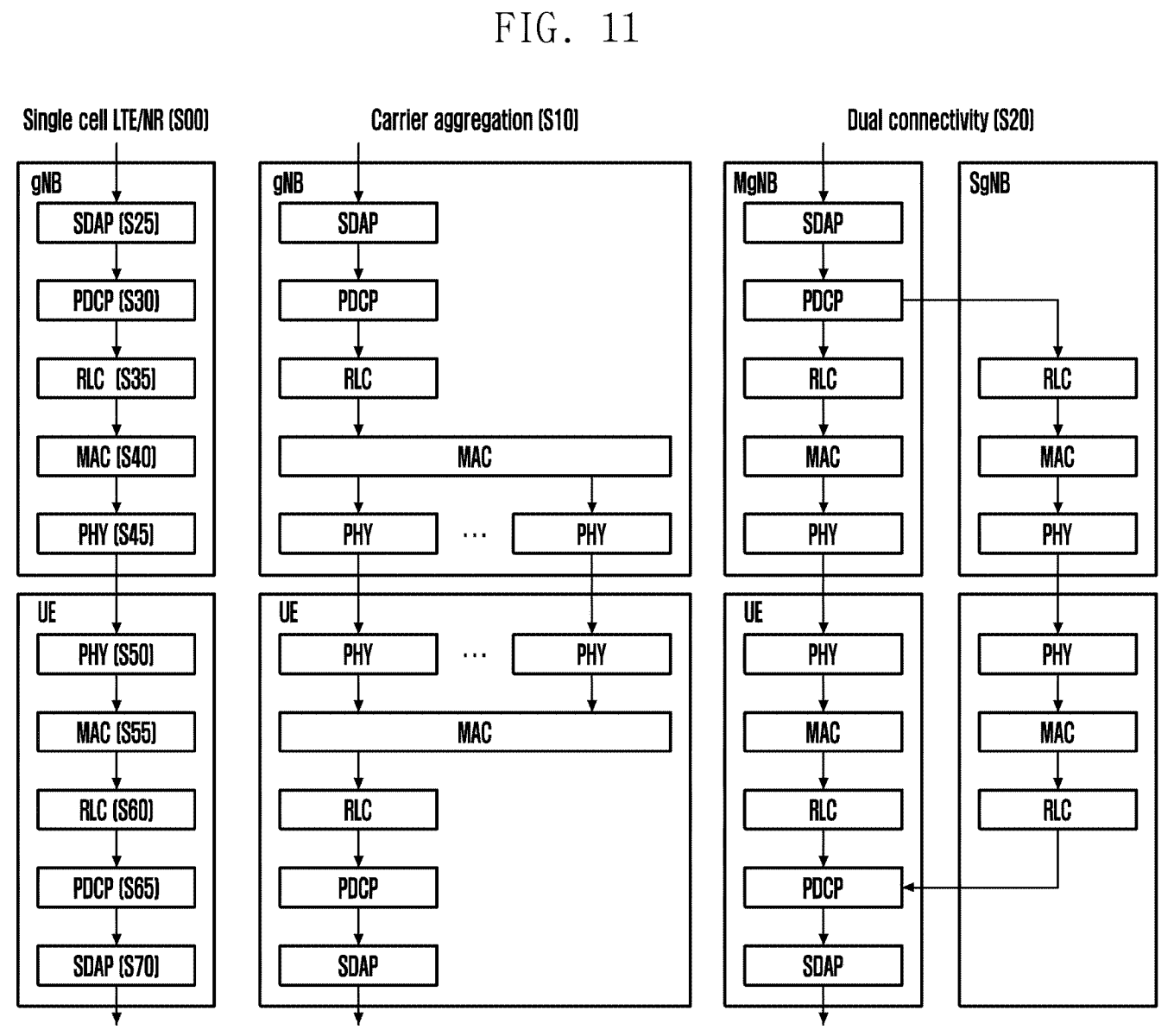

FIG. 11 illustrates a wireless protocol structure of the BS and the UE in single cell, carrier aggregation (CA), and dual connectivity (DC) according to an embodiment of the disclosure.

Referring to FIG. 11, a wireless protocol of a wireless communication system (for example, 5G or NR system) according to an embodiment of the disclosure includes an NR service data adaptation protocol (SDAP) S25 or S70, an NR packet data convergence protocol (PDCP) S30 or S65, an NR radio link control (RLC) S35 or S60, and an NR medium access control (MAC) S40 or S55 in each of the UE and the NR gNB.

Main functions of the NR SDAP S25 or S70 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP S30 or S65 may include some of the following functions Header compression and decompression function (header compression and decompression: ROHC only)

User data transmission function (transfer of user data)

Sequential delivery function (in-sequence delivery of upper-layer PDUs)

Non-sequential delivery function (out-of-sequence delivery of upper-layer PDUs)

Reordering function (PDCP PDU reordering for reception)

Duplicate detection function (duplicate detection of lower-layer SDUs)

Retransmission function (retransmission of PDCP SDUs)

Ciphering and deciphering function (Ciphering and deciphering)

Timer-based SDU removal function (timer-based SDU discard in uplink)

The reordering function of the NR PDCP layer device is a function of sequentially reordering PDCP PDUs received from a lower layer on the basis of a PDCP sequence number (SN), and may include a function of sequentially transferring the reordered data to a higher layer The reordering function of the NR PDCP layer device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLC S35 or S60 may include some of the following functions.

Data transmission function (transfer of upper-layer PDUs)

Sequential delivery function (in-sequence delivery of upper-layer PDUs)

Non-sequential delivery function (out-of-sequence delivery of upper-layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU deletion function (RLC SDU discard)

RLC reestablishment function (RLC reestablishment)

The sequential delivery function (in-sequence delivery) of the NR RLC layer device is a function of sequentially transmitting RLC SDUs received from a lower layer to the higher layer. When one original RLC SDU is divided into a plurality of RLC SDUs and then received, the sequential delivery function (In-sequence delivery) of the NR RLC layer device may include a function of reassembling and transmitting the RLC SDUs, a function of reordering the received RLC PDUs on the basis of an RLC sequence number (SN) or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function (In-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer. Alternatively, the sequential delivery function (In-sequence delivery) of the NR RLC layer device may include may include a function of, if a predetermined timer expires even though there are lost RLC SDUs, sequentially transferring all RLC SDUs received up to now to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer device may not include a concatenation function, and the function may be performed by the NR MAC layer, or may be replaced with a multiplexing function of the NR MAC layer.

The non-sequential function (Out-of-sequence delivery) of the NR RLC layer device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC S40 or S55 may be connected to a plurality of NR RLC layer devices configured in one UE and main functions of the NR MAC may include some of the following functions.

Mapping function (Mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The NR PHY layer S45 or S50 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol structure may be variously changed according to a carrier (or cell) operation scheme. For example, when the BS transmits data to the UE on the basis of a single carrier (or cell), the BS and the UE use a protocol structure having a single structure for each layer as indicated by reference numeral S00. On the other hand, when the BS transmits data to the UE on the basis of carrier aggregation (CA) using multiple carriers in a single TRP, the BS and the UE use a protocol structure in which layers up to RLC have a single structure but the PHY layer is multiplexed through the MAC layer as indicated by reference numeral S10. In another example, when the BS transmits data to the UE on the basis of dual connectivity (DC) using multiple carriers in multiple TRPs, the BS and the UE use a protocol structure in which layers up to RLC have a single structure but the PHY layer is multiplexed through the MAC layer as indicated by reference numeral S20.

Next, descriptions will be provided for a method of generating an HARQ-ACK codebook for HARQ-ACK transmission in a selected PUCCH resource as described above. When a PDSCH that is downlink data is scheduled based on DCI information of a PDCCH, information on a slot in which the PDSCH is transmitted and to which corresponding HARQ-ACK feedback is mapped, and mapping information of a PUCCH of an uplink control channel for transferring HARQ-ACK feedback information are transferred. Specifically, a slot interval between the PDSCH that is downlink data and the corresponding HARQ-ACK feedback is indicated via a PDSCH-to-HARQ_feedback timing indicator, and one of eight feedback timing offsets configured via a higher layer (e.g., RRC signaling) is indicated. In addition, in order to transfer a type of an uplink control channel of a PUCCH to which HARQ-ACK feedback information is to be mapped, a start symbol position, and a PUCCH resource including the number of mapping symbols, one of eight resources configured via a higher layer is indicated via a PUCCH resource indicator. A terminal gathers and transfers HARQ-ACK feedback bits so as to transfer HARQ-ACK information to a base station, and the gathered HARQ-ACK feedback bits may be interchangeably referred to as an HARQ-ACK codebook hereinbelow.

The base station may configure, for the terminal, a Type-1 HARQ-ACK codebook for transmission of HARQ-ACK feedback bits corresponding to a PDSCH transmittable at a slot position of a predetermined timing regardless of actual PDSCH transmission. Alternatively, the base station may configure, for the terminal, a Type-2 HARQ-ACK codebook for management and transmission of HARQ-ACK feedback bits corresponding to an actually transmitted PDSCH via counter downlink assignment index (DAI) or a total DAI.

When the terminal is configured with a Type-1 HARQ-ACK codebook, a table including a slot to which a PDSCH is mapped, a start symbol, and the number of symbols or length information and a feedback bit to be transmitted via K1 candidate values that are HARQ-ACK feedback timing information for the PDSCH may be determined. The table including the start symbol of the PDSCH and the number of symbols or length information may be configured via higher layer signaling or may be determined to be a default table. In addition, K1 candidate values may be determined to be default values, for example, {1, 2, 3, 4, 5, 6, 7, 8}, or may be determined via higher layer signaling. The slot to which the PDSCH is mapped may be known based on the K1 value if the PDSCH is transmitted in a single slot.

If pdsch-AggregationFactor configured in PDSCH-Config or SPS-Config, which is higher layer signaling, is configured, the terminal may transmit HARQ-ACK information for repetitively transmitted PDSCHs in pdsch-Aggregation-Factor slots, in which case, the K1 value may be indicated via DCI based on a last slot among slots for repetitive transmission, or may be configured via higher layer parameter dl-DataToUl-ACK. If a time domain resource assignment field in DCI for scheduling of the repetitively transmitted PDSCHs indicates an entry including RepNumR16 from among entries of pdsch-TimeDomainAllocationList that is higher layer signaling, the terminal may transmit HARQ-ACK information for the repetitively transmitted PDSCHs in RepNumR16 slots, in which case, the K1 value may be indicated via DCI based on the last slot among slots for repetitive transmission, or may be configured via higher layer parameter dl-DataToUl-ACK.

If a set of PDSCH reception candidate cases in serving cell c is $M_{A,c}$, $M_{A,c}$ may be determined via the following pseudo-code 1 operations.

Start of Pseudo-code 1

Operation 1: Initializing j to 0, $M_{A,c}$ to an empty set, and an HARQ-ACK transmission timing index of k to 0.

Operation 2: Configuring R to a set of respective rows of a table including a slot to which a PDSCH is mapped, a start symbol, and the number of symbols or length information. If a symbol to which a PDSCH indicated by each row of R is mapped is configured as an uplink symbol according to a higher layer configuration, deleting the corresponding row from R.

Operation 3-1: The terminal may receive one PDSCH for unicast in one slot, and if R is not an empty set, k is added to set $M_{A,c}$.

Operation 3-2: If the terminal is able to receive more than one PDSCH in one slot, counting the maximum number of PDSCHs assignable to different symbols in R, and adding corresponding number j to $M_{A,c}$ while increasing j by 1.

Operation 4: Increasing k by 1, and resuming from operation 2.

End of Pseudo-code 1

HARQ-ACK feedback bits may be determined via the following pseudo-code 2 operations for $M_{A,c}$ determined based on pseudo-code 1 described above.

Start of Pseudo-code 2

Operation 1: Initializing serving index c to 0, an HARQ-ACK reception occasion index of m to 0, and an HARQ-ACK feedback bit index of j to 0.

Operation 2-1: If, via higher layer signaling, the terminal is not indicated for HARQ-ACK bundling for a codeword, is not indicated for CBG transmission of a PDSCH, and is indicated to be able to receive up to two codewords through one PDSCH, configuring an HARQ-ACK feedback bit for each codeword while increasing j by 1.

Operation 2-2: If, via higher layer signaling, the terminal is indicated with HARQ-ACK bundling for a codeword and is indicated to be able to receive up to two codewords through one PDSCH, configuring an HARQ-ACK feedback bit for each codeword by one HARQ-ACK feedback bit via a binary AND operation.

Operation 2-3: If, via higher layer signaling, the terminal is indicated for CBG transmission of a PDSCH and is not indicated to be able to receive up to two codewords through one PDSCH, configuring as many HARQ-ACK feedback bits as CBGs for one codeword while increasing j by 1.

Operation 2-4: If, via higher layer signaling, the terminal is indicated for CBG transmission of a PDSCH and is indicated to be able to receive up to two codewords through one PDSCH, configuring as many HARQ-ACK feedback bits as CBGs for each codeword while increasing j by 1.

Operation 2-5: If, via higher layer signaling, the terminal is not indicated for CBG transmission of a PDSCH and is not indicated to be able to receive up to two codewords through one PDSCH, configuring an HARQ-ACK feedback bit for one codeword.

Operation 3: Increasing m by 1, and if m is smaller than Mc that is a total number of occasions of SPS PDSCH release or PDSCH reception for serving cell c determined as a cardinality of $M_{A,c}$ resuming from operation 2-1.

Operation 4: Increasing c by 1, and if c is smaller than $N_{cells}^{DL}$ that is the number of all serving cells configured via higher layer signaling, initializing m to 0, and resuming from operation 2-1.

End of Pseudo-code 2

If CORESETPoolIndex is not configured or is configured to be 0 for all CORESETs in an active BWP of a serving cell, and ACKNACFeedbackMode is not configured, Type 1 HARQ-ACK feedback bits are generated for $N_{cells}^{DL}$ serving cells according to pseudo-code 1 and pseudo-code 2 described above.

If CORESETPoolIndex is configured to be 0 or CORESETPoolIndex is not configured for first CORESETs in the active BWP of the serving cell, and if CORESETPoolIndex is configured to be 1 for second CORESETs in the active BWP of the serving cell and ACKNACFeedbackMode is not configured, Type 1 HARQ-ACK feedback bits are generated for $N_{cells}^{DL}$ serving cells according to pseudo-code 1 and pseudo-code 2 described above.

If CORESETPoolIndex is configured to be 0 or CORESETPoolIndex is not configured for the first CORESETs in the active BWP of the serving cell, and if CORESETPoolIndex is configured to be 1 for the second CORESETs in the active BWP of the serving cell and ACKNACKFeedbackMode is configured to be JointFeedback, in order to generate an HARQ-ACK feedback bit, the serving cell including the first CORESETs is configured to be first set S0, and the serving cell including the second CORESETs is configured to be second set S1. In this case, the number of serving cells included in set S0 may be defined to be $N_{cells}^{DL,0}$, and the number of serving cells included in set S1 may be defined to be $N_{cells}^{DL,1}$. When performing pseudo-code 2 to calculate HARQ-ACK feedback bits, $N_{cells}^{DL}=N_{cells}^{DL,0}$ is configured to calculate an HARQ-ACK feedback bit for set S0, and $N_{cells}^{DL}=N_{cells}^{DL,1}$ is configured to calculate an HARQ-ACK feedback bit for set S1, so that each HARQ-ACK feedback bit is calculated according to CORESETPoolIndex. Then, by connecting the HARQ-ACK feedback bit for set S1 subsequent to the HARQ-ACK feedback bit for set S0, HARQ-ACK feedback bits of a JointFeedback scheme are configured.

If CORESETPoolIndex is configured to be 0 or CORESETPoolIndex is not configured for the first CORESETs in the active BWP of the serving cell, and if CORESETPoolIndex is configured to be 1 for the second CORESETs in the active BWP of the serving cell and ACKNACKFeedbackMode is configured to be SeparateFeedback, the terminal separately performs pseudo-code 2 to calculate HARQ-ACK feedback bit associated with the first CORESETs and the HARQ-ACK feedback bit associated with the second CORESETs with respect to $N_{cells}^{DL}$ serving cell. Thereafter, the terminal reports each of the calculated HARQ-ACK feedback bit for the first CORESETs and the calculated HARQ-ACK feedback bit for the second CORESETs to the base station according to a CORESET in which a PDCCH including DCI having triggered reporting of HARQ-ACK information is received.

When the terminal is configured with the Type-2 HARQ-ACK codebook, K1 candidate values that are HARQ-ACK feedback timing information for a PDSCH and a counter downlink assignment index (DAI) for management of HARQ-ACK feedback bits corresponding to the PDSCH or feedback bits to be transmitted via a total DAI are determined. The K1 candidate values that are HARQ-ACK feedback timing information for the PDSCH are configured by a union of default values and values designated via higher layer signaling. For example, the default values may be configured to be {1, 2, 3, 4, 5, 6, 7, 8}.

If the counter DAI of DCI format 1_0 or DCI format 1_1 for assignment of the PDSCH in serving cell c at PDCCH monitoring timing m is $V_{C-DAI,c,m}^{DL}$, and if the total DAI of DCI format 1_1 for assignment of the PDSCH at uplink control channel PDCCH monitoring timing m is $V_{T-DAI,c,m}^{DL}$, the Type-2 HARQ-ACK codebook may be configured via the following pseudo-code 3 operations.

Start of Pseudo-code 3

Operation 1: Initializing serving cell index c to 0, PDCCH monitoring timing m to 0, j to 0, index $V_{temp}$ or $V_{temp2}$ for DAI comparison to 0, and HARQ-ACK feedback bit set $V_S$ to an empty set.

Operation 2: If PDCCH monitoring timing m is before a downlink BWP change for serving cell c or before an uplink BWP change for a PCell, and if the downlink BWP change is not triggered due to DCI format 1_1 of PDCCH monitoring timing m, excluding c from a serving cell set.

Operation 3-1: If a PDSCH assigned by a PDCCH corresponding to PDCCH monitoring timing m exists in serving cell c, if $V_{C-DAI,c,m}^{DL}$ is smaller than or equal to $V_{temp}$, increasing j by 1 and configuring $V_{temp}$ to be $V_{C-DAI,c,m}^{DL}$. In addition, if $V_{T-DAI,c,m}^{DL}$ is an empty set, configuring $V_{temp2}$ to be $V_{C\text{-}DAI,c,m}^{DL}$, and if $V_{T\text{-}DAI,c,m}^{DL}$ is not an empty set, configuring $V_{temp2}$ to be $V_{C\text{-}DAI,c,m}^{DL}$.

Operation 3-2: If a PDSCH assigned by a PDCCH corresponding to PDCCH monitoring timing m exists in serving cell c, and if the terminal is indicated to be able to receive up to two codewords via one PDSCH in at least one downlink BWP of at least one serving cell without being indicated with HARQ-ACK bundling for a codeword via higher layer signaling, configuring an HARQ-ACK feedback bit for each codeword while increasing j by 1.

Operation 3-3: If a PDSCH assigned by a PDCCH corresponding to PDCCH monitoring timing m exists in serving cell c, and if the terminal is indicated with HARQ-ACK bundling for a codeword via higher layer signaling and is indicated to be able to receive up to two codewords via one PDSCH in at least one downlink BWP of at least one serving cell, configuring an HARQ-ACK feedback bit for each codeword by one HARQ-ACK feedback bit via a binary AND operation.

Operation 3-4: If a PDSCH assigned by a PDCCH corresponding to PDCCH monitoring timing m exists in serving cell c, and if the terminal is not indicated to be able to receive up to two codewords through one PDSCH, configuring an HARQ-ACK feedback bit for one codeword.

Operation 4: Increasing c by 1, and resuming from operation 2.

Operation 5: Increasing m by 1, and resuming from operation 2.

Operation 6: If $V_{temp2}$ is smaller than $V_{temp}$, increasing j by 1.

Operation 7-1: If the terminal is indicated to be able to receive up to two codewords through one PDSCH in at least one downlink BWP of at least one serving cell without being indicated with HARQ-ACK bundling for a codeword via higher layer, configuring a total number of HARQ-ACK feedback bits to be $2 \cdot (4 \cdot j + V_{temp2})$.

Operation 7-2: If the terminal is indicated with HARQ-ACK bundling for a codeword via higher layer signaling, or is not indicated to be able to receive up to two codewords through one PDSCH, configuring a total number of HARQ-ACK feedback bits to be $4 \cdot j + V_{temp2}$.

Operation 8: Determining HARQ-ACK feedback bits to be NACK for HARQ-ACK feedback bits that are not configured in operations 3-1, 3-2, 3-3, and 3-4.

End of Pseudo-code 3

Referring to the aforementioned PUCCH-related descriptions, the current Rel-15 NR system focuses on transmission toward a single cell, transmission point, panel, beam, transmission direction, and the like for repetitive PUCCH transmission. In the following descriptions, for convenience of description, a cell, a transmission point, a panel, a beam, a transmission direction, and the like which may be identified via higher layer/L1 parameters, such as TCI state or spatial relation information, or an indicator, such as a cell ID, a TRP ID, or a panel ID, are described in a unified manner as a transmission reception point (TRP). Therefore, in actual application, TRP may be appropriately replaced by one of the above terms. In the current Rel-15 NR system, since one PUCCH resource is used during repetitive PUCCH transmission, and only one PUCCH-spatialRelationInfo may be activated for one PUCCH resource, the terminal needs to maintain a constant direction of a transmission beam during the repetitive PUCCH transmission. Accordingly, since only one piece of timing advance configuration information exists in one cell, identical timing advance configuration information needs to be used between transmissions to multiple TRPs (or multi-TRP) during repetitive PUCCH transmissions. In addition, when the terminal transmits uplink control information to multiple TRPs by using configuration information for multiple cells, one sequence used for group/sequence/cyclic shift hopping, a PUCCH payload, and a PUCCH DMRS may be configured in one piece of cell configuration information. In addition, schemes for overlapping case processing and priority configuration in consideration of repetitive PUCCH transmission to multiple TRPs are not defined. In the disclosure, by providing processing methods for the cases described above, transmission delay time and loss of uplink control information can be minimized during repetitive PUCCH transmission in consideration of multiple TRPs. Therefore, the disclosure is to provide, via the following embodiments, detailed descriptions of methods for determining various combinations of information that may be configured during repetitive PUCCH transmission that may be supported in future NR Release 17 or later.

Hereinafter, embodiments of the disclosure will be described in detail together with the accompanying drawings. In addition, in describing the disclosure, in the case that it is determined that a detailed description of a related function or configuration may unnecessarily obscure the subject matter of the disclosure, a detailed description thereof will be omitted. In addition, terms to be described later are terms defined in consideration of functions in the disclosure and may vary according to the intention or custom of users or operators. Therefore, the definition should be made based on the contents throughout this specification.

Hereinafter, the base station is a subject that performs resource allocation of the terminal, and may be at least one of a gNode B, gNB, eNode B, Node B, a base station (BS), a radio access unit, a base station controller, or a node on a network. The terminal may include a user equipment (UE), a mobile station (MS), a cellular phone, a smart phone, a computer, or a multimedia system capable of performing a communication function. In addition, another embodiment of the disclosure will be described below using an NR or LTE/LTE-A system as an example, but yet another embodiment of the disclosure may be applied to other communication systems having a similar technical background or channel type. In addition, the embodiments of the disclosure may be applied to other communication systems through some modifications without significantly departing from the scope of the disclosure, as determined by a person having skilled technical knowledge.

The content of the disclosure is applicable to FDD and TDD systems.

Hereinafter, higher signaling (or higher layer signaling) is a signal transmission method that is transmitted from the base station to the terminal using a downlink data channel of the physical layer or from the terminal to the base station using an uplink data channel of the physical layer, which may be referred to as RRC signaling, PDCP signaling, or a medium access control element (MAC CE).

Hereinafter, in the disclosure, in determining whether to apply the cooperative communication, the terminal may use various methods such as the PDCCH(s) for allocating the PDSCH to which the cooperative communication is applied having a specific format, or the PDCCH(s) for allocating the PDSCH to which the cooperative communication is applied having a specific indicator indicating whether cooperative communication is applied, or the PDCCH(s) for allocating the PDSCH to which cooperative communication is applied being scrambled with a specific RNTI, or assuming the application of cooperative communication in a specific section indicated by an higher layer, etc. Hereinafter, for convenience of description, a case in which the terminal receives the PDSCH to which the cooperative communication is applied based on conditions similar to the above will be referred to as an NC-JT case.

Hereinafter, in the disclosure, determining the priority between A and B may be mentioned in various ways, such as selecting one having a higher priority according to a predetermined priority rule to perform an operation corresponding thereto, or omitting or dropping an operation having a lower priority.

Although the above examples are described through a plurality of embodiments, these are not independent and one or more embodiments may be applied simultaneously or in combination.

First Embodiment: DCI Reception for NC-JT

Unlike the conventional system, the 5G wireless communication system can support not only a service requiring a high transmission rate, but also a service having a very short transmission delay and a service requiring a high connection density. In a wireless communication network including multiple cells and transmission and reception points (TRPs), coordinated transmission between respective cells, TRPs, and/or beams is one of element techniques capable of satisfying various service requirements by increasing the intensity of a signal received by a terminal or efficiently performing interference control between respective cells, TRPs, and/or beams.

Joint transmission (JT) is a representative transmission technology for cooperative communication, and the joint transmission technology enables enhancement of the intensity of a signal received by a terminal, by supporting one terminal via different cells, TRPs, and/or beams. Characteristics of channels between a terminal and respective cells, TRPs, and/or beams may vary greatly, so that different precoding, modulation coding schemes (MCSs), resource allocations, etc. need to be applied to links between the terminal and respective cells, TRPs, and/or beams. In particular, in a case of non-coherent joint transmission (NC-JT) supporting non-coherent precoding between respective cells, TRPs, and/or beams, individual downlink (DL) transmission information configuration for respective cells, TRPs, and/or beams is important. However, the individual DL transmission information configuration for each cell, TRP, and/or beam is a major factor for increasing a payload required for DL DCI transmission, and this may adversely affect reception performance of a physical downlink control channel (PDCCH) transmitting DCI. Therefore, it is necessary, for supporting of JT, to carefully design a tradeoff between the amount of DCI information and PDCCH reception performance.

Figure 12:
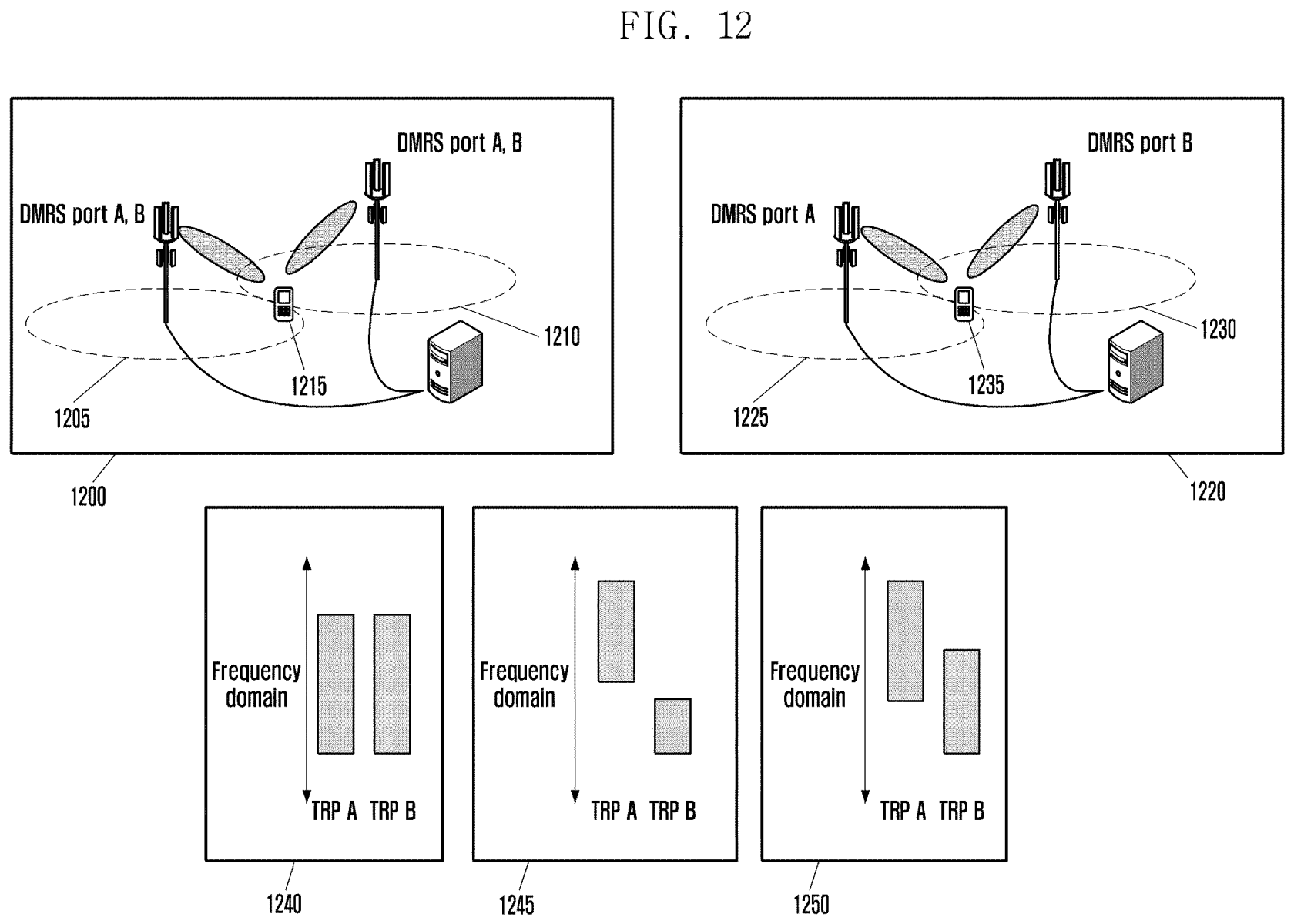

FIG. 12 is a diagram illustrating an example of an antenna port configuration and resource allocation for cooperative communication according to some embodiments in the wireless communication system according to an embodiment of the disclosure.

Referring to FIG. 12, examples of radio resource allocation for each TRP according to a situation and a joint transmission (JT) technique are illustrated. Referring to FIG. 12, reference numeral 1200 is an example of coherent joint transmission (C-JT) supporting coherent precoding between respective cells, TRPs, or beams. In C-JT, TRP A 1205 and TRP B 1210 transmit a single piece of data (PDSCH) to a terminal 1215, and multiple TRPs perform joint precoding. This may indicate that TRP A 1205 and TRP B 1210 transmit the same demodulation reference signal (RS) (DMRS) ports (e.g., DMRS ports A and B in both TRPs) for PDSCH transmission. In this case, the terminal 1215 may receive one piece of DCI information for reception of one PDSCH demodulated based on DMRSs transmitted through DMRS ports A and B.

Referring to FIG. 12, reference numeral 1220 is an example of non-coherent joint transmission (NC-JT) supporting non-coherent precoding between respective cells, TRPs, and/or beams. In the case of NC-JT, a PDSCH is transmitted to a terminal 1235 for each cell, TRP, and/or beam, and individual precoding may be applied to each PDSCH. Respective cells, TRPs, and/or beams may transmit different PDSCHs so as to improve throughput compared to single cell, TRP, and/or beam transmission, or respective cells, TRPs, and/or beams may repetitively transmit the same PDSCH to a terminal 1235 so as to improve reliability compared to single cell, TRP, or/and beam transmission.

Various radio resource allocations may be considered as shown in a case 1240 where all frequency and time resources used for PDSCH transmission by multiple TRPs are the same, a case 1245 where the frequency and time resources used by multiple TRPs do not overlap at all, and a case 1250 where some of the frequency and time resources used by multiple TRPs overlap. In each case of radio resource allocation described above, when multiple TRPs repetitively transmit the same PDSCH to improve reliability, if a reception terminal does not know whether the PDSCH is repetitively transmitted, the terminal cannot perform combining in a physical layer for the PDSCH, so that there may be a limit to improving reliability. Therefore, the disclosure provides a method for repetitive transmission indication and configuration for improving NC-JT transmission reliability.

In order to assign multiple PDSCHs concurrently to a single terminal for NC-JT support, DCI of various types, structures, and relationships may be considered.

Figure 13:
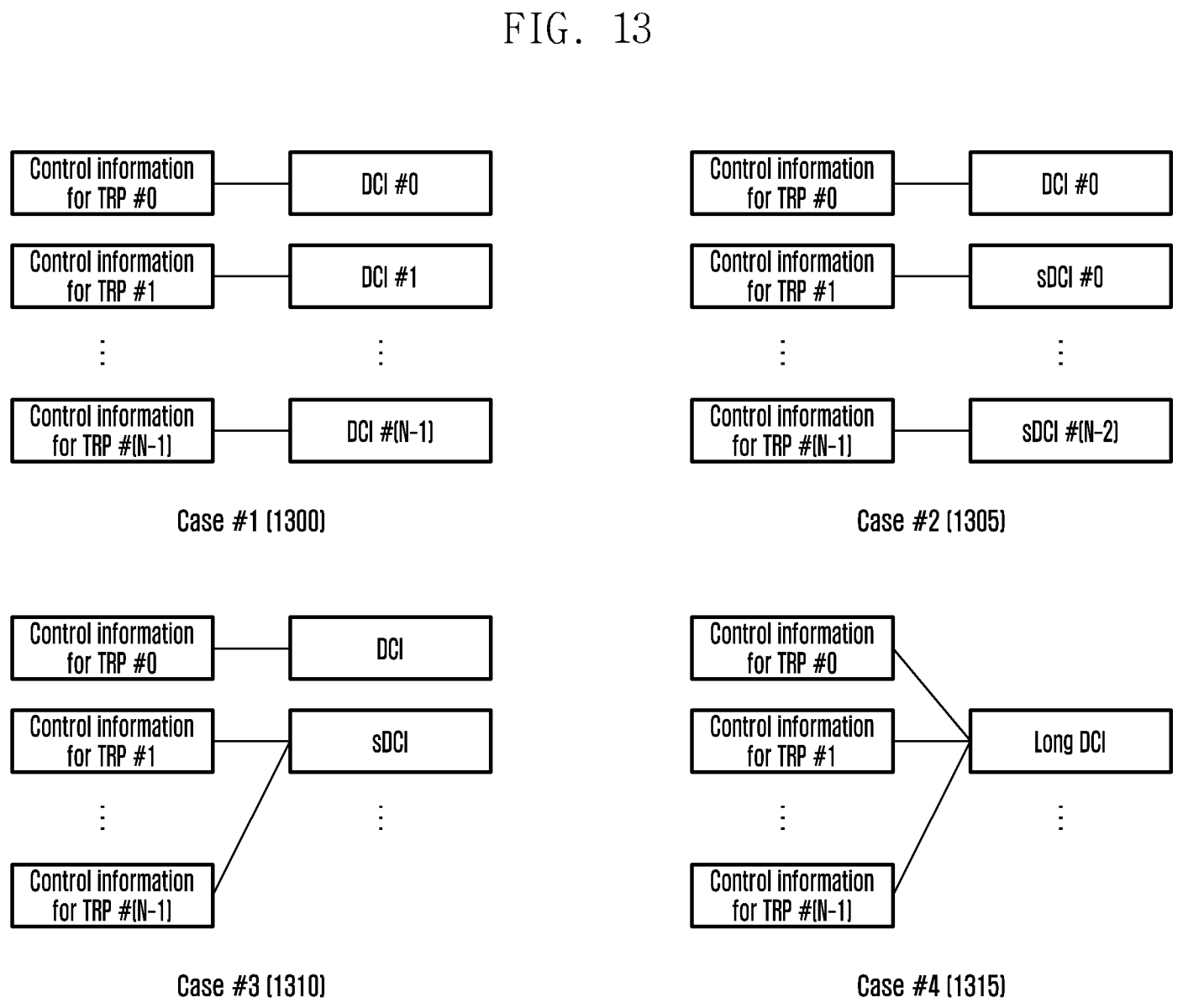

FIG. 13 is a diagram illustrating an example of a downlink control information (DCI) configuration for cooperative communication in the wireless communication system according to an embodiment of the disclosure.

Referring to FIG. 13, four examples of DCI designs for NC-JT support are illustrated.

In an embodiment, case #1 1300 is an example in which, in a situation where N−1 different PDSCHs are transmitted in N−1 additional TRPs (TRP #1 to TRP #N−1) in addition to a serving TRP (TRP #0) used during single-PDSCH transmission, control information for the PDSCHs transmitted in the N−1 additional TRPs is transmitted in the same format (same DCI format) as that of control information for a PDSCH transmitted in the serving TRP. That is, a terminal may acquire control information for the PDSCHs transmitted in different TRPs (TRP #0 to TRP #N−1) via DCI (DCI #0 to DCI #N−1) having the same DCI format and the same payload.

Accordingly, in case #1, a freedom degree of each PDSCH control (assignment) may be completely guaranteed, but if respective pieces of DCI are transmitted in different TRPs, a coverage difference per DCI occurs and thus reception performance may be deteriorated.

In another embodiment, case #2 1305 is an example in which, in a situation where N−1 different PDSCHs are transmitted in N−1 additional TRPs (TRP #1 to TRP #N−1) in addition to a serving TRP (TRP #0) used during single-PDSCH transmission, control information for the PDSCHs transmitted in the N−1 additional TRPs is transmitted in a format (different DCI format or different DCI payload) different from that of control information for a PDSCH transmitted in the serving TRP. For example, for DCI #0 which is control information for the PDSCH transmitted in the serving TRP (TRP #0), all information elements of DCI format 1_0 to DCI format 1_1 may be included, but for shortened DCI (hereinafter, sDCI) (sDCI #0 to sDCI #N−2) which is control information for the PDSCHs transmitted in cooperative TRPs (TRP #1 to TRP #N−1), only some of the information elements of DCI format 1_0 to DCI format 1_1 may be included. Therefore, for sDCI for transmission of control information with respect to the PDSCHs transmitted in cooperative TRPs, it may be possible that there is a smaller payload compared to normal DCI (nDCI) for transmission of control information for the PDSCH transmitted from the serving TRP, or as many reserved bits as the number of bits less than nDCI are included.

Accordingly, in case #2, a freedom degree of each PDSCH control (assignment) may be restricted according to contents of information elements included in sDCI, but since reception performance of the sDCI is superior compared to nDCI, a probability of occurrence of a coverage difference per DCI may be lowered.

In yet an embodiment, case #3 1310 is an example in which, in a situation where N−1 different PDSCHs are transmitted in N−1 additional TRPs (TRP #1 to TRP #N−1) in addition to a serving TRP (TRP #0) used during single-PDSCH transmission, control information for the PDSCHs transmitted in the N−1 additional TRPs is transmitted in a format (different DCI format or different DCI payload) different from that of control information for a PDSCH transmitted in the serving TRP. For example, for DCI #0 which is control information for the PDSCH transmitted in the serving TRP (TRP #0), all information elements of DCI format 1_0 to DCI format 1_1 may be included, and for control information for the PDSCHs transmitted in cooperative TRPs (TRP #1 to TRP #N−1), only some of the information elements of DCI format 1_0 to DCI format 1_1 may be included in one piece of "secondary" DCI (sDCI) so as to be transmitted. For example, the sDCI may include at least one piece of HARQ-related information, such as frequency domain resource assignment, time domain resource assignment, and MCS of cooperative TRPs. In addition, information that is not included in sDCI, such as a bandwidth part (BWP) indicator or a carrier indicator, may be based on DCI (DCI #0, normal DCI (nDCI)) of the serving TRP.

Accordingly, in case #3, a freedom degree of each PDSCH control (assignment) may be restricted according to contents of information elements included in sDCI. However, reception performance of the sDCI is adjustable and, in comparison with case #1 or case #2, complexity of DCI blind decoding of the terminal may be reduced.

In an embodiment, case #4 1315 is an example in which, in a situation where N−1 different PDSCHs are transmitted in N−1 additional TRPs (TRP #1 to TRP #N−1) in addition to a serving TRP (TRP #0) used during single-PDSCH transmission, control information for the PDSCHs transmitted in the N−1 additional TRPs is transmitted in the same DCI (long DCI (lDCI)) as the control information for the PDSCH transmitted in the serving TRP. That is, the terminal may acquire control information for the PDSCHs transmitted in different TRPs (TRP #0 to TRP #(N−1)) via a single piece of DCI.

Accordingly, in case #4, complexity of DCI blind decoding of the terminal may not increase, but a freedom degree of PDSCH control (assignment) may be low, such as the number of cooperative TRPs being restricted according to a long DCI payload limit.

In the following description and embodiments, sDCI may refer to various auxiliary DCI, such as shortened DCI, secondary DCI, and normal DCI (aforementioned DCI formats 1_0 to 1_1) including PDSCH control information transmitted in cooperative TRPs, and if no particular restriction is specified, the description is similarly applicable to the various auxiliary DCI.

In the following description and embodiments, aforementioned case #1, case #2, and case #3, in which one or more pieces of DCI (PDCCH) is used for NC-JT support, may be classified as multiple PDCCH-based NC-JTs, and aforementioned case #4 in which a single piece of DCI (PDCCH) is used for NC-JT support may be classified as a single PDCCH-based NC-JT.

In embodiments of the disclosure, "cooperative TRP" may be replaced with various terms, such as "cooperative panel" or "cooperative beam" when actually applied.

In the embodiments of the disclosure, "when NC-JT is applied" can be interpreted in various ways according to situations, such as "when a terminal receives one or more PDSCHs concurrently in one BWP", "when a terminal receives a PDSCH, based on two or more transmission configuration indicator (TCI) indications concurrently in one BWP", and "when a PDSCH received by a terminal is linked to one or more DMRS port groups", but one expression is used for convenience of description.

In the disclosure, a radio protocol structure for NC-JT may be used in various ways according to a TRP deployment scenario. For example, if there is no backhaul delay or there is a small backhaul delay between cooperative TRPs, it is possible to use a structure based on MAC layer multiplexing similar to S10 of FIG. 11 (CA-like method). On the other hand, if a backhaul delay between cooperative TRPs is so large that the backhaul delay cannot be ignored (e.g., when 2 ms or longer is required for information exchange, such as CSI, scheduling, and HARQ-ACK, between cooperative TRPs), it is possible, similar to S20 of FIG. 11, to secure characteristics robust to a delay by using an independent structure for each TRP from the RLC layer (DC-like method).

1-1st Embodiment: Method of Configuring Downlink Control Channel for Multi-PDCCH-Based NC-JT Transmission In multiple PDCCH-based NC-JT, when DCI for a PDSCH schedule of each TRP is transmitted, there may be a search space or a CORESET which is classified for each TRP. The CORESET or search space for each TRP is configurable as shown in at least one of the following cases.

Higher layer index configuration for each CORESET: A TRP transmitting a PDCCH in a corresponding CORESET may be identified by a higher layer index value configured for each CORESET. That is, in a set of CORESETs having the same higher layer index value, it may be considered that the same TRP transmits a PDCCH or that a PDCCH for scheduling of a PDSCH of the same TRP is transmitted.

Configuration of multiple PDCCH-Configs: It may be considered that multiple PDCCH-Configs are configured in one BWP, and each PDCCH-Config includes a PDCCH configuration for each TRP. Here, a list of CORESETs for each TRP and/or a list of search spaces for each TRP may be configured.

CORESET beam/beam group configuration: A TRP corresponding to a corresponding CORESET may be identified via a beam or beam group configured for each CORESET. For example, if the same TCI state is configured for multiple CORESETs, corresponding CORESETs may be considered to be transmitted via the same TRP, or it may be considered that a PDCCH for scheduling of a PDSCH of the same TRP is transmitted in the corresponding CORESET.

Search space beam/beam group configuration: A beam or beam group may be configured for each search space, and a TRP for each search space may be identified based thereon. For example, if the same beam/beam group or TCI state is configured in multiple search spaces, it may be considered that the same TRP transmits a PDCCH in the search spaces, or that a PDCCH for scheduling of a PDSCH of the same TRP is transmitted in the search spaces.

Accordingly, by identifying the CORESET or search space for each TRP, it is possible to classify a PDSCH and HARQ-ACK information for each TRP, and based on this, independent PUCCH resource use and independent HARQ-ACK codebook generation for each TRP are possible.

Second Embodiment: Method of Transferring HARQ-ACK Information for NC-JT Transmission The next embodiment provides a detailed method of transferring HARQ-ACK information for NC-JT transmission.

FIGS. 14A, 14B, 14C, and 14D are diagrams illustrating a downlink control information (DCI) configuration for non-coherent joint transmission (NC-JT) transmission and an HARQ-ACK information transferring method according to a PUCCH configuration according to various embodiments of the disclosure.

Figure 14A:
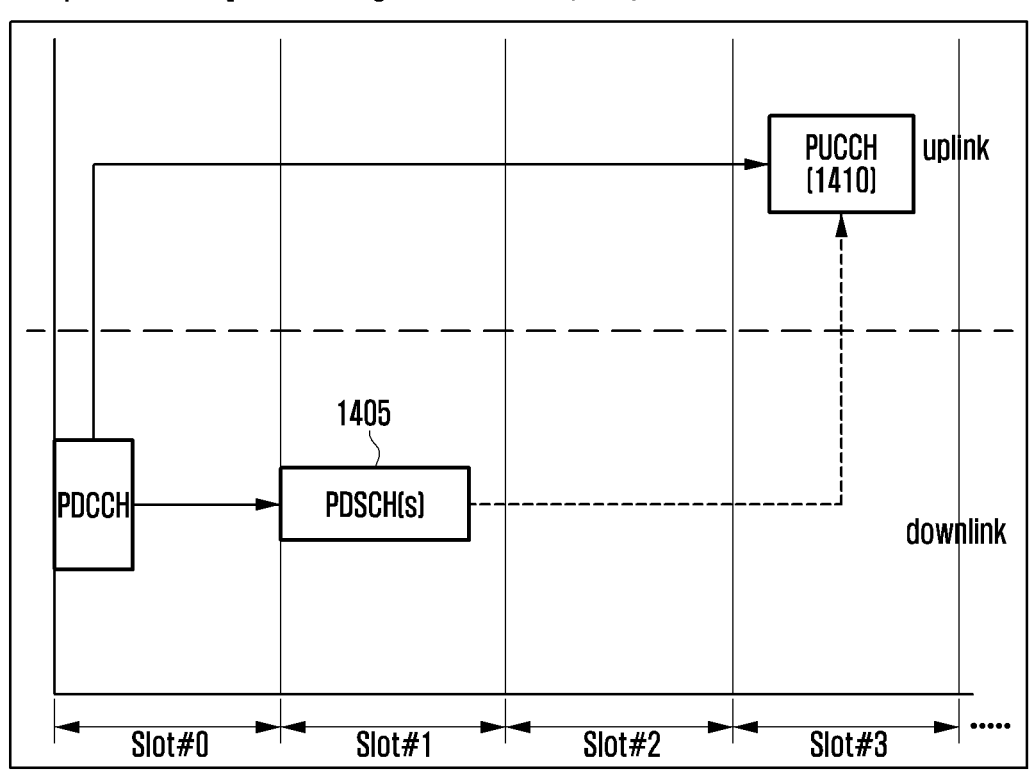
FIG. 14A is a diagram illustrating a downlink control information (DCI) configuration for non-coherent joint transmission (NC-JT) transmission and an HARQ-ACK information transferring method according to a PUCCH configuration according to an embodiment of the disclosure.

Referring to FIG. 14A, option #1: HARQ-ACK for single-PDCCH NC-JT 1400 illustrates a situation in which, for single-PDCCH-based NC-JT, HARQ-ACK information for one or multiple PDSCHs 1405 scheduled by a TRP is transmitted via one PUCCH resource 1410. The PUCCH resource may be indicated via a K1 value and a PRI value in the DCI described above.

Figure 14B:
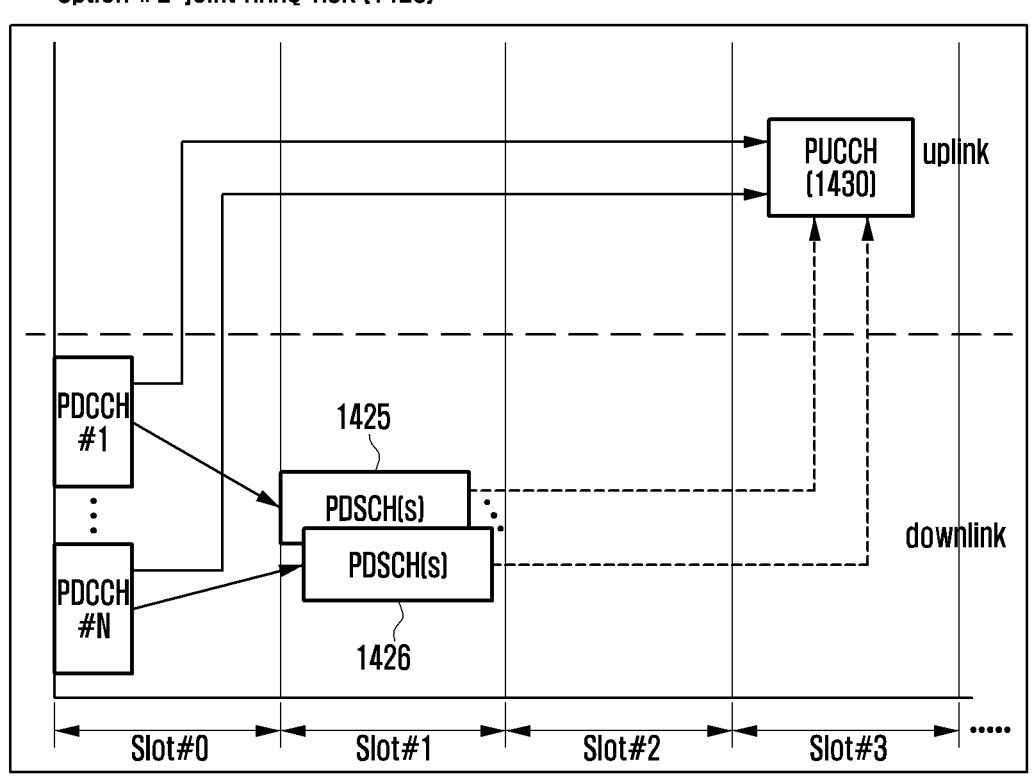
FIG. 14B is a diagram illustrating a downlink control information (DCI) configuration for non-coherent joint transmission (NC-JT) transmission and an HARQ-ACK information transferring method according to a PUCCH configuration according to an embodiment of the disclosure.

FIGS. 14B (option #2) to 14D (option #4) 1420, 1440, and 1460 illustrate cases of multi-PDCCH-based NC-JT. Respective options may be classified according to the number of PUCCH resources for transmission of HARQ-ACK information corresponding to PDSCHs of respective TRPs and positions of the PUCCH resources on the time axis.

Referring to FIG. 14B, option #2: Joint HARQ-ACK 1420 illustrates a situation in which HARQ-ACK information corresponding to PDSCHs 1425 and 1426 of respective TRPs is transmitted via one PUCCH resource 1430. All HARQ-ACK information for each TRP may be generated based on a single HARQ-ACK codebook, and HARQ-ACK information for each TRP may be generated based on an individual HARQ-ACK codebook.

If an individual HARQ-ACK codebook for each TRP is used, as defined in the aforementioned 1-1st embodiment, the TRP may be classified into at least one of a set of CORESETs having the same higher layer index, a set of CORESETs belonging to the same TCI state, beam, or beam group, and a set of search spaces belonging to the same TCI state, beam, or beam group.

Figure 14C:
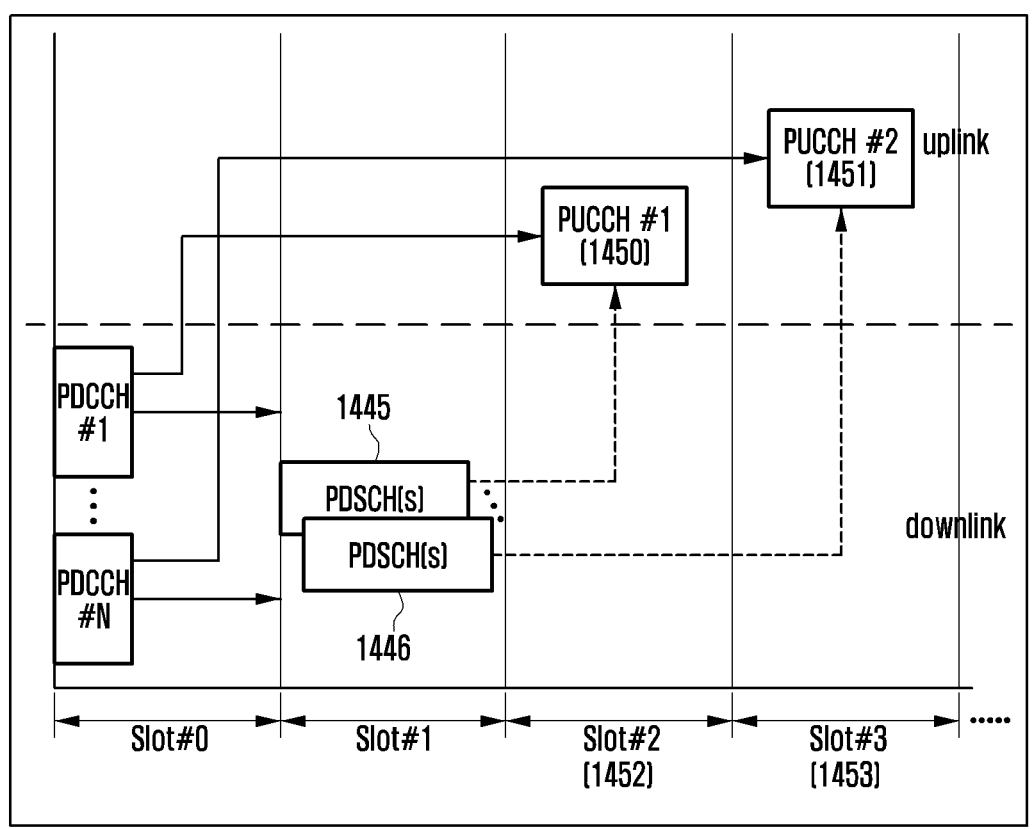
FIG. 14C is a diagram illustrating a downlink control information (DCI) configuration for non-coherent joint transmission (NC-JT) transmission and an HARQ-ACK information transferring method according to a PUCCH configuration according to an embodiment of the disclosure.

Referring to FIG. 14C, option #3: Inter-slot TDMed separate HARQ-ACK 1440 illustrates a situation in which HARQ-ACK information corresponding to PDSCHs 1445 and 1446 of respective TRPs is transmitted via PUCCH resources 1450 and 1451 of respective different slots 1452 and 1453. A slot in which a PUCCH resource for each TRP is transmitted may be determined by the described $K_1$ value. If $K_1$ values indicated by multiple PDCCHs indicate the same slot, it may be considered that all the PDCCHs have been scheduled by the same TRP, and all the HARQ-ACK information corresponding thereto may be transmitted.

Figure 14D:
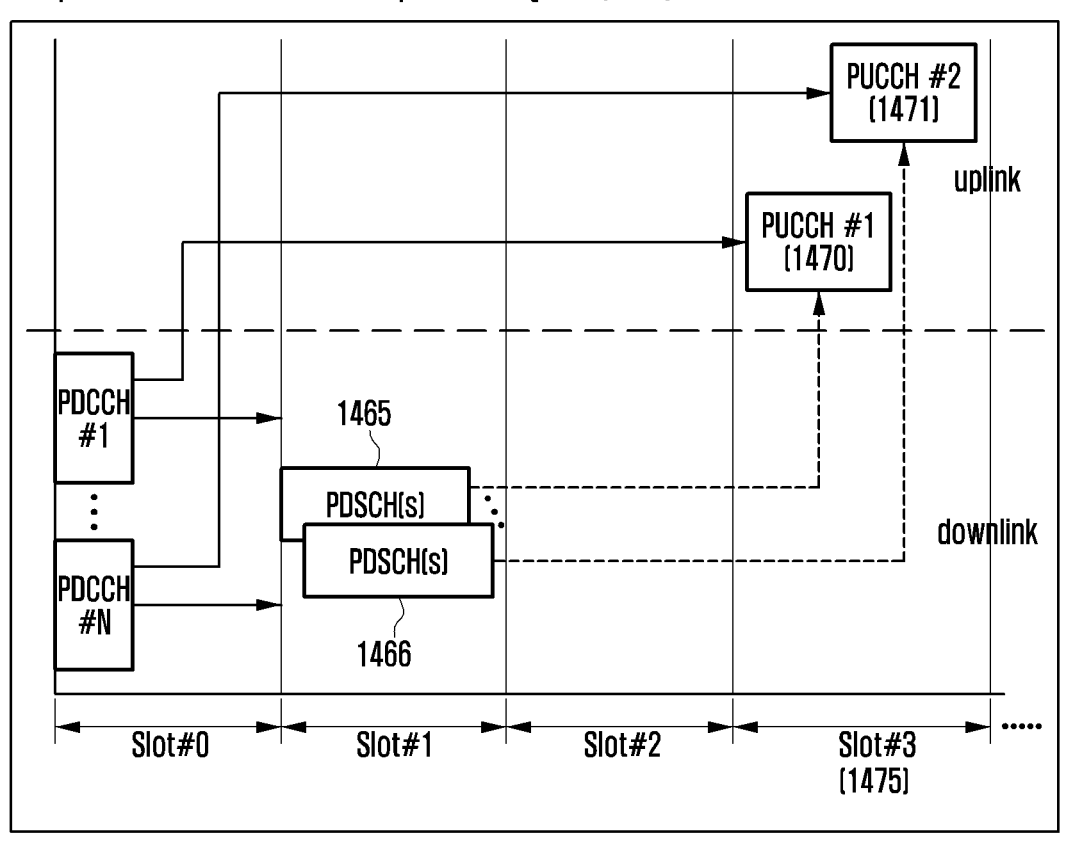
FIG. 14D is a diagram illustrating a downlink control information (DCI) configuration for non-coherent joint transmission (NC-JT) transmission and an HARQ-ACK information transferring method according to a PUCCH configuration according to an embodiment of the disclosure.

Referring to FIG. 14D, option #4: Intra-slot TDMed separate HARQ-ACK 1460 illustrates a situation of transmitting HARQ-ACK information corresponding to PDSCHs 1465 and 1466 of respective TRPs via different PUCCH resources 1470 and 1471 in different symbols within the same slot 1475. The slot in which the PUCCH resources for respective TRPs may be determined by the described $K_1$ value, and if $K_1$ values indicated by multiple PDCCHs indicate the same slot, a PUCCH resource may be selected and a transmission symbol may be determined via at least one of the following methods.

PUCCH resource group configuration for each TRP

A PUCCH resource group for HARQ-ACK transmission for each TRP may be configured. As in the 1-1st embodiment, if the TRP for each CORESET/search space is identified, the PUCCH resource for HARQ-ACK transmission for each TRP may be selected within a PUCCH resource group for the corresponding TRP. Time division multiplexing (TDM) may be expected between PUCCH resources selected from different PUCCH resource groups. That is, the selected PUCCH resources may not overlap each other in a symbol unit. An individual HARQ-ACK codebook for each TRP may be generated in the PUCCH resource selected for each TRP and then transmitted.

Indicating different PRI for each TRP

As in the 1-1st embodiment, if the TRP for each CORESET/search space is identified, the PUCCH resource for each TRP may be selected according to a PRI. That is, the PUCCH resource selection in Rel-15 described above may be independently performed for each TRP. In this case, PRIs used to determine PUCCH resources for respective TRPs should be different from each other. For example, the terminal may not expect that the PRIs used to determine the PUCCH resources for respective TRPs are indicated with the same value. In addition, TDM may be expected between the PUCCH resources corresponding the PRIs for respective TRPs. That is, the selected PUCCH resources may not overlap each other in a symbol unit. An individual HARQ-ACK codebook for each TRP may be generated in the PUCCH resource selected for each TRP and then transmitted.

Defining $K_1$ value in units of subslots

The PUCCH resource selection in Rel-15 described above may be followed, wherein a $K_1$ value may be defined in units of subslots. For example, an HARQ-ACK codebook for PDSCHs/PDCCHs indicated to report HARQ-ACK to the same subslot is generated and then transmitted to a PUCCH resource indicated by a PRI. The HARQ-ACK codebook generation and PUCCH resource selection may be irrelevant to identification of the TRP for each CORESET/search space.

If the terminal supports NC-JT reception, one of the options may be configured via a higher layer or may be implicitly selected according to a situation. For example, for the terminal supporting multi-PDCCH-based NC-JT, one of option #2 and options #3/#4 may be selected via a higher layer. As another example, depending on whether single-PDCCH-based NC-JT or multi-PDCCH-based NC-JT is supported/configured, option #1 may be selected for the former and one of options #2/#3/#4 may be selected for the latter. As another example, in the multi-PDCCH-based NC-JT, an option to be used may be determined according to selection of a PUCCH resource. When PUCCH resources of the same slot are selected in different TRPs, if the corresponding PUCCH resources are different and do not overlap in units of symbols, HARQ-ACK may be transmitted according to option #4, and if the corresponding PUCCH resources overlap in units of symbols or are identical, HARQ-ACK may be transmitted according to option #2. If PUCCH resources of different slots are selected for different TRPs, HARQ-ACK may be transmitted according to option #3. Configuration of the options may be dependent on a UE capability. For example, a base station may receive a UE capability according to the described procedure, and may configure the options according thereto. For example, option #4 configuration is allowed only for a terminal having capability supporting intra-slot TDMed separate HARQ-ACK, and a terminal without the corresponding capability may not expect configuration according to option #4.

Third Embodiment: Method of Generating Type 1 HARQ-ACK Codebook when Multi-DCI-Based Multi-TRP is Supported When multi-DCI-based multi-TRP is supported, that is, when CORESETs, in which CORESETPoolIndex that is higher layer signaling is configured to be 0, and CORESETs in which CORESETPoolIndex is configured to be 1 are provided to the terminal, a Type 1 HARQ-ACK codebook may be generated as described above by using a total of three methods including a method defined in Release 15 and two methods of separate feedback and joint feedback defined in Release 16.

In this case, if a Type 1 HARQ-ACK codebook is generated by the separate feedback method defined in Release 16, an HARQ-ACK codebook associated with first CORESETs in which CORESETPoolIndex is configured to be 0 or CORESETPoolIndex is not configured with respect to an active BWP of a serving cell, and an HARQ-ACK codebook associated with a second CORESETs in which CORESET-PoolIndex is 1 are generated separately. Unlike the joint feedback method of generating a Type 1 HARQ-ACK codebook by classifying serving cells into sets S0 and S1 according to CORESETPoolIndex, the separate feedback method includes Type 1 HARQ-ACK codebook generation for all serving cells without classifying the serving cells into S0 and S1 according to CORESETPoolIndex. For example, when generating the Type 1 HARQ-ACK codebook associated with the first CORESETs by using pseudo-code 2 above, HARQ-ACK codebooks are generated for all serving cells, instead of generating an HARQ-ACK codebook only for a serving cell including a first CORESET. Therefore, there occurs a problem that a generated Type 1 HARQ-ACK codebook includes HARQ-ACK feedback information for a serving cell that does not include the first CORESET. Similarly, when generating the Type 1 HARQ-ACK codebook associated with the second CORESETs, HARQ-ACK codebooks are generated for all serving cells, instead of generating an HARQ-ACK codebook only for a serving cell including a second CORESET, so that the same problem occurs. In order to solve this problem, the separate feedback method is used to perform classification into set S0 and set S1 so as to generate a Type 1 HARQ-ACK codebook separately for set S0 and set S1, wherein set S0 includes a serving cell including the first CORESET in the active BWP of the serving cell, and set S1 includes a serving cell including the second CORESET. The Type 1 HARQ-ACK codebooks generated respectively using sets S0 and S1 are separately reported to the base station according to a CORESET in which a PDCCH including DCI having triggered HARQ-ACK information reporting is received.

Figure 15:
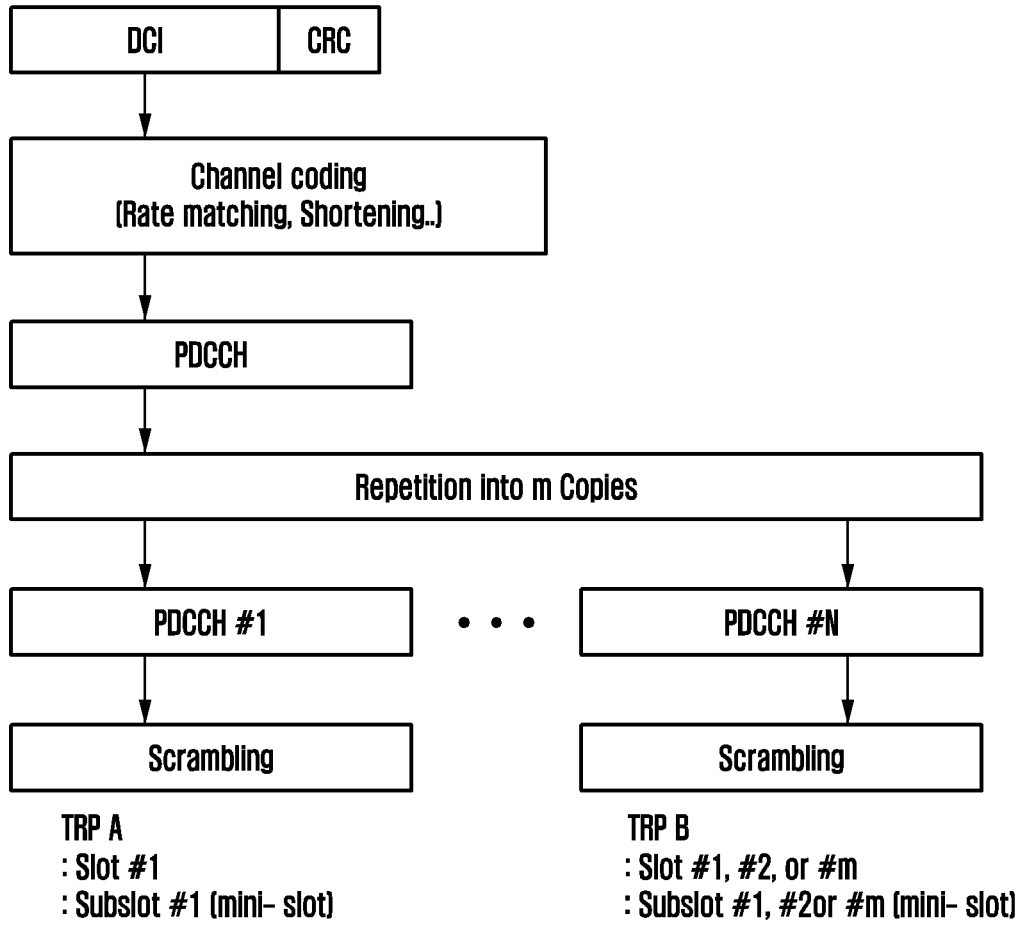
FIG. 15 is a diagram illustrating a method of repetitively transmitting a PDCCH by a base station according to an embodiment of the disclosure.

FIG. 15 is a diagram illustrating a method of repetitively transmitting a PDCCH by a base station according to an embodiment of the disclosure.

In the wireless communication system, DCI including scheduling information for a PUSCH or a PDSCH may be transmitted from a base station to a terminal via a PDCCH. A base station may generate DCI and attach a CRC to a DCI payload so as to generate a PDCCH via channel coding. Then, the base station may copy the generated PDCCH multiple times and distributedly transmit the same to each different CORESET or search space.

Referring to FIG. 15, if the base station transmits the PDCCH repetitively twice, the base station may perform repetitive PDCCH transmission based on the same beam or different beams in terms of spatial domain by mapping the PDCCHs to TRP A and TRP B, respectively. If the base station transmits the PDCCH repetitively four times, the base station may map the PDCCHs twice to correspond to each of TRP A and TRP B, wherein the two PDCCHs of each TRP may be transmitted separately in the time domain. The repetitive PDCCH transmission classified in the time domain may be repeated in slot-based, subslot-based, or mini-slot-based time units.

The described method is only an example and the disclosure is not limited thereto. In the disclosure, a terminal and a base station may consider various cases as below for the PDCCH repetition operation described above. In the following embodiments, at least one of the various cases below will be described, but the disclosure may not be limited thereto.

1-1) PDCCH repetition in terms of time domain in the same slot in the same CORESET.

1-2) PDCCH repetition in terms of frequency domain in the same slot in the same CORESET.

1-3) PDCCH repetition in terms of spatial domain in the same slot in the same CORESET.

2-1) PDCCH repetition in terms of time domain between different slots in the same CORESET.

2-2) PDCCH repetition in terms of frequency domain between different slots in the same CORESET.

2-3) PDCCH repetition in terms of spatial domain between different slots in the same CORESET.

3-1) PDCCH repetition in terms of time domain in the same slot between different CORESETs.

3-2) PDCCH repetition in terms of frequency domain in the same slot between different CORESETs.

3-3) PDCCH repetition in terms of spatial domain in the same slot between different CORESETs.

4-1) PDCCH repetition in terms of time domain between different slots between different CORESETs.

4-2) PDCCH repetition in terms of frequency domain between different slots between different CORESETs.

4-3) PDCCH repetition in terms of spatial domain between different slots between different CORESETs.

In addition, the number of PDCCH repetitions may be independently increased and, accordingly, the described methods may be considered in combination at the same time. The base station may preconfigure information on a domain, through which repetitive PDCCH transmission is performed, for the terminal via an RRC message. For example, for repetitive PDCCH transmission in terms of the time domain, the base station may preconfigure, for the terminal, information on whether repetition is performed according to one of the slot-based, subslot-based, or mini-slot-based time units described above. For repetitive PDCCH transmission in terms of the frequency domain, the base station may preconfigure, for the terminal, information on whether repetition is performed based on one of a CORESET, a bandwidth part (BWP), or a component carrier (CC). For repetitive PDCCH transmission in terms of the spatial domain, the base station may preconfigure, for the terminal, information related to a beam for repetitive PDCCH transmission via configuration for each QCL type. Alternatively, the information listed above may be combined and transmitted to the terminal via an RRC message. Therefore, the base station may repetitively transmit the PDCCH according to preconfigured information via the RRC message, and the terminal may repetitively receive the PDCCH according to preconfigured information through the RRC message.

Figure 16A:
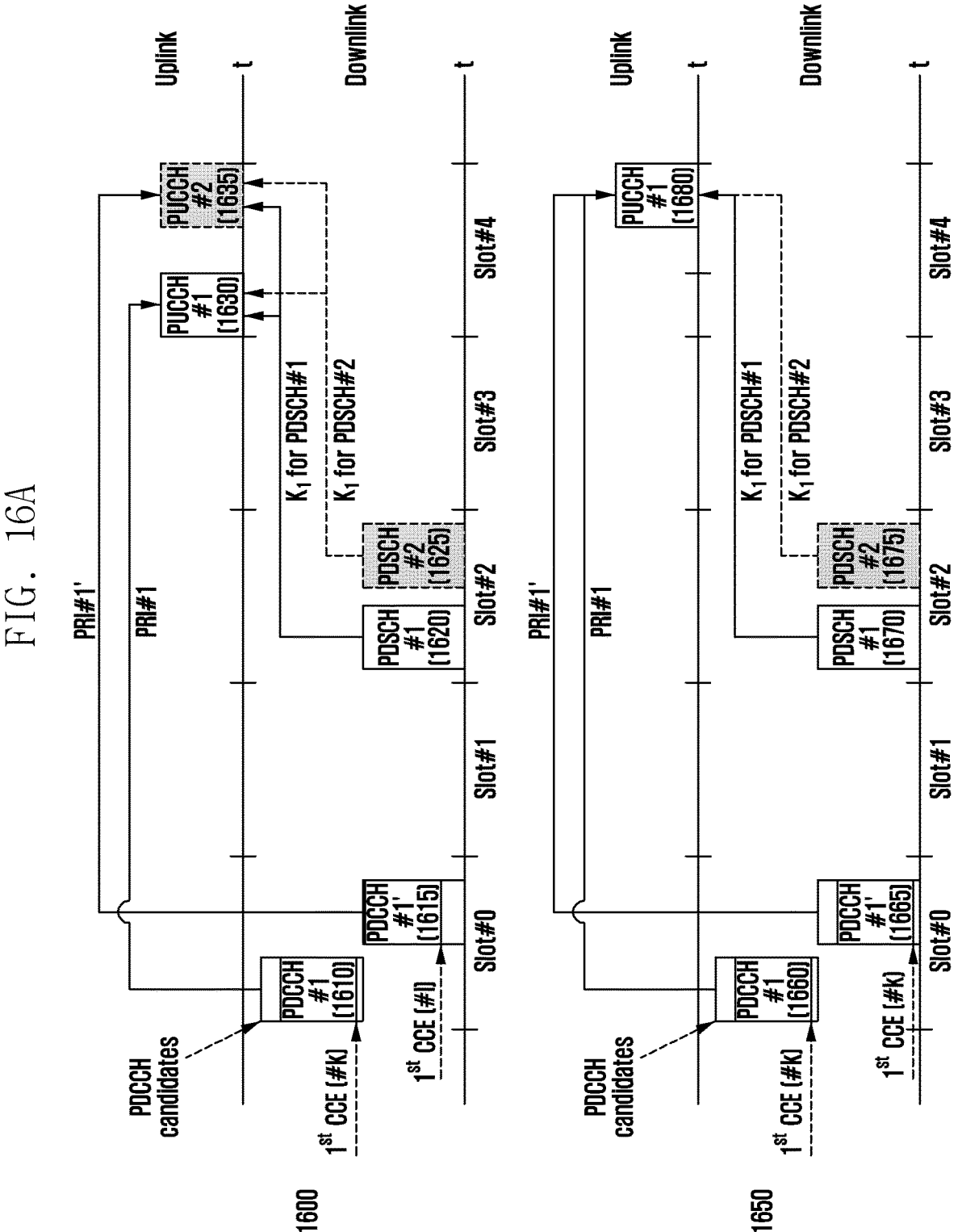
FIG. 16A is a diagram illustrating a case of multi-PDCCH-based NC-JT according to repetitively transmitted PDCCH and PUCCH configurations for NC-JT transmission and an operation method of a terminal for performing the same according to an embodiment of the disclosure.
Figure 16B:
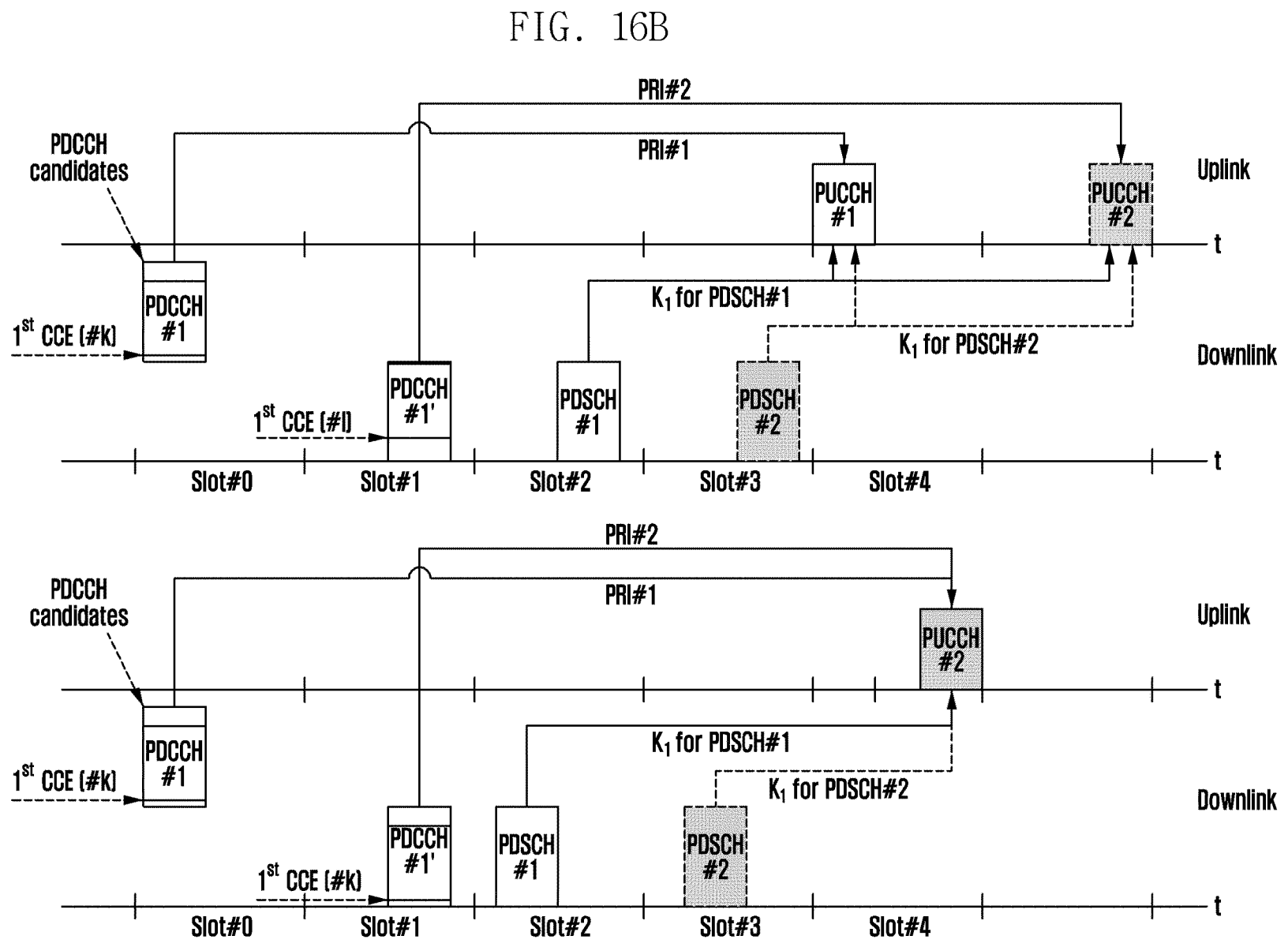

FIGS. 16A, 16B, and 16C are diagrams illustrating a case of multi-PDCCH-based NC-JT according to repetitively transmitted PDCCH and PUCCH configurations for NC-JT transmission and an operation method of a terminal for performing the same according to various embodiments of the disclosure.

Referring to FIGS. 16A and 16B, various considerations may be taken into account in methods of selecting PUCCH resources for transmission of HARQ-ACK information corresponding to PDSCHs scheduled by PDCCHs repetitively transmitted in respective TRPs. In particular, as various methods of selecting PUCCH resources, respective options may be considered and classified according to the number of PUCCH resources, PUCCH resource IDs, and positions of the PUCCH resources on the frequency/time axis.

FIG. 16A shows a case of PDCCH #1, . . . , PDCCH #N (N=2) in FIG. 15, and particularly indicates that DCI of PDCCH #1 and DCI of PDCCH #1' are configured by the same information payload and are repetitively transmitted. In this case, as shown in reference numerals 1600 and 1650 of FIG. 16A, a base station may configure the same control information and transmit the same to a terminal through PDCCH #1 1610 or 1660 and PDCCH #1' 1615 or 1665.

Referring to FIG. 16A, PUCCH resource indexes indicated by PDCCH #1 and PDCCH #1' and PUCCHs determined accordingly may be different from each other (e.g., PUCCH #1 1630 and PUCCH #2 1635) or may be the same (e.g., PUCCH #1 1680). In this way, if PUCCH #1 determined by PDCCH #1 and PUCCH #2 determined by PDCCH #1' are determined, the base station and the terminal may select at least one PUCCH resource to transmit the HARQ-ACK/NACK information described above. In the following embodiment, descriptions are provided using two PUCCH resources. However, a case of three or more PUCCH resources is not excluded, and expansion can be made sufficiently for understanding.

Option 1: As shown in reference numeral 1600 of FIG. 16A, the base station may configure two PUCCH resources 1630 and 1635, and the terminal may select/determine one resource from among the two PUCCH resources according to a rule determined between the base station and the terminal. In this case, the base station and the terminal may expect HARQ-ACK/NACK information to be transmitted in one PUCCH resource according to the mutually determined rule.

Option 2: As shown in reference numeral 1600 of FIG. 16A, the base station may configure two PUCCH resources 1630 and 1635, and the terminal may optionally select/determine one resource from among the two PUCCH resources. In this case, the base station may need to perform decoding on both of the two PUCCH resources in order to identify HARQ-ACK/NACK information transmitted based on a resource arbitrarily selected by the terminal.

Option 3: As shown in reference numeral 1650 of FIG. 16A, the base station may configure one PUCCH resource 1680, and the terminal may assume that the base station configures one PUCCH resource and may transmit HARQ-ACK/NACK information on one PUCCH resource.

In the following, various embodiments will be described in detail with respect to the rule determined between the base station and the terminal in option 1 described above.

As in Option 1, in determination of PDCCH candidates for repetitive transmission of the same DCI to a specific terminal, the base station may configure, in a higher layer, two PDCCH candidates to be explicitly connected to each other, and during resource allocation of PDCCH in each PDCCH candidate(s) (during resource position determination), the number of CCEs and a first/starting CCE index of the PDCCH candidates may be separately configured. In this case, the number of CCEs constituting each PDCCH candidate(s) and the first/starting CCE index may be configured differently or may be configured to be the same. When the base station assigns two PDCCHs to the same slot (FIG. 16A) or to different slots (FIG. 16B), the terminal may, in relation to PUCCH resource selection, transmit HARQ-ACK/NACK information about a success or failure of reception on PDSCH #1 and/or PDSCH #2, based on Equation 2 or based on a PUCCH resource index mapped to a value ($\Delta_{PRI}$) of a PUCCH resource indicator field indicated by the base station as in Table 23. Here, PDSCH #1 and PDSCH #2 are illustrated as different resources. However, if DCI information of the two PDCCHs is exactly the same, one resource (PDSCH #1) may be allocated to the time/frequency domain, and the spatial domain may be the same or may be different depending on a higher layer configuration. In addition, during PUCCH-ResourceSet configuration in a higher layer, if a resourceList value ($R_{PUCCH}$: the number of PUCCH resources belonging to a PUCCH resource set) is larger than 8, the PUCCH resource index may be identified by calculation of Equation 2, wherein parameters that may affect the PUCCH resource index include $\Delta_{PRI}$ as a PRI value, $N_{CCE,p}$ as a total number of CCEs of CORESET p to which received DCI belongs, $n_{CCE,p}$ as a first CCE index for the received DCI, and the like. The terminal may identify, in the higher layer configuration, a final position of the PUCCH resource, based on $N_{CCE,p}$, $\Delta_{PRI}$ as L1 signaling information, and a value of $n_{CCE,p}$ of PDCCH #1 or PDCCH #1' for which decoding is successfully performed.

The base station and the terminal may select one resource from among the identified two resources of PUCCH #1 and PUCCH #2 by the following methods.

Option 1-1: The base station and the terminal may transmit the aforementioned HARQ-ACK/NACK information about a success or failure of reception on PDSCH #1 or PDSCH #2 to a PUCCH resource scheduled by lowest/highest/0 CORESET ID from among at least one CORESET including PDCCHs for scheduling of respective PUCCH resources. If repetitive PDCCH transmission is allowed between CORESETs having different CORESETPoolIndex values, the base station and the terminal may transmit the aforementioned HARQ-ACK/NACK information about a success or failure of reception on PDSCH #1 to a PUCCH resource scheduled by CORESET ID scheduled in lowest/highest CORESETPoolIndex from among at least one CORESETPoolIndex including PDCCHs for scheduling of respective PUCCH resources.

For example, in reference numeral 1600 of FIG. 16A, if a CORESET ID of PDCCH #1 1610 is #0 and a CORESET ID of PDCCH #1' 1615 is #1, the terminal may determine that HARQ-ACK/NACK information is transmitted to a PUCCH resource scheduled by a lowest CORESET ID according to the rule determined between the terminal and the base station, and may thus transmit, to PUCCH #1 1630, information about a success or failure in decoding of at least one of PDSCH #1 1620 and PDSCH #2 1625. For another example, the terminal may determine that HARQ-ACK/ NACK information is transmitted to a PUCCH resource scheduled by a highest CORESET ID according to the rule determined between the terminal and the base station, and may thus transmit, to PUCCH #2 1635, information about a success or failure in decoding of at least one of PDSCH #1 1620 and PDSCH #2 1625.

For another example, when repetitive PDCCH transmission is allowed between CORESETs having different CORESETPoolIndex values, if CORESETPoolIndex of PDCCH #1 is 0 and a CORESETPoolIndex ID of PDCCH #1' is 1 in reference numeral 1500, the terminal may determine that HARQ-ACK/NACK information is transmitted to a PUCCH resource scheduled by a lowest CORE-SETPoolIndex according to the rule determined between the terminal and the base station, and may thus transmit, to PUCCH #1, information about a success or failure in decoding of PDSCH #1. Alternatively, the terminal may determine that HARQ-ACK/NACK information is transmitted to a PUCCH resource scheduled by a highest CORESETPoolIndex according to the rule determined between the terminal and the base station, and may thus transmit, to PUCCH #2, information about a success or failure in decoding of PDSCH #1.

Option 1-2: The base station and the terminal may transmit HARQ-ACK/NACK information about a success or failure of reception on PDSCH #1 or PDSCH #2 to a PUCCH resource scheduled by a PDCCH having a lowest first/starting CCE index [#k] of CORESET ID from among two CORESETs including PDCCHs for scheduling of respective PUCCH resources. If repetitive PDCCH transmission is allowed between CORE-SETs having different CORESETPoolIndex values, the base station and the terminal may transmit HARQ-ACK/NACK information about a success or failure of reception on PDSCH #1 to a PUCCH resource scheduled by a PDCCH having a lowest first/starting CCE index [#k] of CORESET ID from among CORESETs within two CORESETPoolIndex including PDCCHs for scheduling of respective PUCCH resources.

For example, in reference numeral 1600 of FIG. 16A, if a CCE index of PDCCH #1 1610 is #0 and a CCE index of PDCCH #1' 1615 is #12, the terminal may determine that HARQ-ACK/NACK information is transmitted to a PUCCH resource scheduled by a lowest CCE index according to the rule determined between the terminal and the base station, and may thus transmit, to PUCCH #1 1630, information about a success or failure in decoding of at least one of PDSCH #1 1620 and PDSCH #2 1625. For another example, the terminal may determine that HARQ-ACK/ NACK information is transmitted to a PUCCH resource scheduled by a highest CCE index according to the rule determined between the terminal and the base station, and may thus transmit, to PUCCH #2 1635, information about a success or failure in decoding of at least one of PDSCH #1

1620 and PDSCH #2 1625. If the CCE indexes identified by the terminal are the same, as in reference numeral 1650 of FIG. 16A, the terminal may determine that PUCCH resources scheduled by PDCCH #1 1660 and PDCCH #1' 1665 are the same PUCCH resource, and may thus transmit, to PUCCH #1 1680, information about a success or failure in decoding of at least one of PDSCH #1 1670 and PDSCH #2 1675.

Option 1-3: In determination of PDCCH candidates for repetitive transmission of the same DCI to a specific terminal, the base station may configure, in a higher layer, two PDCCH candidates to be explicitly connected to each other, and during resource allocation of each PDCCH (during resource position determination), the number of CCEs and a first/starting CCE index of the PDCCH candidates may be separately configured. In this case, the number of CCEs constituting each PDCCH candidate(s) and the first/starting CCE index may be configured differently or may be configured to be the same. If at least one of the number of CCEs and the first/starting CCE index is configured differently, the base station may implicitly/explicitly indicate one of the PDCCH candidates configured to be explicitly connected, so as to configure a PUCCH resource for the terminal. Specifically, in the two PDCCH candidates, the base station may indicate to conform to the first/ starting CCE index and the number of CCEs of PDCCH #1 in a first PDCCH candidate, or may indicate to conform to the first/starting CCE index and the number of CCEs of PDCCH #1' in a second PDCCH candidate.

Here, a method of configuring and indicating at least one of the first PDCCH candidate or the second PDCCH candidate linked in a higher layer largely describes a method of configuring a linkage combination first, and then describes, based on the method, a method of determining a resource of the repetitive PDCCH within the PDCCH candidates.

Option 1-3a: Configuring Repetitive PDCCH Candidate Index

The base station may configure, for a specific terminal during the higher layer configuration, at least two search space sets to have linkage to each other. For example, an RRC information element (IE), such as repetition-config in PDCCH-config, may be configured. Here, relevant information or parameters may be configured to include CORESET indexes having linkage and search space (SS) set indexes. Specifically, aggregation level values of repetitive PDCCH candidates may be determined to be at least one of 1, 2, 4, 8, 16, 32, . . . , etc., and at least one of 0, 12, 24, 36, . . . , etc. may be determined for index values of the PDCCH candidates, so that the aggregation level values and the index values may be configured in repetition-config or Search space Set during an RRC configuration. Based on repetition-related information identified during the higher layer configuration described above, the terminal may determine that a corresponding PDCCH candidate or a PDCCH candidate configured to have a specific aggregation level or PDCCH candidate index is repeated.

Option 1-3b: Configuring Aggregation Level or Number of CCEs of Repetitive PDCCH Candidate, and Indicating Explicit Position/Order-Related Information within Aggregation Level or CCE The base station may configure, for a specific terminal during the higher layer configuration, the PDCCH candidates to have linkage to each other, based on the aggregation level values thereof. For example, an additional RRC information element (IE), such as repetition-config in PDCCH-config, may be configured. Here, as a method of having linkage, a specific aggregation level value (e.g., 1, 2, 4, 8, 12, 32, etc.) or the number of CCEs may be explicitly configured. All search spaces or PDCCH candidates having the same aggregation level or the same number of CCEs may be determined to have linkage to each other. As another example, without a separate RRC information element (IE) configuration such as repetition-config in PDCCH-config, all PDCCH candidates having the same specific aggregation level value (e.g., 1, 2, 4, 8, 12, 32, etc.) or the same number of CCEs may be determined to have linkage to each other.

Specifically, if the number of PDCCH candidates for each AL configured by the base station in SS set #1 is AL1:2/AL2:4/AL4:4/AL8:2, and the number of PDCCH candidates for each AL is AL1:4/AL2:4/AL4:2/AL8:2 in SS set #2, and if the base station explicitly configures or determines an AL value, at which repetition occurs, to be 4, the base station and the terminal may determine that a search space or a PDCCH candidate having an AL of 4 is linked.

In addition, it may be assumed that, among the PDCCH candidates based on the determined AL values, a PDCCH candidates in a specific order (e.g., X-th) is repeated by a standard or base station configuration. In this case, the specific order (e.g., X-th) may conform to at least one of a first (lowest PDCCH candidate), a last (largest PDCCH candidate), and an X-th PDCCH candidate. In the specific example described above, if X is determined to be the first candidate (lowest PDCCH candidate), it may be determined that PDCCH candidate #0 of AL4 in SS Set #1 and PDCCH candidate #0 of AL4 in SS Set #2 have explicit linkage to each other and are repetitively transmitted. As another example, if X is determined to be the last candidate (largest PDCCH candidate), it may be determined that PDCCH candidate #3 of AL4 in SS Set #1 and PDCCH candidate #2 of AL4 in SS Set #2 have explicit linkage to each other and are repetitively transmitted. As another example, if X is configured or determined to be a next index (candidate index 1) of the first candidate index or a previous index of the last candidate index, it may be determined that PDCCH candidate #1 or PDCCH candidate #2 of AL4 in SS Set #1 and PDCCH candidate #1 or PDCCH candidate #0 of AL4 in SS Set #2 have explicit linkage to each other and are repetitively transmitted.

Option 1-3c: Default Configuration of Repetitive CORESET and/or Search Space (Set) Combination If, without information configuration, such as a separate special new parameter of the PDCCH candidates based on explicit signaling for repetitive transmission, all CORESETs or all search space sets included in CORESET-related information configuration or search space set-related information configuration in PDCCH-config satisfy at least one of the following conditions, the base station and the terminal may determine that repetition is configured.

Condition 1: The base station may configure repetitively transmitted PDCCH candidate(s) to have a TDM relationship to each other (e.g., non-SFN: single frequency network).

For example, if the repetitively transmitted PDCCH candidate is TDMed, the base station may configure for the terminal so that at least one of a frequency axis position of each CORESET, a total number of CCEs, a start position of the CCE, and a time axis resource length (e.g., the number of OFDM symbols) is the same, while time axis resources of a search space do not overlap. Specifically, the time axis resources may include position information (e.g., a configuration value of monitoringSymbolsWithinSlot) of a first symbol for monitoring, a slot period and slot offset-related information (e.g., a configuration value of monitoringSlot-PeriodicityAndOffset) for monitoring, and duration-related information from a slot start time point to an end time point for monitoring. In addition, for the time axis resources, the aforementioned information values may be configured in various ways according to inter-frequency or intra-frequency TDM.

Condition 2: The base station may configure repetitively transmitted PDCCH candidate(s) to have a FDM relationship to each other (e.g., non-SFN: single frequency network).

For example, if the repetitively transmitted PDCCH candidate is FDMed, the base station may configure for the terminal so that at least one of a total number of CCEs of each CORESET, a time axis resource length (e.g., the number of OFDM symbols), and a time axis resource of a search space is the same, while frequency axis resources of the CORESET do not overlap. Specifically, the frequency axis resources are configured using non-overlapping bit strings in frequencyDomainResources within ControlResourceSet of the RRC layer. Here, the bit strings may be indexed in units of groups of 6 RBs in a BWP so as to indicate a position in the frequency axis.

This operation may be configured according to UE capability. The terminal may assume that soft combining is operated by default in decoding of two CORESETs.

Option 1-3d: Separate Configuration of Repetitive CORESET and/or Search Space (Set) Combination When configuring, in a higher layer, information related to controlResourceSetId and searchspaceID in SearchSpace, the base station may configure repetitively transmitted specific PDCCH candidates in a scheme such as "repetition ENUMERATED {enabled}". In addition, the base station may change a repetition setting of the search space configuration during reconfiguration such as RRC reconfiguration.

In the following, descriptions will be provided for a method of determining a resource of a repetitive PUCCH in PDCCH candidates by the base station and the terminal, based on options 1-3a to 3d described above.

The base station and the terminal identify the aforementioned explicit linkage configuration, and the aforementioned PUCCH resource is determined by a PDCCH corresponding to a lowest/highest CCE index or a lowest/highest CORESET ID. As another example, the base station and the terminal determine the aforementioned PUCCH resource by a PDCCH corresponding to a PDCCH having a largest/smallest aggregation level described in Equation 1. As another example, the base station and the terminal determine the aforementioned PUCCH resource corresponding to a PDCCH having the largest/smallest $m_{s,n_{CI}}$ value (PDCCH candidate index value) described above in Equation 1. As another example, the base station and the terminal determine a PUCCH resource according to a PDCCH having a small corresponding CCE index in each of two CORESETs with respect to the $m_{s,n_{CI}}$ value (PDCCH candidate index value) described in Equation 1.

Option 1-4: Determination Based on Time Resource of Repetitive PDCCHs

Among at least one CORESET including PDCCHs for scheduling of respective PUCCH resources, if the PDCCHs are configured to be repetitively transmitted on the time axis (in a slot or between slots), the base station and the terminal may transmit the aforementioned HARQ-ACK/NACK information about a success or failure of reception on PDSCH #1 or PDSCH #2 to a PUCCH resource scheduled in a CORESET which is transmitted first in time or is transmitted last in time.

In option 2 (in reference numeral 1600), an operation of the base station side may be commonly performed for the explicit linkage-related configuration described above in option 1 to option 1-3. The rule of selecting only two of PDCCH #1 and PDCCH #1' described above is not required to be determined in standards, and the terminal may transmit, via its own implementation, each piece of HARQ-ACK/NACK information to a PUCCH resource indicated by a PDCCH. On the other hand, since the base station cannot identify a resource selected by the terminal from among the two PUCCH resources, whether the terminal has successfully decoded PDSCH #1 or PDSCH #2 may be identified by decoding of all the two PUCCH resources.

For example, the implementation method of the terminal itself described above may include the rule of selecting two of PDCCH #1 and PDCCH #1' in option 1 to option 1-3. For another example, HARQ-ACK/NACK information related to PDSCH #1 (and/or PDSCH #2) may be transmitted to a PUCCH resource indicated by a PDCCH resource (e.g., PDCCH #1) in which a decoding operation is first started/completed. For another example, HARQ-ACK/NACK information related to PDSCH #1 (and/or PDSCH #2) may be transmitted to a PUCCH resource indicated by a PDCCH resource (e.g., PDCCH #1') in which a last decoding operation is started/completed.

As in option 3 (in reference numeral 1650), in determination of PDCCH candidates for repetitive transmission of the same DCI to a specific terminal, the base station may configure, in a higher layer, two PDCCH candidates to be explicitly connected to each other, and may configure the same number of CCEs and the same first CCE index of the PDCCH candidates during resource allocation of PDCCH in the PDCCH candidates (during resource position determination). For example, in order to determine the PDCCH candidates for repetitive transmission of the same DCI to a specific terminal, a CORESET and a search space may be selected for the explicitly connected PDCCH candidates constituting PDCCH #1 and PDCCH #2. In addition, in order to determine a position of the DCI repetitively transmitted in the two PDCCH candidates determined by a combination of the previously selected CORESET and search space, the number of CCEs may be determined to be one of 1, 2, 4, 8, and 16, and the first/starting CCE index may be determined to be one of 0, 12, 24, etc. so that the position is the same in each PDCCH candidate.

Before decoding the two PDCCH candidates 1610 and 1615 that are repetitively transmitted in a specific slot, the terminal may identify the configuration in which respective candidates are explicitly linked in a higher layer (RRC layer or MAC layer), and when decoding is performed based thereon, the starting CCE index or first CCE index in each PDCCH may be the same, and decoding may be performed on an assumption that the CORESET including each PDCCH has the same number of CCEs. As a result, the terminal may determine the position of the PUCCH resource, based on at least one of the same first CCE index, the same number of CCEs, and PRI information received from the PDCCH.

FIG. 16C is a flowchart illustrating terminal operations for performing the embodiments described above with reference to FIGS. 16A and 16B.

In operation 1601, a terminal may receive PUCCH-related configuration information (e.g., first information) during RRC configuration. Here, the PUCCH-related configuration information may include configuration information such as a PUCCH resource set including the numbers of PUCCH resource symbols and slots, a starting PUCCH PRB position index, and a PUCCH format type relating to a PUCCH resource.

In addition, in operation 1601, the terminal may receive PDCCH-related configuration information (e.g., second information) during the RRC configuration. Here, the PDCCH-related configuration information may include configuration information such as a search space (set), a total number of CCEs, PDCCH candidates, and a CORESET related to a PDCCH resource.

In operation 1601, during the RRC configuration, in addition to the PDCCH-related configuration information, the terminal may receive information (third information) on configuration parameters or resources so that multiple PDCCHs repetitively transmitted from multiple TRPs are explicitly connected. Here, the explicit connection may include various embodiments, such as the aforementioned PDCCH candidates, CORESET, and search space.

In operation 1602, the terminal may perform, after the RRC configuration, blind decoding within resources (PDCCH candidates) for receiving PDCCHs from multiple TRPs (e.g., two TRPs), based on at least one of the first to third information, thereby receiving multiple PDCCHs transmitted by the base station.

In operation 1603, if the terminal succeeds in receiving and decoding the multiple PDCCHs from the multiple TRPs, a CCE and a first/starting CCE index corresponding to a resource of each successful PDCCH may be identified. The terminal may determine one or more PUCCH resources indicated by the multiple TRPs, based on at least one of the configuration information (first information) for PUCCH transmission, which is received in the RRC configuration, and the previously identified CCE index information. Here, the method of determining the PUCCH resources may include various embodiments of option 1 to option 3 described above.

In operation 1604, the terminal may transmit reception and decoding results (e.g., HARQ-ACK/NACK) of one or more PDSCHs to identified one or more PUCCH resources respectively, may transmit the same in an integrated manner, may map the same by a separate rule, or may transmit the same repetitively, wherein, based on DCI information of PDCCHs decoded from the multiple TRPs, the one or more PDSCHs are assigned by the PDCCHs. Here, performing transmission respectively indicates transmitting, to one PUCCH resource, a decoding result (e.g., type 1/2 HARQ-ACK codebook) of one PDSCH assigned from one PDCCH resource, performing transmission in an integrated manner indicates arranging (e.g., type 1/2 HARQ-ACK codebook) results of decoding multiple PDSCH resources scheduled by the multiple PDCCHs and transmitting the same to one PUCCH resource sequentially according to rules, and repetitive transmission indicates repeating at least one of the aforementioned transmission methods for the multiple PUCCH resources.

Figure 17A:
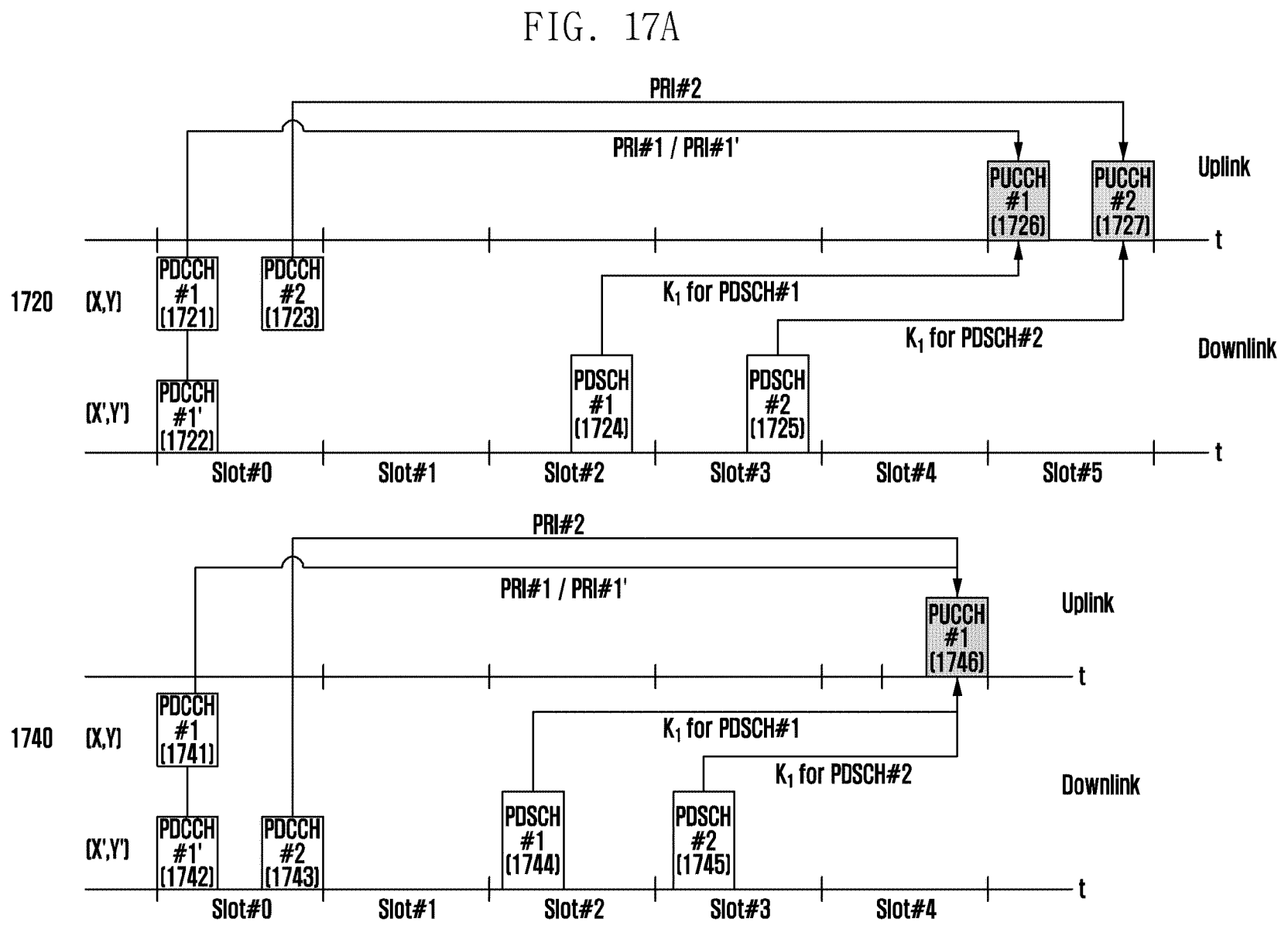
Figure 17B:
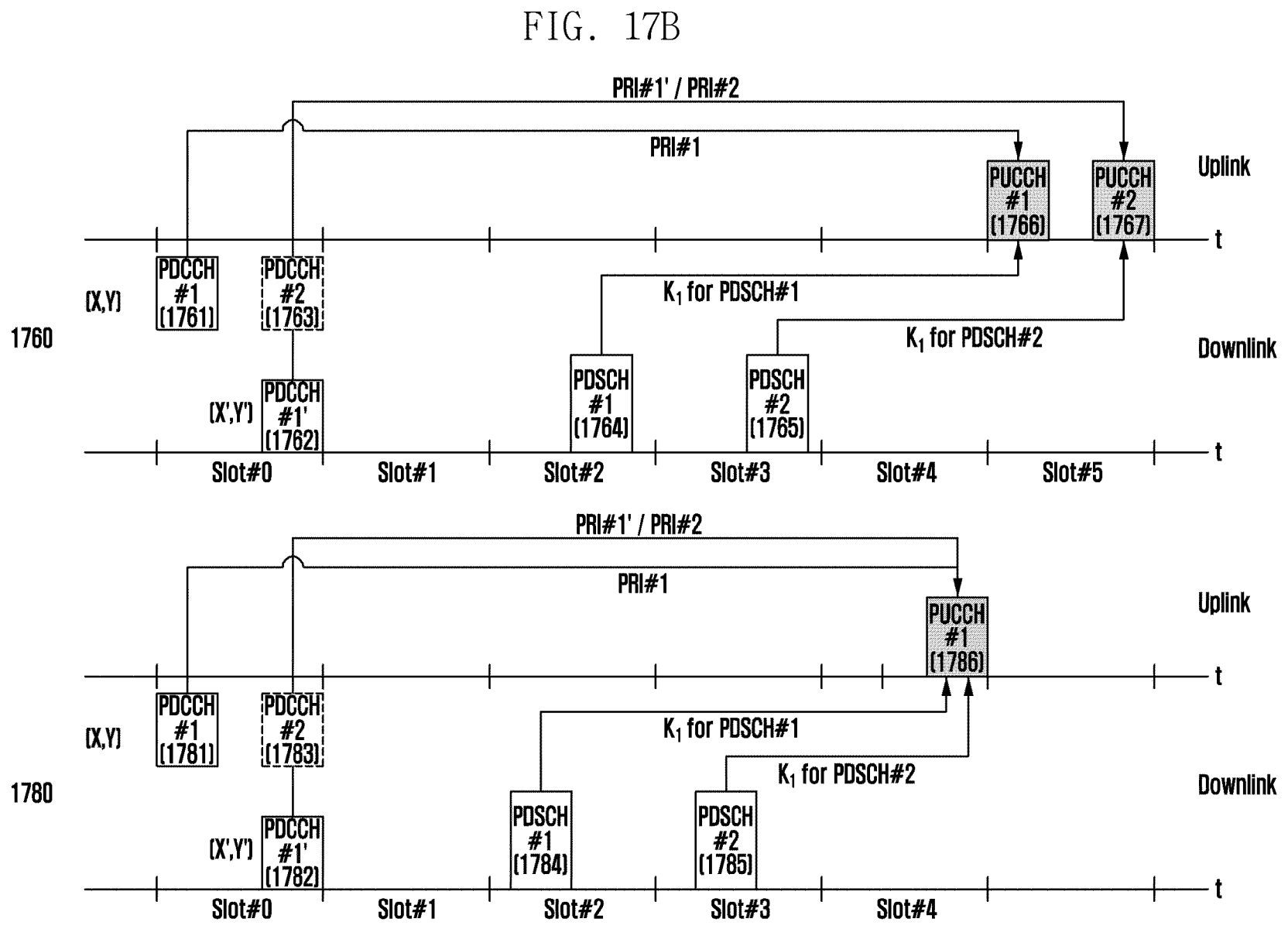

FIGS. 17A, 17B, and 17C are diagrams illustrating a case of generating a Type 2 HARQ-ACK codebook and an operation method of a terminal for performing the same according to various embodiments of the disclosure.

FIG. 17A shows a case in which a base station configures the same DCI information so that repetitively transmitted PDCCHs are FDMed with each other. FIG. 17B shows a case in which a base station configures the same DCI information so that repetitively transmitted PDCCHs are TDMed with each other. In particular, PUCCH resources allocated by repetitively transmitted PDCCH in FIGS. 17A and 17B may indicate separate PUCCH resources, as illustrated by reference numeral 1720 and reference numeral 1760, or may indicate a common (one) PUCCH resource, as illustrated by reference numeral 1740 and reference numeral 1780.

In this case, the base station may configure CORESET-PoolIndex in ControlResourceSet to be two different values (e.g., 0 or 1) during CORESET configuration operation of the terminal, and if CORESETPoolIndex is configured, the base station may configure parameter ackNackFeed-backMode(–r16) in PhysicalCellGroupConfig to be joint or separate during higher layer cell configuration. For example, if the base station configures CORESETPoolIndex and ackNackFeedbackMode for the terminal, the terminal may determine that, among multiple TRPs, a first TRP transmits one PDCCH (e.g., PDCCH #1) in a first CORESET, and a second TRP transmits another PDCCH (e.g., PDCCH #2) in a second CORESET.

On the other hand, the base station may not separately configure CORESETPoolIndex or ackNackFeedbackMode (–r16) for the terminal. For example, if the base station does not configure CORESETPoolIndex and ackNackFeed-backMode for the terminal, the terminal may determine that a single TRP transmits one PDCCH (e.g., PDCCH #1) in the first CORESET and transmits another PDCCH (e.g., PDCCH #2) in the second CORESET. The various embodiments, as illustrated by reference numeral 1720, reference numeral 1740, reference numeral 1760, and reference numeral 1780 of FIGS. 17A and 17B, may be considered suitable for all embodiments in which ackNackFeed-backMode is configured or is not configured.

In particular, in various scenarios described above, the base station and the terminal need a method of indicating a counter DAI (C-DAI) and a total DAI (T-DAI), and a method of performing Type-2 (dynamic) HARQ-ACK code-book determination based on the indicated C-DAI and T-DAI. In Alt-1 to Alt-11 below, the terminal may identify DAI information (e.g., 2 bits, 4 bits, 6 bits, etc.) or extended DAI information (e.g., 2 bits to 8 bits) of received DCI format 1_0, 1_1, so as to identify field values for a C-DAI constituting a most significant bit (MSB) and a T-DAI constituting a least significant bit (LSB), respectively.

Method of Generating C-DAI and T-DAI

Alt-1) If multiple PDCCHs repetitively transmitted in one monitoring occasion are FDMed with each other, the terminal may not expect a separate PDCCH to be transmitted in the monitoring occasion where the repetitively transmitted PDCCHs exist.

Alt-2) If multiple PDCCHs repetitively transmitted in one monitoring occasion are FDMed with each other, the terminal may expect at least one PDCCH to be transmitted in the monitoring occasion where the repetitively transmitted PDCCHs exist.

Alt-3) The terminal may expect that multiple PDCCHs repetitively transmitted in one monitoring occasion in one slot are FDMed with each other, and at least one PDCCH(s) is transmitted in another monitoring occasion in the same slot.

Alt-4-1) C-DAI values of PDCCHs repetitively transmit-ted with the same DCI are configured to be the same value, in which case, even if there is at least one assigned PDSCH, C-DAI or the entire HARQ-ACK corresponding to the C-DAI may be counted as one. That is, C-DAI values are determined based on at least one piece of frequency-related information of PDCCH resources, such as a lowest CORESET ID and a CCE ID, among repetitively transmitted multiple PDCCHs, and the C-DAI values may be applied to C-DAI values of repetitive PDCCHs in the PDCCH monitoring occa-sion.

Alt-4-2) C-DAI values of PDCCHs repetitively transmit-ted with the same DCI are configured to be the same value, in which case, even if there is at least one assigned PDSCH, C-DAI or HARQ-ACK correspond-ing to the C-DAI may be separately counted. That is, C-DAI values are determined based on at least one piece of frequency-related information of PDCCH resources, such as a highest CORESET ID and a CCE ID, among repetitively transmitted multiple PDCCHs, and the C-DAI values may be applied to C-DAI values of repetitive PDCCHs in the PDCCH monitoring occa-sion.

Alt-4-3) C-DAI values of PDCCHs repetitively transmit-ted with different DCI are configured to be values different from each other, in which case, even if there is at least one assigned PDSCH, C-DAI or HARQ-ACK corresponding to the C-DAI may be separately counted. That is, C-DAI values are determined based on at least one piece of frequency-related information of PDCCH resources, such as a highest CORESET ID and a CCE ID, among repetitively transmitted multiple PDCCHs, and the C-DAI values may be applied to C-DAI values of repetitive PDCCHs with different DCI in the PDCCH monitoring occasion.

Alt-5-1) For a T-DAI value, a {serving cell, PDCCH monitoring occasion} pair is counted, wherein all PDCCHs repetitively transmitted in the first CORESET(s) and the second CORESET(s) may be counted as one.

Alt-5-2) For a T-DAI value, a {serving cell, PDCCH monitoring occasion} pair is counted, wherein PDCCHs repetitively transmitted in the first CORESET(s) and the second CORESET(s) may be separately counted as one.

Reference numeral 1720 of FIG. 17A describes a case where, if two PDCCHs are frequency division multiplexed (FDMed), ackNackFeedbackMode is not configured or ackNackFeedbackMode-r16=separate is configured. PDCCH #1 1721 and PDCCH #1' 1722 for repetitive transmission of the same may schedule PDSCH #1 1724 and PUCCH #1 1726. In this case, scheduling-related informa-tion may include K1 for PDSCH #1 1724, PRI #1, PRI #1', and the like. In addition, PDCCH #2 1723 may schedule PDSCH #2 1725 and PUCCH #2 1727. In this case, sched-uling-related information may include K1 for PDSCH #2 1725, PRI #2, and the like. In this way, if a resource of PUCCH #1 1726 corresponding to PDSCH #1 1724 and a resource of PUCCH #2 1727 corresponding to PDSCH #2 1725 are separately configured, the terminal may generate an HARQ-ACK codebook based on a success or failure in decoding of PDSCH #1 1724 scheduled by PDCCH #1 1721 and PDCCH #1' 1722, and generate a separate HARQ-ACK codebook based on a success or failure in decoding of PDSCH #2 1725 scheduled by PDCCH #2 1723, so as to transmit the generated HARQ-ACK codebooks by using PUCCH #2 1727 of slot #5 indicated by last DCI format (e.g., PDCCH #2 1723).

Table 31 below illustrates some representative embodi-ments among various multiple configuration combinations of aforementioned alt-1 to alt-5 with respect to the situation of reference numeral 1720 in FIG. 17A, and embodiments by other combinations are not excluded. In addition, in generation of the HARQ-ACK codebook, the operations described in aforementioned pseudo-codes 1 to 3 may be applied.

TABLE 31

| For 1720, C-DAI and T-DAI according to a combination of Alts | |
|---|---|
| Alt-4-1 + Alt-5-1 | *PDCCH monitoring occasion 1 |
| | PDCCH #1 (repeat): C-DAI: 0, T-DAI: 0 |
| | PDCCH #1' (repeat): C-DAI: 0, T-DAI: 0 |
| | *PDCCH monitoring occasion 2 |
| | PDCCH #2 (no repeat): C-DAI: 1, T-DAI: 1 |
| Alt-4-1 + Alt-5-2 | *PDCCH monitoring occasion 1 |
| | PDCCH #1 (repeat): C-DAI: 0, T-DAI: 1 |
| | PDCCH #1' (repeat): C-DAI: 0, T-DAI: 1 |
| | *PDCCH monitoring occasion 2 |
| | PDCCH #2 (no repeat): C-DAI: 2, T-DAI: 2 |
| Alt-4-3 + Alt-5-2 | *PDCCH monitoring occasion 1 |
| (DCI change) | PDCCH #1 (repeat): C-DAI: 0, T-DAI: 1 |
| | PDCCH #1' (repeat): C-DAI: 1, T-DAI: 1 |
| | *PDCCH monitoring occasion 2 |
| | PDCCH #2 (no repeat): C-DAI: 2, T-DAI: 2 |
| Alt-4-2 + Alt-5-2 | *PDCCH monitoring occasion 1 |
| | PDCCH #1 (repeat): C-DAI: 1, T-DAI: 1 |
| | PDCCH #1' (repeat): C-DAI: 1, T-DAI: 1 |
| | *PDCCH monitoring occasion 2 |
| | PDCCH #2 (no repeat): C-DAI: 2, T-DAI: 2 |

Reference numeral 1740 of FIG. 17A describes a case where, if two PDCCHs are frequency division multiplexed (FDMed), ackNackFeedbackMode is not configured or ackNackFeedbackMode-r16=joint is configured. PDCCH #1 1741 and PDCCH #1' 1742 for repetitive transmission of the same may schedule PDSCH #1 1744 and PUCCH #1 1746. In this case, scheduling-related information may include K1 for PDSCH #1, PRI #1, PRI #1', and the like. In addition, PDCCH #2 1743 may schedule PDSCH #2 1745 and PUCCH #1 1746. In this case, scheduling-related information may include K1 for PDSCH #2, PRI #2, and the like. In this way, if one resource is configured for PUCCH #1 1746 corresponding to PDSCH #1 1744 and PDSCH #2 1745, the terminal may generate an HARQ-ACK codebook based on a success or failure in decoding of PDSCH #1 1744, which is scheduled by PDCCH #1 1741 and PDCCH #1' 1742, and PDSCH #2 1745 which is scheduled by PDCCH #2 1743, thereby transmitting the same on PUCCH #1 1746. Table 32 below shows another embodiment in which another serving cell is further added (PDCCH #3, not illustrated) to a monitoring occasion of PDCCH #1, based on a {serving cell, PDCCH monitoring occasion} pair in the situation 1740 of FIG. 17A. Table 32 shows some representative embodiments among various multiple configuration combinations of aforementioned alt-1 to alt-5, and embodiments by other combinations are not excluded. In addition, for an HARQ-ACK codebook generation order, the operations described in aforementioned pseudo-codes 1 to 3 may be applied.

TABLE 32

| For 1740, C-DAI and T-DAI according to a combination of Alts | |
|---|---|
| Alt-4-1 + Alt-5-1 | *PDCCH monitoring occasion 1 |
| | PDCCH #1 (repeat): C-DAI: 0, T-DAI: 1 |
| | PDCCH #1' (repeat): C-DAI: 0, T-DAI: 1 |
| | PDCCH #3 (no repeat): C-DAI: 1, T-DAI: 1 |
| | *PDCCH monitoring occasion 2 |
| | PDCCH #2 (no repeat): C-DAI: 2, T-DAI: 2 |
| Alt-4-1 + Alt-5-2 | *PDCCH monitoring occasion 1 |
| | PDCCH #1 (repeat): C-DAI: 0, T-DAI: 2 |
| | PDCCH #1' (repeat): C-DAI: 0, T-DAI: 2 |

TABLE 32-continued

| For 1740, C-DAI and T-DAI according to a combination of Alts | |
|---|---|
| | PDCCH #3 (no repeat): C-DAI: 2, T-DAI: 2 |
| | *PDCCH monitoring occasion 2 |
| | PDCCH #2 (no repeat): C-DAI: 3, T-DAI: 3 |
| Alt-4-3 + Alt-5-2 | *PDCCH monitoring occasion 1 |
| (DCI is changed) | PDCCH #1 (repeat): C-DAI: 0, T-DAI: 2 |
| | PDCCH #1' (repeat): C-DAI: 1, T-DAI: 2 |
| | PDCCH #3 (no repeat): C-DAI: 2, T-DAI: 2 |
| | *PDCCH monitoring occasion 2 |
| | PDCCH #2 (no repeat): C-DAI: 3, T-DAI: 3 |
| Alt-4-2 + Alt-5-2 | *PDCCH monitoring occasion 1 |
| | PDCCH #1 (repeat): C-DAI: 1, T-DAI: 2 |
| | PDCCH #1' (repeat): C-DAI: 1, T-DAI: 2 |
| | PDCCH #3 (no repeat): C-DAI: 2, T-DAI: 2 |
| | *PDCCH monitoring occasion 2 |
| | PDCCH #2 (no repeat): C-DAI: 3, T-DAI: 3 |

Alt-6) If multiple repetitively transmitted PDCCHs (PDCCH #1 and PDCCH #1') are TDMed with each other in multiple monitoring occasions, the terminal does not expect a PDCCH (e.g., PDCCH #2) having different DCI to be transmitted in the monitoring occasions where the repetitively transmitted PDCCHs exist. For example, in reference numeral 1760 of FIG. 17B, PDCCH #2 1763 cannot be transmitted simultaneously with one of PDCCH #1 and PDCCH #1' in the same PDCCH monitoring occasion. Alt-6-1)C-DAI values of PDCCHs repetitively transmitted with the same DCI are configured to be the same value, in which case, even if there is at least one assigned PDSCH, C-DAI may be counted as one. That is, a C-DAI value in a first PDCCH monitoring occasion among multiple repetitively transmitted PDCCHs may be applied to C-DAI values of the repetitively transmitted PDCCHs.

Alt-6-2)C-DAI values of PDCCHs repetitively transmitted with the same DCI are configured to be the same value, in which case, if there is at least one assigned PDSCH, C-DAIs may be separately counted. That is, a C-DAI value in a last PDCCH monitoring occasion among multiple repetitively transmitted PDCCHs may be applied to C-DAI values of all repetitively transmitted PDCCHs. Here, for the order of generating an HARQ-ACK codebook, a Type2 HARQ-ACK codebook may be generated according to the order of a first PDCCH monitoring occasion and a second PDCCH monitoring occasion.

Alt-6-3) For a T-DAI value of PDCCHs repetitively transmitted with the same DCI, the number of {serving cell, PDCCH monitoring occasion} pairs may be counted. For the T-DAI value, based on a first PDCCH among PDCCHs (e.g., PDCCH #1 and PDCCH #1') repetitively transmitted within one slot, the number of {serving cell, PDCCH monitoring occasion} pairs may be applied as the T-DAI value.

Alt-6-4) For a T-DAI value of PDCCHs repetitively transmitted with the same DCI, the number of {serving cell, PDCCH monitoring occasion} pairs may be counted. For the T-DAI value, based on a last PDCCH among PDCCHs (e.g., PDCCH #1 and PDCCH #1') repetitively transmitted within one slot, the number of {serving cell, PDCCH monitoring occasion} pairs may be applied as the T-DAI value.

Alt-7) If repetitively transmitted multiple PDCCHs (PDCCH #1 and PDCCH #1') are TDMed with each other in multiple monitoring occasions within one slot, the terminal may expect a PDCCH (e.g., PDCCH #2)

having different DCI to be transmitted in the monitoring occasions where the repetitively transmitted PDCCHs exist.

Alt-7-1) For C-DAI values of PDCCHs repetitively transmitted with the same DCI, the same value as C-DAI values of repetitively transmitted PDCCH(s) may be applied, with reference to a first PDCCH monitoring occasion among multiple repetitively transmitted PDCCHs. In addition, a C-DAI value of a PDCCH (e.g., PDCCH #2) having different DCI may be configured so that a count value is increased by 1 in comparison with PDCCHs repetitively transmitted in order of CORESET IDs in the same PDCCH monitoring occasion.

Alt-7-2) For C-DAI values of PDCCHs repetitively transmitted with the same DCI, the same value as C-DAI values of repetitively transmitted PDCCH(s) may be applied, with reference to a last PDCCH monitoring occasion among multiple repetitively transmitted PDCCHs. In addition, a C-DAI value of a PDCCH (e.g., PDCCH #2) having different DCI may be configured so that a count (counter) value is increased by 1 in comparison with PDCCHs repetitively transmitted in order of CORESET IDs in the same PDCCH monitoring occasion.

Alt-7-3) For a T-DAI value of PDCCHs repetitively transmitted with the same DCI, the number of {serving cell, PDCCH monitoring occasion} pairs may be counted. For the T-DAI value, the number of {serving cell, PDCCH monitoring occasion} pairs may be applied as the T-DAI value with reference (PDCCH #1') to a PDCCH monitoring occasion, in which different DCI is transmitted, among PDCCHs (e.g., PDCCH #1 and PDCCH #1') repetitively transmitted within one slot. Among two repetitively transmitted PDCCHs, if a PDCCH monitoring occasion for first transmission is the same as a PDCCH monitoring occasion for transmission of different DCI, a T-DAI value at this time may be applied identically to a T-DAI to be transmitted later. Conversely, among two repetitively transmitted PDCCHs, if a PDCCH monitoring occasion for last transmission is the same as a PDCCH monitoring occasion for transmission of different DCI, a T-DAI value at this time may be applied identically to a previously repetitively transmitted T-DAI.

Here, for the order of generating an HARQ-ACK codebook, a Type2 HARQ-ACK codebook may be generated according to the order of a first PDCCH monitoring occasion and a second PDCCH monitoring occasion.

Alt-8) If C-DAI values of PDCCHs repetitively transmitted with different DCI are configured to be different values, the C-DAIs may be separately counted in order of CORESET IDs.

Reference numeral 1760 of FIG. 17B describes a case where, if two PDCCHs are time division multiplexed (TDMed), ackNackFeedbackMode is not configured or ackNackFeedbackMode-r16=separate is configured. PDCCH #1 1761 and PDCCH #1' 1762 for repetitive transmission of the same may schedule PDSCH #1 1764 and PUCCH #1 1766 or PUCCH #2 1767 in different PDCCH monitoring occasions. In this case, scheduling-related information may include K1 for PDSCH #1, PRI #1, PRI #1', and the like. In addition, PDCCH #2 1763 may schedule PDSCH #2 1765 and PUCCH #2 1767. In this case, scheduling-related information may include K1 for PDSCH #2, PRI #2, and the like. In this way, if a resource of PUCCH #1 1766 corresponding to PDSCH #1 1764 and a resource of PUCCH

2 1767 corresponding to PDSCH #2 1765 are separately configured, the terminal may generate an HARQ-ACK codebook based on a success or failure in decoding of PDSCH #1 1764 scheduled by PDCCH #1 1761 and PDCCH #1' 1762, and generate a separate HARQ-ACK codebook based on a success or failure in decoding of PDSCH #2 1765 scheduled by PDCCH #2 1763, so as to transmit the generated HARQ-ACK codebooks by using PUCCH #2 1767 of slot #5 indicated by last DCI format (e.g., PDCCH #2 1763).

Reference numeral 1780 of FIG. 17B describes a case where, if two PDCCHs are TDMed, ackNackFeedbackMode is not configured or ackNackFeedbackMode-r16=joint is configured. PDCCH #1 1781 and PDCCH #1' 1782 for repetitive transmission of the same may schedule PDSCH #1 1784 and PUCCH #1 1786. In this case, scheduling-related information may include K1 for PDSCH #1, PRI #1, PRI #1', and the like. In addition, PDCCH #2 1783 may schedule PDSCH #2 1785 and PUCCH #1 1786. In this case, scheduling-related information may include K1 for PDSCH #2, PRI #2, and the like. In this way, if one resource is configured for PUCCH #1 1786 corresponding to PDSCH #1 1784 and PDSCH #2 1785, the terminal may generate an HARQ-ACK codebook based on successful decoding of PDSCH #1 1784, which is scheduled by PDCCH #1 1781 and PDCCH #1' 1782, and PDSCH #2 1785 which is scheduled by PDCCH #2 1783, thereby transmitting the same on PUCCH #1 1786.

Table 33 below illustrates some representative embodiments among various multiple configuration combinations of aforementioned alt-6 to alt-8 with respect to the situations of reference numerals 1760 and 1780 in FIG. 17B, and embodiments by other combinations are not excluded. In addition, for an HARQ-ACK codebook generation order, the operations described in aforementioned pseudo-codes 1 to 3 may be applied.

TABLE 33

| For 1760/1780, C-DAI and T-DAI according to a combination of Alts | |
| --- | --- |
| Alt-6-1 + Alt-6-3 | *PDCCH monitoring occasion 1<br>PDCCH #1 (repeat): C-DAI: 0, T-DAI: 0<br>*PDCCH monitoring occasion 2<br>PDCCH #1' (repeat): C-DAI: 0, T-DAI: 0 |
| Alt-6-1 + Alt-6-4 | *PDCCH monitoring occasion 1<br>PDCCH #1 (repeat): C-DAI: 1, T-DAI: 1<br>*PDCCH monitoring occasion 2<br>PDCCH #1' (repeat): C-DAI: 1, T-DAI: 1 |
| Alt-7-1 + Alt-7-3 | *PDCCH monitoring occasion 1<br>PDCCH #1 (repeat): C-DAI: 0, T-DAI: 1<br>*PDCCH monitoring occasion 2<br>PDCCH #1' (repeat): C-DAI: 0, T-DAI: 1<br>PDCCH #2 (no repeat): C-DAI: 1, T-DAI: 1 |
| Alt-7-2 + Alt-7-3 | *PDCCH monitoring occasion 1<br>PDCCH #1 (repeat): C-DAI: 1, T-DAI: 1<br>*PDCCH monitoring occasion 2<br>PDCCH #1' (repeat): C-DAI: 1, T-DAI: 1<br>PDCCH #2 (no repeat): C-DAI: 0, T-DAI: 1 |
| Alt 8 (DCI change) | *PDCCH monitoring occasion 1<br>PDCCH #1 (repeat): C-DAI: 0, T-DAI: 0<br>*PDCCH monitoring occasion 2<br>PDCCH #1' (repeat): C-DAI: 2, T-DAI: 2<br>PDCCH #2 (no repeat): C-DAI: 1, T-DAI: 2 |

Alt-9) The terminal may classify C-DAI/T-DAI of TDMed or FDMed PDCCH(s), which are repetitively transmitted in at least one PDCCH monitoring occasion within one slot, and C-DAI/T-DAI of at least one other PDCCH, which is not repetitive, to be a separate set (or pair) so as the perform counting. In the method enabling classification, classification and counting may be performed based on linkage information of the aforementioned various methods. For example, if C-DAI and T-DAI of at least one other PDCCH are classified as a separate set (or pair) so as to be counted, a bit width (e.g., 2 bits, 4 bits, 6 bits, 8 bits, etc.) defined in the existing rel-15 and 16 within a DCI field may be used without change.

As another example, if C-DAI and T-DAI of at least one other PDCCH are classified as a separate set (or pair) so as to be counted, the presence or absence of explicitly repetitive PDCCHs may be indicated by adding 1 bit or 2 bits to an existing bit width in the DCI field.

Table 34 is yet another embodiment in which multiple PDCCHs are FDMed, and shows a method of counting on a separate set basis by referring to the count method of aforementioned Alt-4 to Alt-5. In various embodiments of the disclosure, the following shows some cases among a number of combinations, and embodiments of other combinations are not excluded.

TABLE 34

| If repetitively transmitted PDCCHs and non-repetitively transmitted PDCCHs are distinguished, C-DAI and T-DAI according to a combination of Alts | |
| --- | --- |
| Alt-9 + Alt-4-1 + Alt-5-1 | *PDCCH monitoring occasion 1<br>PDCCH #1 (repeat FDMed): C-DAI: 0, T-DAI: 0 (first set)<br>PDCCH #1' (repeat FDMed): C-DAI: 0, T-DAI: 0 (first set)<br>PDCCH #2 (no repeat): C-DAI: 0, T-DAI: 0 (second set)<br>*PDCCH monitoring occasion 2<br>PDCCH #3 (repeat FDMed): C-DAI: 1, T-DAI: 1 (first set)<br>PDCCH #3' (repeat FDMed): C-DAI: 1, T-DAI: 1 (first set)<br>PDCCH #4 (no repeat): C-DAI: 1, T-DAI: 1 (second set)<br>*PDCCH monitoring occasion 3<br>PDCCH #5 (no repeat): C-DAI: 2, T-DAI: 3 (second set)<br>PDCCH #6 (no repeat): C-DAI: 3, T-DAI: 3 (second set) |
| Alt-9 + Alt-4-2 + Alt-5-2 | *PDCCH monitoring occasion 1<br>PDCCH #1 (repeat FDMed): C-DAI: 1, T-DAI: 1 (first set)<br>PDCCH #1' (repeat FDMed): C-DAI: 1, T-DAI: 1 (first set)<br>PDCCH #2 (no repeat): C-DAI: 0, T-DAI: 0 (second set)<br>*PDCCH monitoring occasion 2<br>PDCCH #3 (repeat FDMed): C-DAI: 3, T-DAI: 3 (first set)<br>PDCCH #3' (repeat FDMed): C-DAI: 3, T-DAI: 3 (first set)<br>PDCCH #4 (no repeat): C-DAI: 1, T-DAI: 1 (second set)<br>*PDCCH monitoring occasion 3<br>PDCCH #5 (no repeat): C-DAI: 2, T-DAI: 3 (second set)<br>PDCCH #6 (no repeat): C-DAI: 3, T-DAI: 3 (second set) |

FIG. 17C is a flowchart illustrating terminal operations for performing the embodiments described above with reference to FIGS. 17A and 17B. In operation 1701, a terminal may receive configuration information for transmission of an HARQ-ACK feedback via a PUCCH during an RRC configuration. To this end, the terminal may receive PUCCH-related configuration information. Here, the PUCCH-related configuration information (first information) may include configuration information such as a PUCCH resource set including the numbers of PUCCH resource symbols and slots, a starting PUCCH PRB position index, and a PUCCH format type relating to a PUCCH resource.

In addition, in operation 1701, the terminal may receive HARQ-ACK codebook type-related configuration information and PDCCH-related configuration information during the RRC configuration. For the HARQ-ACK codebook type-related configuration information (second information), information, such as pdsch-HARQ-ACK-Codebook=dynamic or with pdsch-HARQ-ACK-Codebook=enhancedDynamic-r16, may be configured. Here, the PDCCH-related configuration information (third information) may include configuration information such as a search space (set), a total number of CCEs, PDCCH candidates, and a CORESET related to a PDCCH resource.

In operation 1701, during the RRC configuration, in addition to the PDCCH-related configuration information, the terminal may receive information on configuration parameters or resources so that multiple PDCCHs repetitively transmitted from multiple TRPs are explicitly connected. Here, the explicit connection may include various embodiments, such as the aforementioned PDCCH candidates, CORESET, search space, and the like.

In operation 1702, the terminal may perform, after the RRC configuration, blind decoding within resources (PDCCH candidates) for receiving PDCCHs from one or more TRPs (e.g., one or two TRPs), based on at least one of the first to third information, thereby receiving multiple PDCCHs transmitted by a base station.

In operation 1703, the terminal may identify counter DAI or total DAI information, based on PDCCHs information received from at least one TRP in a PDCCH monitoring occasion of a certain duration. In addition, based on this, the terminal may receive at least one PDSCH scheduled by the PDCCHs, and may generate information related to a decoding result (e.g., HARQ-ACK/NACK) of the PDSCH. In particular, with respect to the counter DAI and the total DAI information, generation of a Type 2 HARQ-ACK codebook may be determined according to values indicated between repetitively transmitted PDCCHs or values indicated between non-repetitive PDCCHs. That is, the generation of the Type 2 HARQ-ACK codebook based on C-DAI and D-DAI may include various embodiments and combinations thereof described in aforementioned Alt 1 to Alt 11.

In operation 1704, the terminal may transmit the generated HARQ-ACK information, based on the identified at least one piece of PUCCH resource configuration information.

Figure 18:
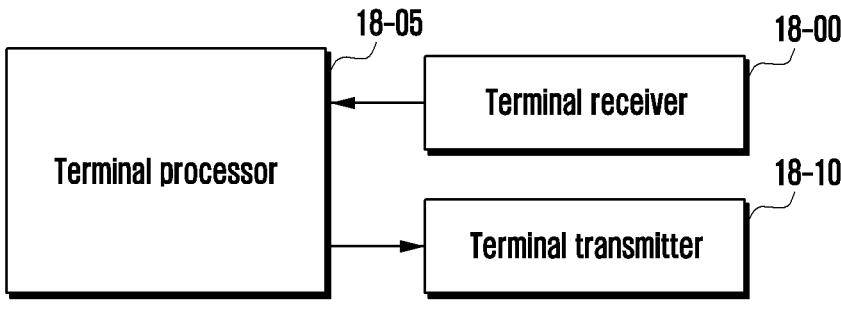
FIG. 18 is a diagram illustrating a terminal structure in the wireless communication system according to an embodiment of the disclosure.

FIG. 18 is a diagram illustrating a terminal structure in the wireless communication system according to an embodiment of the disclosure.

Referring to FIG. 18, a terminal may include a terminal receiver 18-00, a terminal processor 18-05, and a terminal transmitter 18-10. In addition, the terminal may further include a memory (not illustrated in the disclosure). The terminal processor 18-05 may include a processor. The terminal receiver 18-00, the terminal processor 18-05, and the terminal transmitter 18-10 of the terminal may operate according to the communication method of the terminal described above. However, the elements of the terminal are not limited to the aforementioned examples. For example, the terminal may include more or fewer elements compared to the aforementioned elements. In addition, the receiver 18-00, the terminal processor 18-05, the terminal transmitter 18-10, and the memory may be implemented in the form of a single chip.

In another embodiment, the terminal receiver 18-00 and the terminal transmitter 18-10 may be referred to as a transceiver. The transceiver may transmit a signal to or receive a signal from a base station. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

In addition, the terminal receiver 18-00 may receive a signal via a wireless channel and output the same to the terminal processor 18-05, and the terminal transmitter 18-10 may transmit, via a wireless channel, a signal output from the terminal processor 18-05.

The memory may store a program and data necessary for operation of the terminal. The memory may store control information or data included in a signal transmitted or received by the terminal. The memory may include a storage medium or a combination of storage media, such as ROM, RAM, a hard disk, a CD-ROM, and a DVD. There may be multiple memories.

In addition, the terminal processor 18-05 may control a series of procedures so that the terminal is able to operate according to the aforementioned embodiments. For example, the terminal processor 18-05 may receive DCI including two types of layers and control elements of the terminal to concurrently receive multiple PDSCHs.

In another embodiment, the terminal processor 18-05 may receive, from a base station, configuration information relating to repetitive transmission of a physical uplink control channel (PUCCH) via at least one of multiple transmission points, multiple panels, or multiple beams, may receive, from the base station, an indication for repetitive PUCCH transmission via at least one of multiple transmission points, multiple panels, or multiple beams, may select at least one of multiple PUCCH resources, based on the received configuration information and the received indication for repetitive transmission, and may perform repetitive PUCCH transmission according to a preconfigured order, based on at least one of the selected PUCCH resources. In addition, in yet another embodiment, the preconfigured order may be determined based on the received configuration information relating to repetitive PUCCH transmission, or may be determined based on a PUCCH resource order to be applied to the repetitive PUCCH transmission.

The terminal processor 18-05 may include multiple processors, and the terminal processor 18-05 may control an element of the terminal by executing a program stored in the memory.

Figure 19:
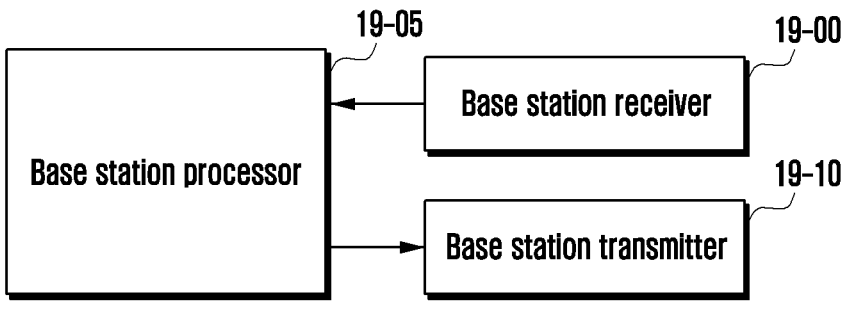
FIG. 19 is a diagram illustrating a base station structure in the wireless communication system according to an embodiment of the disclosure.

FIG. 19 is a diagram illustrating a base station structure in the wireless communication system according to an embodiment of the disclosure.

Referring to FIG. 19, a base station may include a base station receiver 19-00, a base station processor 19-05, and a base station transmitter 19-10. In addition, the base station may further include a memory (not illustrated in the disclosure). The base station receiver 19-00 and the base station transmitter 19-10 may be referred to as a transceiver. The base station receiver 19-00, the base station processor 19-05, and the base station transmitter 19-10 of the base station may operate according to the communication method of the base station described above. However, the elements of the base station are not limited to the above examples. For example, the base station may include more or fewer elements compared to the aforementioned elements. In addition, the base station receiver 19-00, the base station processor 19-05, and the base station transmitter 19-10 may be implemented in the form of a single chip form.

The transceiver may transmit a signal to or receive a signal from a terminal. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only another embodiment of the transceiver, and the elements of the transceiver are not limited to the RF transmitter and the RF receiver.

In addition, the base station receiver 19-00 may receive a signal via a wireless channel and output the same to the base station processor 19-05, and the base station transmitter 19-10 may transmit, via a wireless channel, a signal output from the base station processor 19-05.

The memory may store a program and data necessary for operation of the base station. The memory may store control information or data included in a signal transmitted or received by the base station. The memory may include a storage medium or a combination of storage media, such as ROM, RAM, a hard disk, a CD-ROM, and a DVD. There may be multiple memories.

The base station processor 19-05 may control a series of procedures so that the base station is able to operate according to the aforementioned embodiments of the disclosure. For example, the base station processor 19-05 may configure DCI of two types of layers including allocation information for multiple PDSCHs, and may control each element of the base station so as to transmit the same.

In a further embodiment, the base station processor 19-05 may transmit, to a terminal, configuration information relating to repetitive transmission of a physical uplink control channel (PUCCH) via at least one of multiple transmission points, multiple panels, or multiple beams, may transmit, to the terminal, an indication for repetitive PUCCH transmission via at least one of multiple transmission points, multiple panels, or multiple beams, may receive repetitive PUCCHs from the terminal, and may decode the received repetitive PUCCHs, based on the configuration information relating to the repetitive PUCCH transmission.

The base station processor 19-05 may include multiple processors, and the base station processor 19-05 may control the elements of the base station by executing a program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a base station and a terminal. As an example, embodiment 1 and 2 of the disclosure may be combined with each other to operate a base station and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents. cm What is claimed is:

What is claimed is:

1. A method performed by a terminal in a wireless communication system supporting multiple transmission reception points (TRPs), the method comprising:
   receiving first configuration information related to generation of hybrid automatic repeat request-acknowledgment (HARQ-ACK) feedback information, and second configuration information that links two search space sets;

receiving information indicating intra-slot based physical downlink control channels (PDCCH) repetitions;

receiving, from one or more TRPs, multiple repetitive PDCCHs for scheduling of one physical downlink shared channel (PDSCH) in a slot based on the second configuration information, wherein the multiple repetitive PDCCHs include a first PDCCH received in a first control resource set (CORESET) and a second PDCCH received in a second CORESET;

receiving the PDSCH, based on the multiple repetitive PDCCHs;

generating the HARQ-ACK feedback information for the PDSCH, based on the first configuration information;

determining a physical uplink control channel (PUCCH) resource based on one of the first CORESET and the second CORESET; and transmitting the HARQ-ACK feedback information on the PUCCH resource.

2. The method of claim 1, wherein each of the multiple repetitive PDCCHs comprises downlink assignment index (DAI) information for generation of the HARQ-ACK feedback information, wherein the HARQ-ACK feedback information is generated based on the DAI information, wherein the first CORESET is associated with a first TRP, and the second CORESET is associated with a second TRP, and wherein a total DAI value based on the DAI information is determined by counting {serving cell, PDCCH monitoring occasion} pairs for both the first CORESET and the second CORESET.

3. The method of claim 1, wherein the first CORESET and the second CORESET are associated with a first TRP, wherein the first PDCCH and the second PDCCH comprise identical information, and wherein downlink assignment index (DAI) information for generation of the HARQ-ACK feedback information included in each of the first PDCCH and the second PDCCH is identical.

4. The method of claim 3, wherein the first PDCCH and the second PDCCH are time division multiplexed (TDMed) in two or more monitoring occasions within the slot, and wherein the PUCCH resource is determined based on a number of control channel element (CCEs) in a CORESET having a lowest identity (ID) among the first CORESET and the second CORESET and an index of a first CCE of a PDCCH candidate associated with the CORESET having the lowest ID.

5. The method of claim 1, wherein the first configuration information comprises HARQ-ACK codebook type-related configuration information, and wherein the two search space sets have a same number of control channel element (CCEs).

6. A terminal in a wireless communication system supporting multiple transmission reception points (TRPs), the terminal comprising:

a transceiver configured to transmit or receive a signal; and a controller connected to the transceiver, wherein the controller is configured to:

receive first configuration information related to generation of hybrid automatic repeat request-acknowledgment (HARQ-ACK) feedback information, and second configuration information that links two search space sets, receive information indicating intra-slot based physical downlink control channels (PDCCH) repetitions, receive, from one or more TRPs, multiple repetitive PDCCHs for scheduling of one physical downlink shared channel (PDSCH) in a slot based on the second configuration information, wherein the multiple repetitive PDCCHs include a first PDCCH received in a first control resource set (CORESET) and a second PDCCH received in a second CORESET, receive the PDSCH, based on the multiple repetitive PDCCHs, generate the HARQ-ACK feedback information for the PDSCH, based on the first configuration information, determine a physical uplink control channel (PUCCH) resource based on one of the first CORESET and the second CORESET, and transmit the HARQ-ACK feedback information on the PUCCH resource.

7. The terminal of claim 6, wherein each of the multiple repetitive PDCCHs comprises downlink assignment index (DAI) information for generation of the HARQ-ACK feedback information, wherein the HARQ-ACK feedback information is generated based on the DAI information, wherein the first CORESET is associated with a first TRP, and the second CORESET is associated with a second TRP, and wherein a total DAI value based on the DAI information is determined by counting {serving cell, PDCCH monitoring occasion} pairs for both the first CORESET and the second CORESET.

8. The terminal of claim 6, wherein the first CORESET and the second CORESET are associated with a first TRP, wherein the first PDCCH and the second PDCCH comprise identical information, and wherein downlink assignment index (DAI) information for generation of the HARQ-ACK feedback information included in each of the first PDCCH and the second PDCCH is identical.

9. The terminal of claim 8, wherein the first PDCCH and the second PDCCH are time division multiplexed (TDMed) in two or more monitoring occasions within a slot, and wherein the PUCCH resource is determined based on a number of control channel element (CCEs) in a CORESET having a lowest identity (ID) among the first CORESET and the second CORESET and an index of a first CCE of a PDCCH candidate associated with the CORESET having the lowest ID.

10. The terminal of claim 6, wherein the first configuration information comprises HARQ-ACK codebook type-related configuration information, and wherein the two search space sets have a same number of control channel element (CCEs).

11. A method performed by a first transmission reception point (TRP) in a wireless communication system supporting multiple TRPs, the method comprising:

transmitting, to a terminal, first configuration information related to generation of hybrid automatic repeat request-acknowledgment (HARQ-ACK) feedback information, and second configuration information that links two search space sets;

transmitting, to the terminal, information indicating intra-slot based physical downlink control channels (PDCCH) repetitions;

transmitting, to the terminal, at least one repetitive PDCCH for scheduling of one physical downlink shared channel (PDSCH) in a slot based on the second configuration information, wherein the at least one repetitive PDCCH includes a first PDCCH transmitted in a first control resource set (CORESET)

transmitting, to the terminal, the PDSCH, based on the at least one repetitive PDCCH; and receiving, from the terminal, the HARQ-ACK feedback information on a physical uplink control channel (PUCCH) resource, the HARQ-ACK feedback information being for the PDSCH generated based on the first configuration information, wherein the PUCCH resource is determined based on one of the first CORESET and a second CORESET for a second PDCCH.

12. The method of claim 11, wherein the first CORESET and the second CORESET are associated with the first TRP, wherein each of the first PDCCH and the second PDCCH comprises downlink assignment index (DAI) information for generation of the HARQ-ACK feedback information, wherein the HARQ-ACK feedback information is generated based on the DAI information, and wherein the first PDCCH and the second PDCCH comprise identical information.

13. The method of claim 12, wherein first DAI information included in the first PDCCH and second DAI information included in the second PDCCH are identical, and wherein the first PDCCH and the second PDCCH are time division multiplexed (TDMed) in two or more monitoring occasions within the slot.

14. The method of claim 11, wherein the first configuration information comprises HARQ-ACK codebook type-related configuration information, and wherein the two search space sets have a same number of control channel element (CCEs).

15. A first transmission reception point (TRP) in a wireless communication system supporting multiple TRPs, the first TRP comprising:

a transceiver configured to transmit or receive a signal; and a controller connected to the transceiver, wherein the controller is configured to:

transmit, to a terminal, first configuration information related to generation of hybrid automatic repeat request-acknowledgment (HARQ-ACK) feedback information, and second configuration information that links two search space sets, transmit, to the terminal, information indicating intra-slot based physical downlink control channels (PDCCH) repetitions, transmit, to the terminal, at least one repetitive PDCCH for scheduling of one physical downlink shared channel (PDSCH) in a slot based on the second configuration information, wherein the at least one repetitive PDCCH includes a first PDCCH transmitted in a first control resource set (CORESET), transmit, to the terminal, the PDSCH, based on the at least one repetitive PDCCH, and receive, from the terminal, the HARQ-ACK feedback information on a physical uplink control channel (PUCCH) resource, the HARQ-ACK feedback information being for the PDSCH generated based on the first configuration information, wherein the PUCCH resource is determined based on one of the first CORESET and a second CORESET for a second PDCCH.

16. The first TRP of claim 15, wherein the first CORESET and the second CORESET are associated with the first TRP, wherein each of the first PDCCH and the second PDCCH comprises downlink assignment index (DAI) information for generation of the HARQ-ACK feedback information, wherein the HARQ-ACK feedback information is generated based on the DAI information, and wherein the first PDCCH and the second PDCCH comprise identical information.

17. The first TRP of claim 16, wherein first DAI information included in the first PDCCH and second DAI information included in the second PDCCH are identical.

18. The first TRP of claim 16, wherein the first PDCCH and the second PDCCH are time division multiplexed (TDMed) in two or more monitoring occasions within the slot.

19. The first TRP of claim 15, wherein the first configuration information comprises HARQ-ACK codebook type-related configuration information, and wherein the two search space sets have a same number of control channel element (CCEs).

* * * * *